United States Patent Office 3,296,260
Patented Jan. 3, 1967

3,296,260
NEUTRAL AND SINGLY CHARGED DERIVATIVES OF DECABORANES AND DECABORATES
Walter H. Knoth, Jr., Mendenhall, Pa., assignor to E. I. du Pont de Nemours and Company, Wilmington, Del., a corporation of Delaware
No Drawing. Filed Jan. 15, 1963, Ser. No. 251,697
21 Claims. (Cl. 260—247)

This application is a continuation-in-part of my copending application, Serial No. 123,082, filed June 30, 1961, now abandoned.

This invention relates to new boron compounds and to processes for their preparation. More particularly, it relates to new boron compounds having a plurality of boron and hydrogen atoms.

Boron compounds, particularly boron hydrides, have achieved technical importance in recent years in the field of high energy fuels. In other potential applications boron compounds, including boron hydrides, halides and alkyls, have been severely limited by hydrolytic, oxidative and other types of instability. To illustrate, diborane, chlorodiborane, pentaborane and trialkylboron compounds are spontaneously flammable in air. Diborane, pentaborane(9), chlorodiborane, boron trichloride, iododecaborane(14) and most other boron halides are rapidly hydrolyzed in water or alcohol. Other classes of boron compounds, e.g., the borazoles, are hydrolyzed by contact with water. Borazoles also have poor thermal stability and they show reducing properties in chemical reactions, e.g., borazoles reduce silver nitrate. Even the most stable known boron hydride, i.e., decaborane(14), is hydrolyzed at a moderate rate in water. Known ionic borohydrides, e.g., tetrahydroborates ($NaBH_4$ and the like), are similarly hydrolyzed at a rapid rate at 100° C.

This invention is directed to broad class of boron compounds which have stability characteristics that are unusual among boron compounds. The compounds of the invention generally show hydrolytic, oxidative and chemical stabilities normally associated with aromatic compounds.

*Definition and description of new compounds*

The novel boron compounds of this invention consist of ten conjoined boron atoms of which at least eight, and at most nine, of the boron atoms are bonded to hydrogen atoms or to groups capable of bonding to a nuclear carbon which is a member of a benzene ring; the compounds consisting further of at least one, and at most two, groups which are selected from organic sulfides, organic sulfones, tri-substituted phosphines, tertiary amines, carboxylic amides, and nitriles; any remaining component in said compound being a group which can form a cation in aqueous solution.

The polyboron compounds of the invention are represented by the following generic formula:

$$M_{(2-n)}[B_{10}H_{10-n-y}X_y \cdot nZ]_b{}^{(n-2)} \qquad (1)$$

where M is a cation, i.e., an atom or group of atoms which, in aqueous solution, can form a positively charged ion having a valence of 1–3, inclusive; X is a group which can be bonded to a nuclear carbon of a carbocyclic aromatic compound by replacement of hydrogen; Z is an organic sulfide, an organic sulfone, a tertiary phosphine, a tertiary amine, an amide of a carboxylic acid or a nitrile; $n$ is 1 or 2; $(2-n)$ represents the number of M groups which are present in the compound; $(n-2)$ represents the ionic charge, also called valence, of the group in brackets, i.e., the anion; $y$ has a value of 0 to $(10-n)$ and $b$ has a value of at least 1 and is otherwise equal to the valence of M. The group X is further defined as derivable, directly or indirectly, from an electrophilic reagent. To facilitate discussion, the group X will be referred to hereinafter as an "electrophilic group."

The group X is still further defined by considering the method by which the substituent is introduced into the boron compound. The different methods are as follows: (1) by electrophilic substitution, i.e., radicals which bond to a nuclear carbon of a carbocyclic aromatic ring by replacement of hydrogen; (2) by modification of an X group already attached to boron by synthetic methods commonly known to organic chemists for modification of radicals bonded to nuclear carbon of an aromatic or benzene ring; (3) by replacement of a substituent bonded to boron. The same radical may be obtained in one or more ways. For example, a cyano group may be introduced by replacement of halogen using cuprous cyanide or by dehydration of a

substituent.

The portion of Formula 1 which is in brackets, i.e., $[B_{10}H_{10-n-y}X_y \cdot nZ]$, is described as a polyhedral borane having a cage structure. The polyhedral borane cage, considered independently of the X and Z groups, can be electrically neutral, i.e., it can be free of any charge which is inherent in the boron cage structure itself, or it can have a negative ionic charge of 1. The definition of the number of M groups in Formula 1 is based on the charge on the boron cage, independently of the X and Z groups.

However, there may be electrical charges arising from the nature of the X and Z groups in addition to the charge associated with the polyhedral borane cage, as described above. For example, X or Z may bear carboxyl groups which, in ionic form, require the presence of a cation. As a further illustration, X or Z may bear basic groups, e.g., $-NH_2$, which will form ionizable salts with acids. Cations and anions derived from X and Z groups are considered to be part of these groups and are included within the scope of the definition of X and Z.

Inspection of generic Formula 1 shows that the polyboron compounds fall into two broad subgeneric groups which are based on the value for $n$. For compounds when $n=1$, the ionic charge, represented by $(n-2)$, of the group in bracket becomes $-1$ and the number of cations, M, also becomes 1. This subgeneric group is represented by the following formula:

$$M[B_{10}H_{9-y}X_y \cdot Z]_b \qquad (2)$$

where M, X, Z and $b$ are defined as in Formula 1, and $y$ is a cardinal number of 0–9, inclusive.

For compounds where $n=2$, the ionic charge of the group in brackets becomes 0, i.e., the boron entity is electrically neutral and the number of groups, M, also becomes 0. This subgeneric group is represented by the following formula:

$$B_{10}H_{8-y}X_y \cdot 2Z \quad \text{or} \quad B_{10}H_{8-y}X_y(Z)_2 \qquad (3)$$

where X and Z are defined as in Formula 1 and $y$ has a value of 0–8, inclusive. The compounds of Formula 3 are referred to as "neutral compounds" or "non-ionic compounds." The two formulas shown in (3) are simply alternative ways of writing the structures. They represent the same group of compounds.

Compounds of Formulas 1, 2 and 3 in which $y=0$, can can be considered to be the parent compounds from which other compounds are obtained by procedures which involve substitution of hydrogen, either directly or indirectly, which will be described later. The unsubstituted compounds which fall within the scope of the group of Formula 1 can be represented by the following formula:

$$M_{(2-n)}[B_{10}H_{10-n} \cdot nZ]_b^{(n-2)} \quad (4)$$

where M, Z, n and b have the meanings given for Formula 1.

The compounds of Formula 4 can be divided into two subgroups which are determined by the value of $n$, as described earlier for Formula 1. When $n=1$ in Formula 4, the compounds are represented as follows:

$$M[B_{10}H_9 \cdot Z]_b \quad (5)$$

where M, Z and b are defined as in Formula 1. When $n=2$ in Formula 4, the compounds are represented by the following formula:

$$B_{10}H_8 \cdot 2Z \quad \text{or} \quad B_{10}H_8(Z)_2 \quad (6)$$

where again Z has the meaning given in Formula 1. The compounds of Formula 6 can be used to prepare the compounds of Formula 5 in many cases, as will be described later. However, the compounds of both Formulas 5 and 6 will be referred to hereinafter as "parent compounds." The two formulas given for (6) are, as in (3), alternative ways of writing the structures.

The novel compounds of the invention have a characteristic boron-containing component or group which in Formulas 1, 2, 4, and 5 is the portion in brackets and which in Formulas 3 and 6 is represented by the entire formula. Thus, the boron-containing group can be electrically neutral, i.e., it can have an ionic charge of 0, as in Formulas 3 and 6, or it can have a charge of −1, i.e., it can be a monovalent anion as, e.g., in Formulas 2, 4 and 5.

Both boron-containing groups (neutral and monovalent anion) have at least two characteristics in common, viz., (1) the component Z and the manner in which it is joined to the group, and (2) remarkable and unexpected chemical behavior which resembles in many respects the substitution reactions which aromatic compounds undergo, i.e., a chemical behavior which is best described as "aromatic." The term "aromatic" is well recognized in organic chemistry and it is discussed, e.g., in Fuson, "Advanced Organic Chemistry," p. 587, Wiley (1950). These common characteristics will be discussed in the paragraphs which follow. The discussions will include descriptions of the groups Z, X, and M.

The term "boron cage" will be used in the discussions. This term refers to the 10 boron atoms which are present in the compounds of the invention and which are deemed to be joined to form a skeleton-like unit or cage in which each boron atom is adjacent to at least four other boron atoms. The manner in which the boron atoms are linked is not known but the group of which the 10 boron atoms are a part functions as a unit in chemical reactions.

*Group Z.*—In all of the compounds of the invention, represented by Formulas 1 through 6, the group Z, as previously stated, can be a sulfide in which the divalent sulfur is singly bonded to organic groups, a sulfone in which the hexavalent sulfur is bonded to each of two oxygens through double bonds and to organic groups through single bonds, a phosphine in which the trivalent phosphorus is bonded through single bonds to organic groups, a tertiary amine, an amide of a carboxylic acid, or an organic nitrile, i.e., a compound bearing a —CN group. In each of the above Z groups, the organic radicals (R) are bonded to the sulfur, nitrogen, phosphorus, amide group or cyano group through carbon.

The organic sulfides, sulfones, phosphines, amines, carboxylic acid amides and nitriles which are within the scope of the group Z have the common property of acting as Lewis bases, i.e., compounds which have within their structures an atom which is capable of donating an electron pair to the boron cage to form a stable covalent bond. Lewis bases are a well-known class of compounds and they are defined in conventional textbooks, e.g., Moeller, "Inorganic Chemistry," p. 326, Wiley (1954) and Wheland, "Advanced Organic Chemistry," pp. 80–81, Wiley (1949).

The group Z in the compounds of the invention is, therefore, considered to be coordinately bonded to the boron cage largely through two electrons both of which are initially contributed by the Z group.

The organic radicals (R) which are part of the Z groups are bonded to the sulfur, nitrogen or phosphorus through carbon, i.e., the radicals form carbon-sulfur, carbon-nitrogen and carbon-phosphorus bonds. The composition of the organic radicals is not critical and these radicals can have a wide range of structures. The radicals can be aliphatic, cycloaliphatic, aromatic or heterocyclic. Functional or reactive groups can be present in the radical. The radicals bonded to sulfur, in particular, can bear functional substituents, i.e., reactive groups which can take part in conventional chemical reactions, e.g., addition, condensation or polymerization reactions. Illustrations of reactive substituents which can be present on the Z groups are carboxyl, hydroxyl, halogen, amine, nitro and similar functional groups.

Examples of sulfides which are within the scope of Z are as follows: dimethyl sulfide, diethyl sulfide, dipropyl sulfide, dibutyl sulfide, di(2-ethylhexyl) sulfide, didodecyl sulfide, ethyl octadecyl sulfide, butyl dodecyl sulfide, dicyclohexyl sulfide, di(4-dodecylcyclohexyl) sulfide, ethyl cyclohexyl sulfide, methyl cyclopentyl sulfide, methyl (4-methylcyclohexyl) sulfide, methyl decahydronaphthyl sulfide, pentamethylene sulfide, di($\beta$-aminoethyl) sulfide, di($\beta$-cyanoethyl) sulfide, di(4-carboxyphenyl) sulfide, di(4-aminocyclohexyl) sulfide, di(methoxyethyl) sulfide, di($\beta$-acetoxyethyl) sulfide, di($\omega$-chlorobutyl) sulfide, di(4-cyanophenyl) sulfide, di(4-nitrophenyl) sulfide, di(2,4-diaminocyclohexyl) sulfide, (2,4-diaminophenyl) (4-aminocyclohexyl) sulfide, di(4-hydroxyphenyl) sulfide, di(8-hydroxynaphthyl) sulfide, and the like.

Examples which are illustrative of sulfones are methyl ethyl sulfone, dibutyl sulfone, dicyclohexyl sulfone, ethyl decahydronaphthyl sulfone, dioctyl sulfone, dioctadecyl sulfone, di(2-ethylhexyl) sulfone, diallyl sulfone, ethyl phenyl sulfone, cyclohexyl phenyl sulfone, and the like.

Examples which are illustrative of phosphines and amines are trimethyphosphine, triethylphosphine, cyclohexyldimethylphosphine, dodecyldiethylphosphine, trioctylphosphine, trimethylamine, tripropylamine, triisopropylamine, trioctylamine, tridodecylamine, trioctadecylamine, dihexylmethylamine, tricyclohexylamine, cyclohexyldiethylamine, triethylamine, methyldiethylamine, ethyldidodecylamine, cyclohexyldibutylamine, methyldicyclohexylamine, triallylamine, allyldimethylamine, N-methylpiperidine, N-methylpyrrole, pyridine, quinoline, isoquinoline, picolinic acid, N-isobutylpyrrolidine, N-ethylpyrrolidine, and the like.

Examples of amides which are within the scope of the Z group are formamide, acetamide, butyramide, 2-ethylhexenamide, stearamide, propiolamide, dimethylformamide, diethylformamide, dioctylformamide, dimethylacetamide, N-methyl-N-cyclohexylacetamide, N,N-dimethylbenzamide, N,N-dibutyltoluamide, N-acetylpiperidine, N-acetylpyrrolidine, N-octyl-2-pyrrolidone, N-cyclohexyl-2-pyrrolidone, and the like.

Examples of nitriles which are illustrative of and are within the scope of Z are propionitrile, capronitrile, $\omega$-carboxycapronitrile, valeronitrile, cyclohexanecarbonitrile, benzonitrile, toluonitrile, stearonitrile, 5-pyrimidine-carbonitrile, furonitrile, tetrahydrofuronitrile, 4-phenoxycyclohexanecarbonitrile, $\beta$-ethoxypropionitrile, and the like.

For each of the Z groups described above, the compounds of the invention are represented broadly by the following formulas:

$B_{10}H_{8-y}X_y \cdot 2SR_2$ (7)
$B_{10}H_{8-y}X_y \cdot 2O_2SR_2$ (7a)
$B_{10}H_{8-y}X_y \cdot 2PR_3$ (8)
$B_{10}H_{8-y}X_y \cdot 2NR_3$ (9)

$B_{10}H_{8-y}X_y \cdot 2N=CH-R^3$ (9a)
$B_{10}H_{8-y}X_y \cdot 2RC(O)NH_2$ (10)
$B_{10}H_{8-y}X_y \cdot 2RC(O)NHR$ (10a)
$B_{10}H_{8-y}X_y \cdot 2RC(O)NR_2$ (10b)
$B_{10}H_{8-y}X_y \cdot 2HC(O)NH_2$ (11)
$B_{10}H_{8-y}X_y \cdot 2HC(O)NHR$ (11a)
$B_{10}H_{8-y}X_y \cdot 2HC(O)NR_2$ (12)
$B_{10}H_{8-y}X_y \cdot 2RCN$ (12a)
$M[B_{10}H_{9-y}X_y \cdot SR_2]_b$ (13)
$M[B_{10}H_{9-y}X_y \cdot O_2SR_2]_b$ (13a)
$M[B_{10}H_{9-y}X_y \cdot PR_3]_b$ (14)
$M[B_{10}H_{9-y}X_y \cdot NR_3]_b$ (15)

$M[B_{10}H_{9-y}X_y \cdot N=CHR^3]_b$ (15a)
$M[B_{10}H_{9-y}X_y \cdot RC(O)NH_2]_b$ (16)
$M[B_{10}H_{9-y}X_y \cdot RC(O)NHR]_b$ (16a)
$M[B_{10}H_{9-y}X_y \cdot RC(O)NR_2]_b$ (16b)
$M[B_{10}H_{9-y}X_y \cdot HC(O)NH_2]_b$ (17)
$M[B_{10}H_{9-y}X_y \cdot HC(O)NHR]_b$ (17a)
$M[B_{10}H_{9-y}X_y \cdot HC(O)NR_2]_b$ (18)
$M[B_{10}H_{9-y}X_y \cdot RCN]_b$ (18a)

In the above formulas, M, X, b and y have the meanings given previously for Formulas 2 and 3. The R groups represent the organic radicals discussed in the preceding paragraphs. $R^3$ represents the divalent $$-\overset{|}{C}=\overset{|}{C}-\overset{|}{C}=\overset{|}{C}-$$

which forms a pyridine ring with the —N=CH— group. The R groups referred to earlier can be alike or different and two of such R groups can be joined to form a ring of which the sulfur, nitrogen or phosphorus is a part. Formulas 7 through 18 represent species of compounds which fall within the broad scope of compounds included within the scope of Formula 1.

Certain groups of compounds which fall within the scope of Formula 1 are preferred for reasons of availability of reactants, ease of preparation and use as intermediates in the preparation of valuable products.

One preferred group of compounds of Formula 1 are products in which the Z group is an organic sulfide of the formula $R_2{}^2S$, where $R^2$ is a hydrocarbon radical of up to 18 carbons, free of acetylenic unsaturation, and having at most two substituents selected from halogen (F, Cl, Br, I), —OH (including alcoholic and phenolic), —NO$_2$, —COOH (including metal and nitrogen-base salts of —COOH), amine [including —NH$_2$, (loweralkyl)NH, (diloweralkyl)N, and salts of these groups with organic and inorganic acids], —C(O)NH$_2$,

—C(O)NHQ,

—C(O)NQ$_2$, —C(O)OQ, —OC(O)OQ, —CN,

—NHC(O)NH$_2$ and —NHC(O)NHQ, where Q is a hydrocarbon group of up to 8 carbons which is free of acetylenic unsaturation. The two $R^2$ groups can be joined to form a divalent radical which forms a ring, preferably of six members with the sulfur.

A second preferred class of compounds of Formula 1 are products in which the Z group bears hydrocarbon substituents bonded to the nitrogen, sulfur or phosphorus, which hydrocarbon substituents are free of functional groups. This preferred group can be represented by the formulas $R'_2S$, $R'_2SO_2$, $R'_3P$, $R'_3N$, $HC(O)NR'_2$, $R'C(O)NR'_2$, and $R'CN$, wherein the R' groups, which can be alike or different, are hydrocarbon groups of up to 18 carbons and wherein two of the R' groups can be joined to form a ring of which the sulfur, phosphorus or nitrogen is a part. These groups are preferred solely because of availability and good reactivity to form the compounds of Formula 1.

Hydrocarbon, as used above, includes alkyl, alkenyl, alkynyl, cycloalkyl, cycloalkenyl, aryl, alkaryl, and aralkyl. The aliphatic hydrocarbon groups have preferably at most two carbons joined by multiple bonds, i.e., at most one double or triple bond.

A third class of preferred compounds of Formula 1 are products in which Z is an amide selected from N,N-disubstituted formamides, N,N-disubstituted acetamides, and N-substituted-2-pyrrolidones. The amides have the formulas

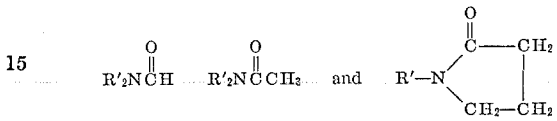

where R' is a hydrocarbon group as defined above.

*Substitution reactions of the boron-containing group*

Prior to discussing the group X in generic Formula 1, a brief description of the chemical properties of the compounds of the invention is desirable, particularly the substitution reactions which the compounds undergo in reactions with electrophilic reagents. It is particularly desirable to note at this point that the compounds of the invention in which the boron-containing unit bears hydrogen, electrophilic substituents, or both hydrogen and electrophilic substituents, show much greater chemical stability than many of the known hydrogen-containing boron compositions.

The boron-containing group functions as a unit in many chemical reactions and its behavior suggests that the boron atoms are joined to form a boron cage or boron sphere which, although entirely inorganic in structure, undergoes electrophilic substitution reactions in a manner which resembles the behavior of carbocyclic aromatic compounds, e.g., benzene or naphthalene. More specifically, hydrogens bonded to borons in the compounds represented by Formulas 1 through 6 are replaceable by substituents which can also replace hydrogens bonded to nuclear carbons in benzene or a substituted benzene. This behavior of the boron-containing entity of Formulas 1 through 6 is particularly surprising in view of the inorganic composition of the group. It is this previously unknown "aromatic character" or "aromaticity" of the boron-containing group which leads to many of the novel compounds of this invention. The substituents which replace the hydrogens, and which fall within the scope of X in the formulas of the compounds of the invention, are defined in more detail in the following paragraphs.

*Group X.*—The compounds of Formulas 1, 2 and 3 can contain a component represented as X which, in its broadest aspects, is defined as a group capable of bonding to carbon of an aromatic compound by replacement of hydrogen, e.g., a group capable of bonding to a nuclear carbon of benzene, naphthalene, xylene, and the like. The group X is present in the compounds of the invention when y has a value of at least 1. In a more restricted sense, X is a group derivable from an electrophilic reagent, i.e., a group which can be bonded to carbon of an aromatic carbocyclic compound by direct electrophilic attack to effect substitution of hydrogen bonded to a nuclear carbon. Preferably, X is a halogen or a monovalent group bonded to boron through nitrogen, carbon, oxygen or sulfur, e.g., for nitrogen: amino, substituted amino, nitroso, nitro, azo and others; for carbon: hydrocarbon groups, e.g., alkyl, alkenyl, alkynyl, aryl, alkaryl and aralkyl and substituted hydrocarbon groups, particularly, α-substituted hydrocarbons, cyano, carboxyl and others; for oxygen: hydroxy, hydrocarbonyloxy and hydrocarbyloxy; and for sulfur: thiol, hydrocarbylmercapto, sulfo, sulfonyl, sulfamyl and others.

The definition of X, as stated above, is based on the close similarity in chemical substitution reactions between the essentially inorganic boron-hydrogen cage of the compounds of the invention and the classical aromatic carbon-hydrogen rings of organic chemistry. X, therefore, represents a broad range of substituents.

The group X can represent a substituent which is introduced by a direct reaction with the parent compound, i.e., a compound of Formulas 5 or 6, or it can represent a substituent obtained by subsequent chemical modification of a group which has been introduced by direct reaction, e.g., a substituent obtained by reduction, esterification, hydrolysis, dehydration or amidation of directly introduced groups. Chemical modification of the substituents can be effected by processes involving single or multiple steps. Substituents which are introduced by direct reaction are, for convenience, referred to as electrophilic groups and these groups form a preferred class of substituents. Thus, in this preferred group, X is a monovalent electrophilic group which is capable of bond-to carbon of a benzene nucleus by reaction of benzene or a substituted benzene (toluene, naphthalene) with an electrophilic reagent. These reagents are defined more fully in later paragraphs.

An electrophilic group, derivable from an electrophilic reagent, is deficient in electrons and has a point of low electron density. Electrophilic groups and reagents which are employed to effect substitution of such groups for the hydrogen on a carbon of a benzene nucleus are described in conventional textbooks of which the following are examples:

Remick, "Electronic Interpretations of Organic Chemistry," p. 53, 100–1, Wiley (1943).

Ingold, "Structure and Mechanism in Organic Chemistry", pp. 198–200, 269–304 (especially pp. 202, 211), Cornell University Press (1953).

Fuson, "Advanced Organic Chemistry," chap. 1, Wiley (1953).

Wheland, "Advanced Organic Chemistry," 2nd ed., p. 83, Wiley (1949).

Examples of electrophilic groups, i.e., substituents which are derivable from electrophilic reagents, which are included within the scope of X are as follows: halogens (F, Cl, Br, I), hydrocarbon, carboxyl $$(-\overset{\overset{O}{\|}}{C}-OH)$$

carbamyl and N-substituted carbamyl $$(-\overset{\overset{O}{\|}}{C}-NH_2, -\overset{\overset{O}{\|}}{C}-NHR', -\overset{\overset{O}{\|}}{C}-NR'_2)$$

halocarbonyl $$(-\overset{\overset{O}{\|}}{C}-Y)$$

where Y is F, Cl, Br, I), halomethyl (—CH$_2$Y', where Y' is F, Cl, Br, I), hydroxy (—OH), hydrocarbyloxy (—OR'), acetal [—CH(OR')$_2$], ketal [—CR'(OR')$_2$], hydrocarbylcarbonyloxy [—OC(O)R'], hydrocarbyloxycarbonyl [—C(O)OR'], isocyanate (—NCO), thiocyanate (—CNS), isothiocyanate (—NCS), hydrocarbylthio (—SR'), hydroxymethyl (—CH$_2$OH), hydrocarbyloxymethyl (—CH$_2$OR'), dihydrocarbylaminomethyl (—CH$_2$NR'$_2$)

cyano (—CN), amino (—NH$_2$), substituted amino (—NHR', —NR'$_2$), trihalomethyl (—CCl$_3$, —CF$_3$, etc.), acyl $$(-\overset{\overset{O}{\|}}{C}-R')$$

aldehyde $$(-\overset{\overset{O}{\|}}{C}-H)$$

nitro (—NO$_2$), nitroso (—NO), azo (—N=N—Ar, where Ar is an aromatic hydrocarbon of up to 10 carbons), sulfo (—SO$_3$H), sulfonyl (—SO$_2$R'), and acetoxymercury $$(-HgO\overset{\overset{O}{\|}}{C}CH_3)$$

R', where used in the above substituents, is a monovalent organic group which is preferably a hydrocarbon group (alkyl, cycloalkyl, alkenyl, cycloalkenyl, aryl, alkaryl, aralkyl, and the like) of at most 18 carbons.

*Description of M.*—The compounds of Formulas 1, 2, 4, and 5 include the group M which is defined as an atom or group of atoms which forms a cation in aqueous solution. More explicitly, M is an atom or group of atoms which in aqueous solution forms a positively charged ion. The sole function of the group M is to provide a positively charged component or cation which will unite with the univalent boron-containing anion and thus permit isolation of the anion in compound form. The novelty of the compounds and, therefore, the invention resides in the boron-containing group and not in the group M in the event this group is present.

The properties of the group M are not critical and this group, therefore, represents a broad range of elements and combinations of elements. To illustrate, M can be hydrogen, hydronium (H$_3$O$^+$), a metal, a metal-water complex, a metal-ammine complex, ammonium (NH$_4^+$), hydrazonium (NH$_2$—NH$_3^+$), N-substituted ammonium, N-substituted hydrazonium, S-substituted sulfonium, P-substituted phosphonium, and the like. To illustrate further, M can be lithium, sodium, cesium, beryllium, barium, magnesium, calcium, strontium, lanthanum, manganese, iron, cobalt, copper, zinc, mercury, aluminum, thallium, tin, lead, silver, or any other metal. As further and more specific examples, M can be R$^4$NH$_3^+$, R$^4_2$NH$_2^+$, R$^4_3$NH$^+$, R$^4_4$N$^+$, (R$^4$NH—NH$_3$)$^+$, (R$^4_2$N—NH$_3$)$^+$ R$^4_3$S$^+$, R$^4_4$P$^+$, [Zn(NH$_3$)$_4$]$^{+2}$, [Co(NH$_3$)$_4$]$^{+2}$,

[Cu(NH$_3$)$_4$]$^{+2}$

[Cu(NH$_2$CH$_2$CH$_2$NH$_2$)$_2$]$^{+2}$, and the like. The substituents represented by R$^4$ in the above illustrations are organic groups whose character or nature is not a critical feature of these cation groups. The substituents represented by R$^4$ can be open-chain or closed-chain, saturated or unsaturated or the substituents can be composed of heterocyclic rings of which the nitrogen is a component, e.g., pyridine, quinoline, morpholine, hexamethyleneimine, and the like. Preferably, R$^4$, for reasons of availability of reactants, is a hydrocarbon group of at most 18 carbons.

Examples of representative and specific compounds are given below solely to illustrate the invention and they are not to be considered as limiting the scope of operable compounds:

B$_{10}$H$_8$·2S(CH$_3$)$_2$,  B$_{10}$H$_8$·2S(C$_4$H$_9$)$_2$,  B$_{10}$H$_8$·2S(C$_{12}$H$_{25}$)$_2$
 B$_{10}$H$_8$·2S(C$_6$H$_{11}$)$_2$,  B$_{10}$H$_8$·2S(CH$_3$)(C$_{18}$H$_{37}$)
  B$_{10}$H$_8$·2O$_2$S(CH$_3$)$_2$,  B$_{10}$H$_8$·2O$_2$S(C$_2$H$_5$)$_2$
   B$_{10}$H$_8$·2O$_2$S(C$_6$H$_{11}$)$_2$,  B$_{10}$H$_8$·2O$_2$S(C$_6$H$_5$)$_2$
  B$_{10}$H$_8$·2O$_2$S(C$_3$H$_5$)$_2$,  B$_{10}$H$_8$·2O$_2$S(C$_6$H$_5$Cl)(C$_2$H$_5$)
   B$_{10}$H$_8$·2O$_2$S(C$_2$H$_3$)$_2$,  B$_{10}$H$_8$·2O$_2$S(C$_6$H$_4$CH$_3$)(C$_2$H$_5$)
    B$_{10}$H$_8$·2P(C$_2$H$_5$)$_3$,  B$_{10}$H$_8$·2P(C$_6$H$_{11}$)$_3$,  B$_{10}$H$_8$·2P(C$_3$H$_7$)$_3$
     B$_{10}$H$_8$·2P(C$_2$H$_5$)$_2$(C$_{12}$H$_{25}$),  B$_{10}$H$_8$·2N(CH$_3$)$_3$
      B$_{10}$H$_8$·2N(C$_6$H$_{11}$)$_3$,  B$_{10}$H$_8$·2N(CH$_3$)(C$_8$H$_{17}$)$_2$
       B$_{10}$H$_8$·2HC(O)NH$_2$,  B$_{10}$H$_8$·2CH$_3$C(O)NH$_2$
        B$_{10}$H$_8$·2HC(O)N(C$_6$H$_{13}$)$_2$
B$_{10}$H$_8$·2CH$_3$C(O)N(C$_{12}$H$_{25}$)$_2$,  B$_{10}$H$_8$·2HC(O)NHC$_{18}$H$_{37}$
 B$_{10}$H$_8$·2HC(O)N(CH$_3$)$_2$,  B$_{10}$H$_8$·2CH$_3$C(O)N(C$_2$H$_5$)$_2$

B$_{10}$H$_8$·2CH$_3$C(O)$\overline{\text{N}}$CH$_2$(CH$_2$)$_3$$\overline{\text{C}}$H$_2$ $B_{10}H_8 \cdot 2C_2H_5CN$, $B_{10}H_8 \cdot 2C_5H_{11}CN$, $B_{10}H_8 \cdot 2C_{11}H_{23}CN$
$B_{10}H_8 \cdot 2C_6H_{11}CN$, $B_{10}H_8 \cdot 2C_6H_5CN$, $NaB_{10}H_9 \cdot S(C_4H_9)_2$
$Mg[B_{10}H_9 \cdot S(C_6H_{11})_2]_2$
$Fe(H_2O)_6[B_{10}H_9 \cdot S(CH_3)(C_2H_5)]_3$
$NaB_{10}H_9 \cdot O_2S(C_2H_5)_2$, $LiB_{10}H_9 \cdot O_2S(C_8H_{17})_2$
$Ca[B_{10}H_9 \cdot O_2S(C_8H_{17})_2]_2$

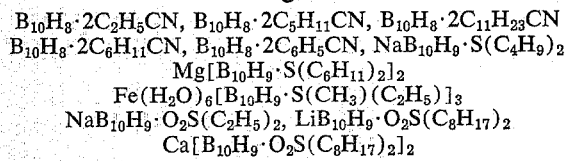

$Hg[B_{10}H_9 \cdot O_2S(C_5H_{11})]_2$, $Pb[B_{10}H_9 \cdot O_2S(C_4H_9)_2]_2$
$NH_4B_{10}H_9 \cdot O_2S(C_2H_5)_2$, $(C_3H_7)_4NB_{10}H_9 \cdot O_2S(C_6H_{11})_2$

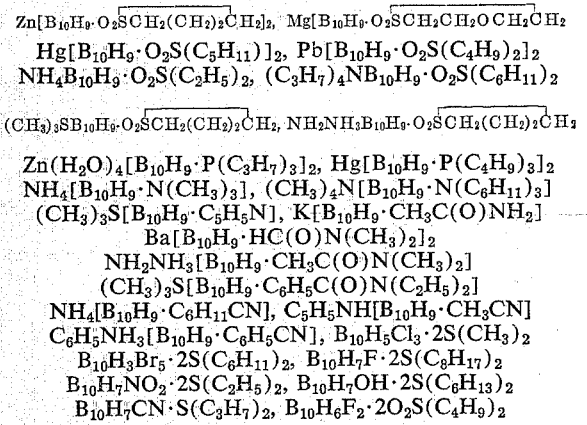

$Zn(H_2O)_4[B_{10}H_9 \cdot P(C_3H_7)_3]_2$, $Hg[B_{10}H_9 \cdot P(C_4H_9)_3]_2$
$NH_4[B_{10}H_9 \cdot N(CH_3)_3]$, $(CH_3)_4N[B_{10}H_9 \cdot N(C_6H_{11})_3]$
$(CH_3)_3S[B_{10}H_9 \cdot C_5H_5N]$, $K[B_{10}H_9 \cdot CH_3C(O)NH_2]$
$Ba[B_{10}H_9 \cdot HC(O)N(CH_3)_2]_2$
$NH_2NH_3[B_{10}H_9 \cdot CH_3C(O)N(CH_3)_2]$
$(CH_3)_3S[B_{10}H_9 \cdot C_6H_5C(O)N(C_2H_5)_2]$
$NH_4[B_{10}H_9 \cdot C_6H_{11}CN]$, $C_5H_5NH[B_{10}H_9 \cdot CH_3CN]$
$C_6H_5NH_3[B_{10}H_9 \cdot C_6H_5CN]$, $B_{10}H_5Cl_3 \cdot 2S(CH_3)_2$
$B_{10}H_3Br_5 \cdot 2S(C_6H_{11})_2$, $B_{10}H_7F \cdot 2S(C_8H_{17})_2$
$B_{10}H_7NO_2 \cdot 2S(C_2H_5)_2$, $B_{10}H_7OH \cdot 2S(C_6H_{13})_2$
$B_{10}H_7CN \cdot S(C_3H_7)_2$, $B_{10}H_6F_2 \cdot 2O_2S(C_4H_9)_2$

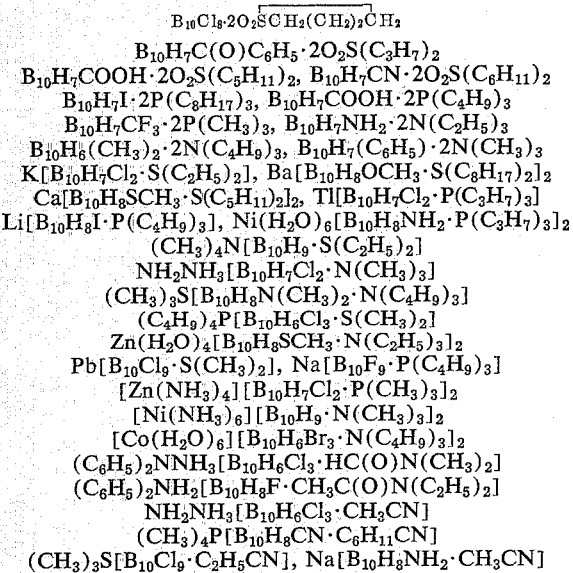

$B_{10}H_7C(O)C_6H_5 \cdot 2O_2S(C_3H_7)_2$
$B_{10}H_7COOH \cdot 2O_2S(C_5H_{11})_2$, $B_{10}H_7CN \cdot 2O_2S(C_6H_{11})_2$
$B_{10}H_7I \cdot 2P(C_8H_{17})_3$, $B_{10}H_7COOH \cdot 2P(C_4H_9)_3$
$B_{10}H_7CF_3 \cdot 2P(CH_3)_3$, $B_{10}H_7NH_2 \cdot 2N(C_2H_5)_3$
$B_{10}H_6(CH_3)_2 \cdot 2N(C_4H_9)_3$, $B_{10}H_7(C_6H_5) \cdot 2N(CH_3)_3$
$K[B_{10}H_7Cl_2 \cdot S(C_2H_5)_2]$, $Ba[B_{10}H_8OCH_3 \cdot S(C_8H_{17})_2]_2$
$Ca[B_{10}H_8SCH_3 \cdot S(C_5H_{11})_2]_2$, $Tl[B_{10}H_7Cl_2 \cdot P(C_3H_7)_3]$
$Li[B_{10}H_8I \cdot P(C_4H_9)_3]$, $Ni(H_2O)_6[B_{10}H_8NH_2 \cdot P(C_3H_7)_3]_2$
$(CH_3)_4N[B_{10}H_9 \cdot S(C_2H_5)_2]$
$NH_2NH_3[B_{10}H_7Cl_2 \cdot N(CH_3)_3]$
$(CH_3)_3S[B_{10}H_8N(CH_3)_2 \cdot N(C_4H_9)_3]$
$(C_4H_9)_4P[B_{10}H_6Cl_3 \cdot S(CH_3)_2]$
$Zn(H_2O)_4[B_{10}H_8SCH_3 \cdot N(C_2H_5)_3]_2$
$Pb[B_{10}Cl_9 \cdot S(CH_3)_2]$, $Na[B_{10}F_9 \cdot P(C_4H_9)_3]$
$[Zn(NH_3)_4][B_{10}H_7Cl_2 \cdot P(CH_3)_3]_2$
$[Ni(NH_3)_6][B_{10}H_9 \cdot N(CH_3)_3]_2$
$[Co(H_2O)_6][B_{10}H_6Br_3 \cdot N(C_4H_9)_3]_2$
$(C_6H_5)_2NNH_3[B_{10}H_6Cl_3 \cdot HC(O)N(CH_3)_2]$
$(C_6H_5)_2NH_2[B_{10}H_8F \cdot CH_3C(O)N(C_2H_5)_2]$
$NH_2NH_3[B_{10}H_6Cl_3 \cdot CH_3CN]$
$(CH_3)_4P[B_{10}H_8CN \cdot C_6H_{11}CN]$
$(CH_3)_3S[B_{10}Cl_9 \cdot C_2H_5CN]$, $Na[B_{10}H_8NH_2 \cdot CH_3CN]$ and the like. Further illustrations of compounds of the invention are:

$(CH_3)_3S[B_{10}H_9 \cdot S(CH_3)_2]$
$(CH_3)_4P[B_{10}H_9 \cdot HC(O)N(CH_3)_2]$
$C_6H_5(CH_3)_2NH[B_{10}H_7Cl_2 \cdot CH_3C(O)NH_2]$
$C_6H_5CH_2NH_3[B_{10}H_7Cl_2 \cdot CH_3C(O)N(CH_3)_2]$
$(H_3O)B_{10}H_6Cl_2I \cdot S(CH_3)_2$, $(H_3O)B_{10}H_8F \cdot N(C_2H_5)_3$
$NaB_{10}H_8COOH \cdot P(CH_3)_3$, $KB_{10}H_8OH \cdot HC(O)N(C_2H_5)_2$
$LiB_{10}H_8NO_2 \cdot S(C_3H_7)_2$ and the like.

Other examples are:

$B_{10}H_8 \cdot 2S(CH_2CH_2CH_2OH)_2$
$B_{10}H_8 \cdot 2S(CH_3)(CH_2CH_2F)$, $B_{10}H_8 \cdot 2S(CH_2CH_2Br)_2$
$B_{10}H_8 \cdot 2S(CH_3)[CH_2CH_2C(O)NH_2]$
$B_{10}H_8 \cdot 2S[CH_2CH_2C(O)OC_2H_5]_2$
$B_{10}H_8 \cdot 2S(CH_3)(CH_2CH_2CN)$, $B_{10}H_8 \cdot 2S(CH_2CH_2NH_2)_2$
$B_{10}H_8 \cdot 2S[CH_2CH_2NHC(O)CH_3]_2$
$B_{10}H_8 \cdot 2S[CH_2CH_2C_6H_4OH]_2$
$B_{10}H_8 \cdot 2S[CH_2CH_2CH_2C(O)ONa]_2$
$B_{10}H_8 \cdot 2S[CH_2CH_2C(O)N(CH_3)_2]_2$
$B_{10}H_8 \cdot 2S[CH_2CH_2CH_2CH_2C(O)ONH_4]_2$
$B_{10}H_7(CH_3) \cdot 2S[CH_2CH_2C(O)OH]_2$
$B_{10}H_8 \cdot 2S[CH_2CH_2NHC(O)N(CH_3)_2]_2$
$NaB_{10}H_9 \cdot S(CH_2CH_2Cl)_2$, $KB_{10}H_9 \cdot S[CH_2CH_2C(O)OK]_2$
$[(CH_3)_3NH]B_{10}H_9 \cdot S[CH_2CH_2C(O)ONH(CH_3)_3]_2$ $B_{10}Cl_8 \cdot 2S(CH_2CH_2F)_2$, $B_{10}F_8 \cdot 2S(CH_2CH_2COOH)_2$
$B_{10}H_7SO_3H \cdot 2S(CH_3)_2$
$B_{10}Br_8 \cdot 2S[CH_2CH_2C(O)OC_2H_5]_2$
$B_{10}H_6(OH)_2 \cdot 2S(CH_2CH_2OH)$
$B_{10}H_7NH_2 \cdot 2S(CH_2CH_2NH_2)_2$
$B_{10}H_7COOH \cdot 2S(CH_2CH_2COOH)_2$
$KB_{10}H_8[C(O)OK] \cdot S(CH_2CH_2COOK)_2$ and the like.

Naming of compounds of the invention

It is noted that no official system of naming of boron compounds has been adopted at the present time. The nomenclature used herein follows the proposals made by a group of the Committee on Nomenclature of the American Chemical Society Division of Organic Chemistry. These proposals are discussed in (1) a paper presented by G. W. Schaeffer at the American Chemical Society Meeting, San Francisco, California, April 13–18 (1958), (2) a paper presented by K. L. Loening to the Division of Chemical Literature, American Chemical Society Meeting, Chicago, Illinois, September 7–12 (1958), and (3) a publication by Patterson, Chemical Engineering News 34, 560 (1956). The nomenclature is also in accordance with the system published in "Nomenclature of Inorganic Chemistry—1957," p. 72, International Union of Pure and Applied Chemistry, Butterworths Scientific Publications (London), 1959. Names assigned to non-ionic boron compounds end in "ane" with the number of hydrogens originally present in the compound shown in parentheses, e.g., $B_{10}H_{14}$ is tetradecahydrodecaborane(14), $B_{10}H_8 \cdot 2S(CH_3)_2$ is bis(dimethylsulfide)octahydrodecaborane(8) and $B_{10}Cl_5H_3 \cdot 2N(C_2H_5)_3$ is bis(triethylamine) pentachlorotrihydrodecaborate(8). Names assigned to ionic boron compounds end in "ate" with the valence of the boron-containing ion designated in parentheses by numeral and charge sign. Thus, $Na_2B_{10}H_{10}$ is disodium decahydrodecaborate(2−), $$NaB_{10}H_9 \cdot S(CH_3)_2$$

is sodium (dimethylsulfide)nonahydrodecaborate(1−), and $(CH_3)_4NB_{10}H_5Cl_4 \cdot HC(O)N(CH_3)_2$ is tetramethylammonium (dimethylformamide)tetrachloropentahydrodecaborate(1−).

Properties and characteristics of the new compounds

In physical properties, the new compounds range from liquid products to solid products which are stable at conventional atmospheric temperatures and pressures. The products normally are colorless or white and, if solid, they are usually crystalline. However, the color or other physical characteristics are determined to some extent by the substituent X and by the group Z. Thus, $$HB_{10}H_9C(O)C_6H_5 \cdot S(CH_3)_2$$

is an orange-colored solid. In the event X bears a chromophoric group (e.g., an azo group), the color of this group may be imparted to the final compound.

Many of the compounds dissolve to some extent in water or hydroxylated solvents, e.g., alcohols. The compounds fall into two groups in their behavior in water. The compounds of Formula 2 are ionic in character, i.e., they behave like salts and form ions in solution. The compounds of Formula 3 are neutral, i.e., they are not salt-like in character and they do not form ions.

The ionic and electrically neutral compounds of the invention, i.e., the compounds of Formulas 2 and 3, do not reduce solutions of silver nitrate. The compounds which bear hydrogen bonded to boron react smoothly with halogens with minimum side reactions to form halogen substituted derivatives.

Preparation of the new compounds

Processes for preparing the compounds of the invention employ decahydrodecaborates, either directly or indirectly, as reactants which are the source of boron.

Decahydrodecaborates, employed directly, are used generally in the form of hydrates of the acid, ammonium or substituted ammonium salts or metal salts. The decahydrodecaborates are reacted with sulfoxides, sulfones, phosphine oxides, amine oxides, amides, nitriles, and the like, to arrive at the desired products.

In other procedures, the decahydrodecaborates are modified, as a first step, to obtain non-ionic or ionic compounds in which a number of the hydrogens bonded to the borons in the $B_{10}H_{10}^{-2}$ anion are replaced by reactive groups. The modified boron-containing products, of which $B_{10}H_8 \cdot 2N_2$, $B_{10}H_8 \cdot N_2 \cdot SR_2$, and the like are examples, are then reacted with appropriate reagents to obtain the compounds of the invention.

Thus, a wide range of processes are available which can be used separately or in combination to provide versatile routes to the new products.

The principal reactants, i.e., the decahydrodecaborates, are presently not generally available materials. They are compounds of the formula $M_{a'}(B_{10}H_{10})_{b'}$, where M is a group which can form a cation as defined for Formula 1, and $a'$ and $b'$ are whole positive numbers whose values are determined by the valence of M, i.e., $a'$ multiplied by the valence of M is equal to $2b'$. The group $B_{10}H_{10}$ in the formula is divalent. The group M, in a preferred class of reactants, is hydrogen (or, in its hydrated form, hydronium), an alkali metal (i.e., Li, Na, K, Rb or Cs) or ammonium ($NH_4$). In an especially preferred group of decahydrodecaborate($2^-$) reactants, M is H, Na, K or $NH_4$. These are represented by the formulas $$H_2B_{10}H_{10} \cdot nH_2O$$

(where $n$ is a positive number of preferably 4–20), $$Na_2B_{10}H_{10}$$

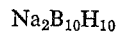

$K_2B_{10}H_{10}$ and $(NH_4)_2B_{10}H_{10}$. The salts can be used as hydrates and, in fact, they are frequently used in this form.

Decahydrodecaborates are obtained by relatively simple methods from a decaborane(12)/organic sulfide compound of the general formula $B_{10}H_{12} \cdot 2USU'$, where U and $U'$ are hydrocarbon groups, preferably alkyl. The compound is prepared by reacting an organic sulfide of the formula $USU'$ with decaborane(14), i.e., $B_{10}H_{14}$, at a temperature between 0° and 150° C. until approximately one mole of hydrogen is evolved. The decaborane(12)/organic sulfide adduct is then reacted with liquid ammonia or an amine at a temperature between about —50° C. and 0° C. for about one hour to obtain the salt $M_2B_{10}H_{10}$, where M represents the cation obtained from ammonia or the amine. Thus, with liquid ammonia as the reagent, M is $NH_4^+$; with methylamine, M is $CH_3NH_3^+$; and with tertiary butylamine, M is $(CH_3)_3CNH_3^+$.

(1) *Process A.*—A principal and generic process for obtaining the compounds of Formulas 5 and 6, referred to as parent compounds, in which Z is a sulfide, phosphine or tertiary amine consists in reacting in an acidic environment (1) a decahydrodecaborate($2^-$) of the formula $M_{a'}(B_{10}H_{10})_{b'}$, as described in the preceding paragraphs and (2) a sulfoxide, phosphine oxide or tertiary amine oxide.

The sulfoxides, phosphine oxides and amine oxides are members of a well-known group of compounds which can be represented by the formula $Z \rightarrow O$, where Z is $R_2S$, $R_3P$, or $R_3N$, and R has the meaning defined in a previous paragraph for the sulfides, phosphines and amines. The R groups can be alike or different. The examples given earlier for these groups are illustrative for this reactant. In the event $(NH_4)_2B_{10}H_{10}$ is used as the boron-containing reactant, a trisubstituted phosphone ($R_3P$) can be used, if desired, in place of the phosphine oxide to obtain compounds in which Z is a trisubstituted phosphine.

The acidic environment in which the reaction is performed can be supplied by a third component whose acid strength is at least equal to the strength of a mineral acid, e.g., hydrochloric acid, i.e., a strong acid. The acid environment can be supplied by employing, for example $H_2B_{10}H_{10}$, gaseous hydrogen halides (e.g., HCl), concentrated phosphoric acid, and the like.

The reaction may be represented schematically by the following equation, where M is a monovalent group:

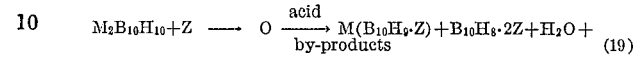

(19)

The above equation is not intended to reflect the molar proportions in which the reactants are employed.

The reaction is conducted in conventional vessels with corrosion-resistant inner surfaces, e.g., glass, platinum, poly(tetrafluoroethylene)resin, and the like. The vessel is charged with the decahydrodecaborate($2^-$) and the oxide ($Z \rightarrow O$) at atmospheric temperature and atmospheric pressure. The reactants are mixed and the acidic component is added to the mass with stirring. Agitation is continued until the reaction has proceeded to give the desired yield of product. The reaction is exothermic and, where large quantities of reactants are employed, it is generally necessary to provide means for cooling the reaction mass. Processing the mixture to isolate the desired products is accomplished by conventional precedures using readily available solvents. In one procedure, the reaction mixture is filtered to separate solid by-products and the filtrate is stirred with water. The solid which forms is a compound of Formula 6 and, after separation, it is purified further by crystallization from oxygenated solvents, such as alcohol, acetone, aqueous alcohol or aqueous acetone. The aqueous filtrate from the reaction mixture is extracted with an organic ether, e.g., diethyl ether, and the residual aqueous layer is concentrated in volume to yield a solid product which is a compound of Formula 5. This product is purified by reaction with a salt whose cation M forms a compound of Formula 5 of low water-solubility, e.g., M can be $R^2_4N^+$.

In an optional mode of processing the reaction mixture, the mixture is diluted with an aromatic hydrocarbon, e.g., benzene, and the mixture is filtered to remove insoluble by-products. The filtrate is extracted with a saturated hydrocarbon, e.g., ligroin, n-hexane, n-heptane, cyclohexane, and the like, and the portion which remains is diluted with water. The desired boron compounds, principally products of Formula 6, separate and they are purified as described previously.

The mole ratios in which the reactants are employed is not a critical factor in the precess. The ratio, moles $M_2(B_{10}H_{10})$/moles $Z \rightarrow O$, can lie between about 0.1 and 10, preferably the ratio lies between about 0.5 and 2.5. These ratios are preferred solely to provide good yields of the desired products. The acid component is normally used in sufficient quantity to combine with the cation M although it is not essential to use this quantity of acid component.

The temperature at which the reaction is conducted is not critical. Normally the process is operated at prevailing atmospheric temperature but lower and higher temperatures are operable. The use of very low or very high temperatures offers no advantages. Satisfactory operation is generally found within a temperature range of —20° C. to 110° C., preferably a temperature within the range of 0° to 75° C. is employed. The reaction is exothermic and the temperature, if necessary, can be controlled by means of cooling media such as ice, mixtures of ice and water, solutions of solid carbon dioxide in organic solvents and similar conventional means.

The pressure at which the process is operated is not critical. Atmospheric pressure is satisfactory and it is the pressure most conveniently used. However, the pressure can be subatmospheric or superatmospheric, if it is more convenient to operate under these conditions, e.g., the pressure can lie between about 0.1 atmosphere and 10 atmospheres.

The reaction proceeds rapidly and the time in which the reactants are in contact is not a critical factor. For a batch process, the time can lie between about 5 minutes and 24 hours. However, a continuous flow process can be employed wherein the reactants are fed continuously into one end of a reaction tube and maintained in contact for a brief period, e.g., 0.1–0.5 second, with very efficient mixing and the reaction mixture containing the desired product is discharged continuously from the other end of the tube.

Optionally, the reaction can be conducted in an inert liquid reaction medium. Operable liquid media include hydrocarbon ethers or hydrocarbons which preferably are free of aliphatic unsaturation, i.e. olefinic and acetylenic bonds. Examples of liquid media which can be employed are benzene, xylene, cyclohexane, heptane, diethyl ether, dibutyl ether, and the like. Glacial acetic acid is also operable as a reaction medium. The use of an inert liquid medium is not essential for operability.

(2) *Process B.*—This process, which is a modification of Process A, is a second generic procedure for obtaining the compounds of the invention. Decahydrodecaborates of the formula $M_{a'}(B_{10}H_{10})_{b'}$, as defined in Process A, are reacted (1) with a nitrosating agent, e.g., $HNO_2$, and (2) with a reducing agent, e.g., nascent hydrogen, to obtain an inner diazonium salt which has a characterizing group of the formula $—B_{10}H_8·N_2—$. The intermediate diazonium salt can be non-ionic, e.g., $B_{10}H_8·2N_2$, or it can be ionic e.g., $M(B_{10}H_9·N_2)_b$, where M is a cation as defined previously whose valence is b. The inner diazonium salts are reacted with appropriate Z compounds, e.g., sulfides, sulfones, tertiary amines, tertiary phosphines, amides or nitriles to obtain the compounds of the invention.

The above procedure is an especially preferred method for the prepartion of compounds of the invention in which Z is a tertiary amine, tertiary phosphine, or a nitrile.

In an optional method of operation of Process B, a decahydrodecaborate salt is reacted as described in Process A to obtain a compound of Formula 5, i.e., $M(B_{10}H_9·Z)_b$. This compound is then reacted with nitrous acid and subsequently reduced to obtain an inner diazonium compound of the general formula $B_{10}H_8·N_2·Z$. The non-ionic compound thus obtained is reacted further with an appropriate member of the Z group of compounds to obtain a compound of the invention in which the Z groups are, most frequently, unlike. This modified procedure is, in fact, most useful in obtaining non-ionic compounds in which the Z groups are dissimilar.

Conditions for the reaction with nitrous acid and subsequent reduction are simple. These steps in the process are conducted in the manner of conventional reactions employing nitrous acid in aromatic chemistry. An acidified solution of an alkali metal nitrite, e.g., $NaNO_2$ in hydrochloric acid solution, is normally employed to which a solution of the decahydrodecaborate salt is added. The reaction is usually conducted at a low temperature, e.g., at 0° C. or lower, and a precipitate forms during the operation. This precipitate is separated, redissolved in an alcohol or aqueous alcohol solvent and an appropriate reducing agent is added, e.g., an alkali metal hydroborate ($NaBH_4$), or a combination of reagents which provide active hydrogen, e.g., a metal with a mineral acid (Zn or Fe with HCl). The compound having the inner diazonium structure, i.e., one or two $·N_2—$ units, is isolated by evaporation or precipitated by dilution of the solution with water.

The process is conducted most conveniently at atmospheric pressure and within a temperature range of about 0° C. to 50° C. Pressure, temperature and mole ratios of reactants are not factors which require critical control. The discussion of these factors, given for Process A, can be applied equally well to the operation of Process B.

The preparation of inner diazonium salts employed as reactants in the above process is fully described in my copending application, Ser. No. 186,270, filed January 11, 1962, now abandoned and refiled as Ser. No. 324,885 on November 19, 1963.

(3) *Process C*—(for preparing compounds where Z is a sulfone, or an amide).—This process employs as reactants (1) a decahydrodecaborate($2^-$) salt previously described, (2) a sulfone or amide derived from a carboxylic acid, and (3) a strong organic or inorganic acid. The sulfone or amide and a decahydrodecaborate salt, e.g., $(NH_4)_2B_{10}H_{10}$ or $Na_2B_{10}H_{10}$, are mixed to form a solution and a hydrogen halide, e.g., hydrogen chloride, is bubbled through the mixture. Optionally, a strong organic acid, e.g., an arylsulfonic acid, can be employed in place of a hydrogen halide. The reaction is exothermic and proceeds rapidly. To obtain the non-ionic species as the principal product, heat is applied to the reaction mixture after the exothermic phase has passed and passage of the hydrogen halide is continued for a further period. To obtain the ionic species as the principal product, passage of hydrogen halide is stopped when the exothermic phase is over, as evidenced by a drop in temperature and no further heat is applied. In either case the reaction mixture is processed by conventional methods. Insoluble material is removed by filtration. The filtrate is diluted with water and the non-ionic species, if present, precipitates and is separated. The remaining clear solution is reacted with a solution of a compound which contains the cation M, desired in the final product. Thus, the solution can be reacted with an inorganic base, an organic base, an inorganic salt, an organic salt, and the like. To illustrate, the solution can be mixed with NaOH, CsOH, $Ba(OH)_2$, $NH_3$, $NH_4OH$, hydrazine, substituted amines, tetrasubstituted nitrogen bases, pyridine, trialkylsulfonium hydroxides, tetraalkylphosphonium hydroxides, and the like, to obtain compounds in which M covers a broad range of cations. Salts which can be used as reactants are, for example, chlorides, carbonates, acetates of metals or organic bases of the kind illustrated above. This step in the process is a simple metathetic reaction and its many variations are well-known in chemical processes.

The preferred amides for use in the process are formamides and acetamides in which the nitrogen, preferably, bears two hydrocarbon substituents, i.e., compounds of the formula

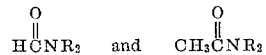

in which R represents a hydrocarbon group as defined earlier for the Lewis bases. However, carboxylic amides generically are operable as reactants, e.g., acetamide, isobutyramide, cyclohexanecarboxamide, benzamide, N,N-dimethylmethacrylamide, N - methyloleylamide, N,N-diethylstearamide, N,N-dicyclohexylbenzamide, and N,N-dipropyltoluamide.

Preferred sulfones are compounds of the formula $R_2{}^2SO_2$, where $R^2$ is a hydrocarbon group as defined earlier.

The products obtained in this process can, if desired, be purified by crystallization from conventional solvents, e.g., water, alcohol, glacial acetic acid, and the like.

(4) *Process D*—(a general process for compounds having X groups, i.e., groups derived from electrophilic reagents).—Compounds of Formulas 1, 2, and 3 in which the value of y is at least 1 are prepared by employing the following reactants:

(a) A compound of Formula 4 which includes the two subgeneric groups represented by Formulas 5 and 6.

(b) A reagent capable of introducing a monovalent substituent, called herein an electrophilic group, into a benzene nucleus by replacement of hydrogen bonded to a carbon of said nucleus. This reactant is referred to as an electrophilic reagent and it is discussed in more detail in the following paragraphs.

For preparation of compounds which bear two or more X groups which are different, e.g., —SCH₃ and Cl, a compound of Formula 1 can be employed as the boron-containing reactant which contains at least one hydrogen and at least one X group bonded to boron atoms.

Electrophilic reagents which are broadly operable in the process are reagents which will effect direct substitution of hydrogen bonded to carbon of a benzene nucleus, i.e., the hydrogen is replaced by a group derived from the electrophilic reagent. Electrophilic reagents are compounds which react by acquiring electrons or acquiring a share in electrons which previously belonged to a foreign molecule (see Ingold, vide supra, p. 201). Examples of electrophilic reagents which are within the scope of the above definition and which are operable in the process of the invention are given below, together with the substituent group which in the process is bonded to boron in the final product.

| Electrophilic reagent | Electrophilic group bonded to boron |
|---|---|
| Halogens ($F_2$, $Cl_2$, $Br_2$, $I_2$) | Halogen (F, Cl, Br, I) |
| Nitric acid | —$NO_2$ |
| $H_2NOSO_3Na$ | —$NH_2$ |
| Olefins | —alkyl [e.g., —$C_2H_5$, —$CH(CH_3)_2$] |
| Alkyl halides | —alkyl |
| Acyl halides | $-\overset{O}{\overset{\|}{C}}-R^5$ |
| $Hg(O\overset{O}{\overset{\|}{C}}CH_3)_2$ | $-HgO\overset{O}{\overset{\|}{C}}CH_3$ |
| $(CN)_2C=C(CN)_2$ | —(CN)C=C(CN)₂ |
| $COCl_2$ | $-\overset{O}{\overset{\|}{C}}Cl$ |
| CO/HCl | $-\overset{O}{\overset{\|}{C}}H$ |
| $C_6H_5N(CH_3)CHO/POCl_3$ | $-\overset{O}{\overset{\|}{C}}H$ |
| $R^5SO_2Cl$ | —$SO_2$—$R^5$ |
| $R_2^5N\overset{O}{\overset{\|}{C}}Cl$ | $-\overset{O}{\overset{\|}{C}}NR_2^5$ |
| $R^5\overset{O}{\overset{\|}{C}}H$ and $R_2^5CO$ | —$OR^5$ |
| ($H_3O$)⁺Cl⁻ (hydronium salt) | —OH |
| $R^5SCl$ | —$SR^5$ |

In the above groups, $R^5$ is a monovalent organic radical, preferably hydrocarbon of at most 18 carbons, which can be alkyl, alkenyl, cycloalkyl, cycloalkenyl, aryl, alkaryl, aralykyl, and the like.

In the reactions employing the above electrophilic reagents, a catalyst may be used, e.g., aluminum trichloride, boron trifluoride and polyphosphoric acid. These catalysts are employed in the same manner as in the well-known procedures in organic chemistry. In some cases the boron compounds themselves function as catalysts, e.g., in alkylation of compounds of the formula $H(B_{10}H_9·Z)$.

The electrophilic reagents employed in the process are materials which are usually readily available or which are obtained by conventional methods.

Reaction of the boron compounds of Formulas 5 and 6 with the electrophilic reagent is conducted in conventional vessels with corrosion-resistant inner surfaces, e.g., glass, platinum, poly(tetrafluoroethylene)resin, and the like. The boron-containing reactant, and optionally an inert liquid solvent, is charged into the reaction vessel.

The electrophilic reactant is then supplied to the reaction vessel at a temperature and at a rate which will provide a controllable reaction and which will bring the reaction to completion within a reasonable time. When electrophilic reagents are employed which are hydrolytically stable, water or alcohols (methanol, ethanol) can be used conveniently as a solvent for the reaction. Other solvents can be used, for example, diethyl ether, benzene, heptane, carbon tetrachloride, carbon disulfide, and the like.

The temperature at which the reaction is conducted will be determined largely by the reactivity of the electrophilic reagent. In general, the temperature will be between about —20° and 200° C. Preferably, the temperature will be between about 0° and about 150° C.

The time of reaction in a batch process will also depend to a considerable extent on the reactivity of the electrophilic reagent. The reaction generally proceeds rapidly and, with thorough mixing of the reactants, the time may be as low as 5 minutes or even less. Generally a reaction time between about 10 minutes and 5 hours is sufficient. It is desirable and advantageous to mix the reactants by any suitable means although mixing is not essential for operability.

The reaction can be conducted under pressure, if desired, but it is not essential to use pressure. In most cases the reaction proceeds satisfactorily at atmospheric pressure.

The proportions in which the reactants are used are not critical. It is preferable, in order to obtain maximum yield of desired product, to use at least one mole of the electrophilic reagent for each hydrogen which is to be replaced on the boron-containing reactant. It is not essential, however, that these ratios be used.

The compounds are purified by well-known and recognized procedures. For stable products, conventional crystallization procedures are used, employing water or inert organic solvents, e.g., benzene, alcohol. Solutions of the products can be treated with absorptive agents, e.g., activated carbon or silica gel, to absorb the major portion of the impurities.

(5) *Process E.*—(optional method for preparing compounds bearing X groups).—The compounds of Formulas 2 and 3 which bear at least one X group can be obtained by a modification of the general processes designated as A and C. In the modified process, a boron-containing reactant is employed in which the desired X group or groups are already present. The substituted decahydrodecaborate, which contains at least one X group and at least one hydrogen bonded to boron, is reacted with the sulfoxide, phosphine oxide or amine oxide, i.e., the group of reactants previously described as Z→O, or with an amide as described in processes A and C.

The conditions described previously for processes A and C apply to the present optional procedure and the discussion of the conditions and modifications of the reactants need not be repeated here. It is emphasized that the previous discussion of the Z→O and amide reactants is fully applicable to the present process.

The substituted decahydrodecaborates employed as one reactant in this mode of operation are a class of compounds which have not been described previously in the literature. This group of reactants is represented by the general formula $$M_a(B_{10}H_{10-y'}X_{y'})_b \qquad (20)$$

where M and X are defined as in Formula 1: $y'$ is a whole number of 1–9, inclusive; $a$ and $b$ are whole numbers of 1–3, inclusive, whose values are determined by the valence of M according to the equation:

$$b = \frac{ax \text{ valence of } M}{2}$$

The substituted polyhydrodecaborates represented by Formula 20 are obtained by reacting a decahydrodecaborate salt with an electrophilic reagent as described in Process D, employing the compounds of Formula 20 in place of the compounds of Formulas 5 and 6. The decahydrodecaborate salts are described fully in the paragraphs under Process A.

The preparation of substituted polyhydrodecaborates which fall within the scope of Formula 20 is further described in my copending application Serial No. 237,392, filed November 13, 1962.

The operation of Process B can also be modified, as described above for Processes A and C, by employing as a reactant a boron-containing diazonium compound in which the desired X group or groups are present. The substituted compounds employed as reactants in this modification of Process B are represented by the following general formulas:

$$M(B_{10}H_{9-s}X_s \cdot N_2) \qquad (20a)$$

and $$B_{10}H_{8-t}X_t \cdot 2N_2 \qquad (20b)$$

where M, X and b are defined as in Formula 1; s is a positive whole number of 1–8, inclusive and t is a positive whole number of 1–7, inclusive. The compounds of Formulas 20a and 20b are obtained by substitution processes as described in Process D, employing $M(B_{10}H_9 \cdot N_2)b$ and $B_{10}H_8 \cdot 2N_2$ as the initial reactants. The substituted compounds of Formulas 20a and 20b and their preparation are also fully described in my copending application Serial No. 186,270, filed April 9, 1962 now abandoned and refiled as Ser. No. 324,885 on November 19, 1963.

The procedures described above provide a range of methods for obtaining the compounds of the invention. Combinations of these procedures can be employed and many variations can be used which are within the knowledge of a skilled chemist. To illustrate, a decaborate of Formula 20 bearing X groups of one kind, e.g., acetyl, can be reacted with an oxide of the formula Z→O, a sulfone, an amide, or nitrile and the resulting product can then be reacted with an electrophilic reagent to provide a different X group, e.g., bromine, to obtain a compound of the Formula 1 in which the X groups in this instance are acetyl and bromine.

(6) *Process F*—(method for preparing compounds in which X is —SR).—Compounds of the invention of Formula 2 in which X is —SR, Z is —SR₂ and y is 1, are obtained readily by a process which employs the following as reactants:

(a) $B_{10}H_8 \cdot 2SR_2$, i.e., a species of the compounds of Formula 7, where y=0 and R is defined as in the discussion of Formula 1.

(b) A trisubstituted phosphine ($R_3P$), where R is defined as in Formula 1, and is preferably an alkyl group of at most 8 carbons; or an alkali metal phthalimide in which the alkali metal is sodium or potassium.

The preparation of the first reactant, $B_{10}H_8 \cdot 2SR_2$, has been described in previous paragraphs. The group of compounds from which the second reactant is selected are readily available and well-known compounds, i.e., tertiary phosphines and alkali metal phthalimides.

The process is conducted most conveniently by simply mixing the reactants in a corrosion-resistant vessel at atmospheric pressure and heating the mixture until the reaction proceeds at a satisfactory rate to bring it to completion within a desired time. The reactants can, if desired, be mixed in an inert liquid medium to assist in maintaining good contact between the components. This mode of operation is generally employed where both reactants are solids at the operating temperature, e.g., in the process employing an alkali metal phthalimide. Inert liquid media are liquids which do not enter into the reaction under the conditions employed and which are recovered unchanged. Classes of operable inert liquid media are N,N-disubstituted amides, nitriles, esters, and the like. Specific examples of liquid media are N,N-dimethylformamide, N,N-dimethylacetamide, acetonitrile, ethyl benzoate, and the like. When one reactant is a liquid at operating temperature, e.g., a trialkylphosphine, the reaction is readily conducted in the absence of any other liquid medium.

As in the description of previous processes, mole ratio of reactants, time of reaction, and pressure are not critical features in the operation of the process. The ratios, moles $B_{10}H_8 \cdot 2SR_2$/moles $R_3P$ or moles $B_{10}H_8 \cdot 2SR_2$/moles phthalimide, can lie between about 0.2 and 4, preferably these ratios lie between 0.5 and 2.0. Pressure can be superatmospheric, atmospheric or subatmospheric but for convenience and simplicity, the operation is normally performed at atmospheric pressure. The temperature of the reaction employing phosphines will usually lie between about 140° and 250° C.; with phthalimides as reactants, the temperature is generally between about 100–150° C. In many cases the temperature at which the liquid medium or liquid reactant refluxes is employed as a convenient means of controlling the reaction.

(7) *Process G*—(methods for obtaining compounds in which the R groups in Z are dissimilar).—Compounds in which the R groups in Z, e.g., in $SR_2$, $PR_3$, and $NR_3$, are unlike are obtained as described earlier in Process B and they can also be obtained in general Process A by employing sulfoxides, phosphine oxides and amine oxides as reactants in which the groups bonded to sulfur, phosphorus or nitrogen are unlike. To illustrate, methyl phenyl sulfoxide, dimethyl tolyl phosphine oxide, N-dimethyl-N-butylamine oxide, and the like can be used as reactants to obtain, e.g., $B_{10}H_8 \cdot 2S(CH_3)(C_6H_5)$, $$MB_{10}H_9 \cdot 2P(CH_3)_2(C_6H_5)$$

and $B_{10}H_8 \cdot 2N(CH_3)_2(C_4H_9)$.

Optionally, in the general Process A, the reaction can be conducted with one Z→O reactant until the ionic compound of Formula 2 or 5 is obtained. The ionic product is then reacted with a second and different Z→O. To illustrate, $MB_{10}H_9 \cdot S(C_3H_7)_2$ is prepared by employing $(C_3H_7)_2S=O$, in the first step of the reaction, the ionic product is isolated and then reacted with a second sulfoxide, e.g., $(C_2H_5)_2S=O$, to obtain $$B_{10}H_8 \cdot S(C_2H_5)_2 \cdot S(C_3H_7)_2$$

A third process employs as reactants (1) a compound of the formula $MB_{10}H_8SR \cdot SR_2$, obtained by Process F, and (2) an organic sulfate $(R^6)_2SO_4$, where $R^6$ is a monovalent organic group which can be the same as but, preferably, is different than R. Thus, by employing a boron reactant in which R is alkyl and a sulfate in which $R^6$ is aryl, a compound of Formula 7 can be obtained in which one R is alkyl and one R is aryl. It is thus obvious that the process is versatile and that it provides means of obtaining non-ionic compounds having a wide range of substitutents.

The compound $MB_{10}H_8SR \cdot SR_2$, employed as one reactant, is fully described in all its variations in Process F in which it is a final product. It need not be discussed further in the third process, referred to above.

The group $R^6$ in $(R^6)_2SO_4$ can be an organic group, preferably hydrocarbon. For reasons of availability, reactants are preferred in which $R^6$ is an aliphatically saturated hydrocarbon of up to 18 carbons. Thus, $R^6$ can be alkyl, cycloalkyl, aryl, alkaryl or aralkyl. Examples of compounds which can be employed as reactants in the process are dimethyl sulfate, diethyl sulfate, diphenyl sulfate, and the like.

The process is conducted most conveniently by mixing the reactants in an inert solvent, i.e., a solvent which is unreactive with the components, in a corrosion-resistant vessel. The pressure employed is normally atmospheric although lower or higher pressures can be used if desired. The temperature of the reaction is not critical and it will usually lie between 0° and 225° C. The optimum temperature will depend to some extent on other conditions of the reaction, for example, reactivity of the components, time of reaction, pressure employed, and effectiveness of contact. Determination of the optimum combination of conditions which can be used is well within the skill of a competent chemist.

The ratio in which the reactants are employed is not critical. Normally the ratio, moles $MB_{10}H_8SR \cdot SR_2/$ moles $(R^6)_2SO_4$, will lie between 0.1 and 10, preferably between 0.5 and 5.

In an especially preferred method of operation, a water-miscible liquid reaction medium is employed, e.g., dimethylformamide. Upon completion of the reaction, the mixture can be diluted with water which results in precipitation of the desired compound. This mode of operation, therefore, permits easy isolation of the final product.

(8) *Modification of X groups.*—The X groups introduced by direct reaction of polyhydrodecaborates with electrophilic reagents can undergo further modification by conventional chemical processes, e.g., reduction, esterification, hydrolysis, oxidation, amidation, diazotization, and the like. To illustrate, nitro groups are reduced by iron and aqueous acid to amino groups, by lithium aluminum hydride to azo and hydrazo groups; carboxy groups are reacted with alcohols to form esters, with ammonia or amines to form amides, with phosphorus halides to form acyl halides; sulfonyl halide groups are reacted with ammonia or amines to form sulfonamides; diazonium halide substituents are coupled with aromatic compounds to form azo-type linkages; cyano groups are hydrolyzed to amide groups and carboxyl groups; etc. These reactions are well known and fully described in texts on organic chemistry and the methods described in such texts are useful in modifying the X groups in the new compounds of the invention. For a description of organic aromatic reactions, see, for example, Wagner and Zook, "Synthetic Organic Chemistry," John Wiley & Sons, Inc. (1953).

(9) *Metathetic reactions.*—Compounds of Formula 1 wherein M covers a wide range of cations are obtained by simple metathetic reactions employing, e.g., the ammonium or tetraalkylammonium salts obtained in the processes described earlier. To illustrate, an aqueous solution of a compound of Formula 1 where M is $NH_4^+$ is contacted with a strong acid or with a strongly acidic cation exchange resin to obtain the free acid, i.e., a compound of Formula 1 in which M is H. The acid, generally in solution, is reacted with oxides of metals, hydroxides of metals, salts of metals (both organic and inorganic), nitrogen bases, sulfonium hydroxides or halides, phosphonium hydroxides or halides, aryldiazonium hydroxides or halides, and similar types of compounds to obtain products of Formula 1 which have the desired cation M. In a process employing an ion-exchange resin, strongly acidic resins of the sulfonic acid variety are preferred because of availability, e.g., "Amberlite IR–120–H" and "Dowex 50." The acid, so obtained in aqueous solution, can be reacted with nitrates, chlorides, bromides, acetates, benzoates and similar salts of metals or other bases to obtain salts of Formula 1.

Compounds of Formula 1 where M is an alkali or alkaline earth metal, e.g., Na, K, Cs, Ca, Ba, Mg, and Sr, can undergo simple metathetic reactions with other salts to effect an exchange of cations. Thus, $NaB_{10}H_9 \cdot Z$, where Z is defined in Formula 1, can be reacted in aqueous solution with ammonium sulfate, benzenediazonium hydroxide, pyridinium chloride, morpholinium sulfate, polyethyleneimine hydrochloride, and the like, to form compounds of Formula 1 having ammonium, benzenediazonium, pyridinium, morpholinium, and the like, as cations. These illustrations are not limiting and they demonstrate the breadth of metathetic reactions which can be used.

The products of the invention and processes for obtaining them are illustrated in the following examples.

*Preparation of boron-containing reactants*

The preparation of a representative decahydrodecaborate salt used as a reactant, i.e., $(NH_4)_2B_{10}H_{10}$, is described in Example A. The preparation of a representative substituted polyhydrodecaborate salt, which can be used as a reactant, is described in Example B. The preparation of inner diazonium derivatives having the structural unit $—B_{10}H_8 \cdot N_2—$ is described in Example C.

EXAMPLE A

*Preparation of $(NH_4)_2B_{10}H_{10}$*

A reaction vessel having a capacity of about 365 parts of water is charged with 0.79 part of decaborane(14), cooled in liquid nitrogen, and then evacuated to a pressure of 10 microns of mercury. Approximately 21 parts of methyl sulfide is condensed onto the decaborane in the reaction vessel. The reaction vessel is closed, allowed to warm to room temperature about 25° C.) and stand for 4 days. During this period, 6.6 millimoles of hydrogen are evolved. The reaction vessel is opened and excess methyl sulfide is removed by distillation, leaving a practically quantitative yield of white solid residue of $B_{10}H_{12} \cdot 2S(CH_3)_2$. The compound is recrystallized from ethyl acetate and it melts at 122–124° C. The compound is called bis(dimethylsulfide)decaborane(12).

Bis(dimethylsulfide)decaborane(12) (8.5 g.) is mixed with 50 milliliters of liquid ammonia and stirred in a round-bottom reaction vessel for 1 hour with the vessel being cooled to a temperature of about −50° C. by partial immersion in a mixture of solid carbon dioxide and acetone. The cooling bath is then removed and the excess ammonia is allowed to evaporate with stirring. The remaining traces of ammonia are removed by subjecting the residue to a high vacuum (0.01 mm. of mercury) at 25° C. There is obtained 5.6 g. of solid residue which is virtually a quantitative yield of diammonium decahydrodecaborate(2−), i.e., $(NH_4)_2B_{10}H_{10}$.

EXAMPLE B

*Preparation of $[(CH_3)_4N]_2B_{10}H_9C(O)C_6H_5$*

An aqueous solution of 40 g. of diammonium decahydrodecaborate(2−) prepared as described in Example A, is passed through a column packed with 2000 ml. of a commercial acidic ion-exchange resin ("Amberlite IR–120–H"). The effluent is warmed to about 40° C. and it is evaporated under reduced pressure (about 10 mm. of Hg or less) to a volume of 70–80 ml. The concentrated solution, which contains the acid $H_2B_{10}H_{10}$, also referred to in solution as $(H_3O)_2B_{10}H_{10}$, is chilled to about 5° C. About 200 ml. of 1,2-dimethoxyethane is added to the chilled solution with stirring and 34 ml. of benzoyl chloride is then added. The reaction mixture is stirred at about 25° C. for two days to yield a dark red solution. A solution is prepared consisting of 80 g. of tetramethylammonium chloride and 375 ml. of methanol and this solution is added with stirring to the red reaction mixture at atmospheric temperature. A precipitate forms which is separated by filtration. The dark red filtrate is stirred and aqueous tetramethylammonium hydroxide is added until the color changes abruptly to a light hue. At this point an additional 5–10 g. of tetramethylammonium hydroxide is added. The reaction mixture is poured slowly and with stirring into 1400 ml. of ethanol. A precipitate forms which is separated by filtration to yield about 25 g. of bis(tetramethylammonium) monobenzoylnonahydrodecaborate(2−), i.e.

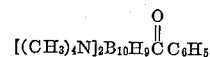

EXAMPLE C

*Preparation of $B_{10}H_8 \cdot 2N_2$ and $B_{10}H_8 \cdot S(CH_3)_2 \cdot N_2$*

A. A solution consisting of 20 g. of $(NH_4)_2B_{10}H_{10}$ in 150 ml. of water is mixed with a solution of 100 g. of $NaNO_2$ in 250 ml. of water. The solution is chilled to 0–10° C. and a handful of cracked ice is added. As the next step, 200 ml. of 16% hydrochloric acid is added in small portions with stirring and ice is added as needed to keep the temperature of the reaction mixture below 15° C. A precipitate forms which is separated by filtration to give the solid product and Filtrate "A." The solid is dissolved in methanol and NaBH$_4$ is added in sufficient quantity to reduce the intermediate product. The solution is stirred a few minutes, water is added and B$_{10}$H$_8$·2N$_2$ precipitates. The compound is separated and recrystallized from aqueous ethanol.

Zinc and hydrochloric acid are added to Filtrate "A" and the mixture is stirred. A further quantity of B$_{10}$H$_8$·2N$_2$ precipitates and it is purified as described earlier. The total quantity of B$_{10}$H$_8$·2N$_2$ which is obtained is 5.2 g.

B. A nitrous acid solution is prepared at about 0° C. (ice-water temperature) consisting of 10 ml. of water, 1.4 g. of NaNO$_2$ and 6 ml. of 12% HCl solution. The nitrous acid solution is added with stirring to a chilled solution (0-10° C.) consisting of 25 ml. of water and 4.0 g. of the hydrate of NaB$_{10}$H$_9$·S(CH$_3$)$_2$ obtained as described in Example 43, Part D. A brown solid forms which is separated by filtration and washed thoroughly with water. The solid is extracted three times with ethanol. The ethanol extracts are combined to form a clear red solution, zinc and hydrochloric acid are added in excess, and the mixture is stirred until the color changes from red to green. The solution is separated from unreacted zinc and the liquid is diluted with three times its volume of water. The precipitate which forms is separated, washed and dried to yield 0.25 g. of

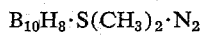

B$_{10}$H$_8$·S(CH$_3$)$_2$·N$_2$

The compound is recrystallized from aqueous ethanol. It melts at 135–137° C.

EXAMPLE D

A pressure vessel (capacity, 400 ml.) is charged with 19.0 g. of NaBH$_4$ and 75 ml. of dry triethylamine. The vessel is cooled in a solid carbon dioxide-acetone bath and the internal pressure is reduced to less than 1.0 mm. pressure by means of a vacuum pump. Diborane (36.0 g.) is introduced into the vessel which is then closed. The mixture is heated with agitation for 10 hours at 180° C. After cooling the vessel and venting to remove volatile products, there remains a solid residue which is washed from the vessel with glyme (1,2-dimethoxyethane). The solid is separated by filtration and it is again washed with glyme. The washed solid is dissolved in hot tetrahydrofuran and the solution is filtered to remove a small quantity of insoluble product. The filtrate is heated to boiling and glyme is added slowly until solid begins to separate. The mixture is chilled and it is then filtered to separate the white crystals. These crystals are washed with glyme and dried at less than 0.001 mm. pressure at 90–100° C. to yield 43.9 g. of Na$_2$B$_{12}$H$_{12}$ containing glyme and water of solvation. Further treatment of the filtrate yields an additional 5.4 g. of the product. The product is dissolved in water and the solution is evaporated to dryness to obtain a compound of the formula Na$_2$B$_{12}$H$_{12}$·H$_2$O.

A reaction vessel is charged with 120 ml. of water and 20 g. of the monohydrate of Na$_2$B$_{12}$H$_{12}$. The solution is cooled in a mixture of ice and water and chlorine gas is bubbled through the solution until no further absorption of chlorine is evident. The solution is warmed to about 30° C. and passage of chlorine gas is continued until no further uptake of chlorine occurs. The reaction mixture and 50 g. of chlorine is now charged into a corrosion-resistant pressure vessel and the mixture is heated under autogenous pressure at 150° C. for 2 hours. The vessel is cooled, vented to the air, and the reaction mixture is washed from the vessel with water. The solution is neutralized with NH$_4$OH and filtered. The filtrate is mixed with an aqueous solution of (CH$_3$)$_4$NCl and the

[(CH$_3$)$_4$N]$_2$B$_{12}$Cl$_{12}$ which precipitates is separated, washed and dried in air. It is redissolved in a minimum quantity of water and the solution is passed through a column packed with an acidic ion-exchange resin. The eluate is evaporated under reduced pressure at 25° C. to obtain the hydrate of H$_2$B$_{12}$Cl$_{12}$ as a crystalline white solid.

PREPARATION OF NEUTRAL (NON-IONIC) COMPOUNDS

Example 1

A glass reaction vessel is charged with 3.0 g. of diammonium decahydrodecaborate [(NH$_4$)$_2$B$_{10}$H$_{10}$] and 50 ml. of dimethyl sulfoxide. Anhydrous hydrogen chloride (0.04 mole) is passed into the mixture with stirring. The reaction mixture is stirred for 1.5 hours at substantially atmospheric pressure. Excess benzene is added to the mixture and the ammonium chloride which precipitates is separated by filtration. The benzene filtrate is extracted with petroleum ether and the solution which is insoluble in petroleum ether is diluted with water. A white solid precipitates which is separated by filtration. There is obtained 0.33 g. of bis(dimethylsulfide)decaborane(8). The compound is recrystallized from alcohol-water solution and it melts at 263–266° C. The compound has the formula B$_{10}$H$_8$·2S(CH$_3$)$_2$.

*Analysis.*—Calc'd for B$_{10}$H$_8$·2S(CH$_3$)$_2$: B, 45.0; C, 19.98; H, 8.39; S, 26.62; M.W., 240. Found: B, 44.29; C, 19.36; H, 7.71; S, 26.68; M.W., 230.

The infrared spectrum of the compound shows a strong absorption band at 4.0$\mu$ and weaker absorption bands at 7.0$\mu$, 7.5$\mu$, 9.65$\mu$, 10.0$\mu$, 10.4$\mu$, 10.85$\mu$, 11.5$\mu$, 12.4$\mu$, 13.7$\mu$, and 14.5$\mu$. The compound does not reduce a solution of silver nitrate in alcohol.

Example 2

A. A glass reaction vessel is charged with 30 g. of diamomnium decahydrodecaborate and 105 cc. of dimethyl sulfoxide. The mixture is stirred until a clear solution is formed and anhydrous hydrogen chloride is then bubbled into the mixture with continued stirring. An exothermic reaction sets in and the vessel is immersed in an ice bath to maintain the temperature below 45° C. A large quantity of amomnium chloride forms as a precipitate and the solution is filtered to separate the solid. The filtrate is returned to the reaction vessel and passage of hydrogen chloride is continued until the reaction is no longer exothermic. The mixture is filtered again and the filtrate is diluted with water. A sticky mass forms which is separated by decantation of the water. The mass is triturated alternately with water and with acetone to separate the portions which are soluble in each of these liquids. The acetone extract is diluted with water and the solid which precipitates is separated by filtration. The solid is purified by repeated solution in acetone and precipitation with water and, finally, by crystallization from acetone-water solution. The solid so obtained, which is B$_{10}$H$_8$·2S(CH$_3$)$_2$, melts at 265–266° C.

*Analysis.*—Calc'd for B$_{10}$H$_8$·2S(CH$_3$)$_2$: B, 45.0; C, 19.98; H, 8.39; S, 26.62. Found: B, 44.69; C, 19.56; H, 8.32; S, 27.19.

The infrared spectrum shows the same absorption bands as the compound of Example 1. In addition, the following weak bands are also observed: 11.2$\mu$, 11.75$\mu$ and 12.1$\mu$.

B. A reaction vessel is charged with a solution consisting of 4.0 g. of (NH$_4$)$_2$B$_{10}$H$_{10}$ (0.026 moles) and 20 ml. of dimethylsulfoxide (about 0.25 mole). The vessel is immersed in an ice bath and hydrogen chloride gas is bubbled into the mixture for 1 hour at a rate to maintain the temperature at about 60° C. The reaction mixture is poured into 200 ml. of cold water and the solid product which forms is separated by filtration. The product, which is B$_{10}$H$_8$·2S(CH$_3$)$_2$, is recrystallized from 50% aqueous ethanol. Yield, 41%.

C. A reaction vessel is charged with a mixture consisting of 0.026 mole of $(NH_4)_2B_{10}H_{10}$, 20 ml. of glacial acetic acid, and 0.045 mole of dimethylsulfoxide. Hydrogen chloride is bubbled into the mixture for about one hour. The reaction is exothermic in its initial stage (for about 15 minutes) and the mixture is cooled to maintain a temperature of about 60° C. Following completion of the reaction, the mixture is cooled slowly to about 25° C. The precipitated material is separated by filtration and it is washed thoroughly with water. The compound $B_{10}H_8 \cdot 2S(CH_3)_2$ is obtained in substantially pure form in better than 90% yield.

*Example 3*

A. The process of Example 2, Part B, is repeated employing 0.026 mole $(NH_4)_2B_{10}H_{10}$, 0.045 mole of diethylsulfoxide and 20 ml. of glacial acetic acid. Bis(diethylsulfide)decaborane(8), i.e., $B_{10}H_8 \cdot 2S(C_2H_5)_2$, is obtained in excellent yield as a white crystalline solid, M.P. 70° C.

B. A reaction vessel is charged with 10 ml. of water, 9 g. of $(NH_4)_2B_{10}H_{10}$ and 15 ml. of concentrated aqueous hydrochloric acid. The mixture is stirred until a solution is obtained and 14 g. of diethyl sulfoxide is added with stirring. An exothermic reaction sets in and, after a few seconds warming on a steam bath, about 3 ml. of water is added to the mixture to reduce the vigor of the reaction. The mixture is stirred until it cools to about 25° C. and, at this point, it consists of two layers. The reaction mixture is extracted with chloroform and the extract is dried successively with calcium chloride and with anhydrous calcium sulfate. The dried extract is filtered and the chloroform is removed by evaporation. The residue is dissolved in ethyl acetate and petroleum ether is added to the solution until an oil separates. The mixture is chilled in ice for about 1 hour, after which it is allowed to stand about 15 hours at prevailing atmospheric temperature (about 25° C.). Partial crystallization of the oil occurs and separation of the crystals is effected by filtration. The crystals are bis(diethylsulfide)decaborane(8), i.e., $B_{10}H_8 \cdot 2S(C_2H_5)_2$. The identity of the compound is confirmed by its infrared absorption spectrum.

In the process, as illustrated in Examples 2 and 3, inert solvents other than water and glacial acetic acid are operable. To illustrate, $(NH_4)_2B_{10}H_{10}$, $(C_2H_5)_2SO$ and HCl are reacted in methanol or in 1,2-dimethoxyethane to form $B_{10}H_8 \cdot 2S(C_2H_5)_2$.

The sulfoxides employed in the process illustrated in Examples 1–3 can advantageously be prepared in situ by oxidizing the organic sulfide with hydrogen peroxide. This method of operation is illustrated in Examples 3–A, 4 and Examples 6–20.

*Example 3–A*

A solution of 11.1 g. of dibenzyl sulfide in 20 ml. of glacial acetic acid is cooled, stirred and 5.9 g. of 30% hydrogen peroxide is added dropwise. The temperature is maintained below 20° C. The mixture is allowed to warm to atmospheric temperature (ca. 25° C.) and 4.0 g. of $(NH_4)_2B_{10}H_{10}$ is added. The ammonium salt does not dissolve in the reaction mixture. Hydrogen chloride gas is bubbled into the mixture for one hour and the temperature is maintained below 60° C. A heavy gum forms on the bottom of the reaction mixture. The gum is separated and it is dissolved in chloroform. The solution is washed with water and with aqueous $K_2CO_3$ solution and then dried over $CaCl_2$. The dried solution is filtered and the filtrate is evaporated to dryness to obtain $$B_{10}H_8 \cdot 2S(CH_2C_6H_5)_2$$

as a white crystalline product. It is purified by recrystallization from chloroform-petroleum mixture. The product melts at 138° C.

*Analysis.*—Calc'd for $B_{10}H_8 \cdot 2S(CH_2C_6H_5)_2$: C, 61.9; H, 6.6; B, 19.9. Found: C, 60.8; H, 6.8; B, 18.9.

*Example 4*

A reaction vessel is charged with 0.053 mole of an organic sulfide and 20 ml. of glacial acetic acid. The vessel is cooled in an ice bath and 0.053 mole of 30% hydrogen peroxide is added dropwise with stirring. The temperature is maintained at about 50° C. during this phase of the process. After addition of hydrogen peroxide is completed, the mixture is preferably allowed to stand one or more hours at 25° C. if the sulfide employed as a reactant bears an aryl group. In the event alkyl sulfides are employed, the reaction proceeds rapidly and the mixture need not stand for a period of time. Following completion of the hydrogen peroxide reaction, 4 g. of $$(NH_4)_2B_{10}H_{10}$$

are added to the reaction mixture with stirring. Hydrogen chloride gas is bubbled into the mixture for about 1 hour and the temperature is maintained at about 60° C. during the initial exothermic stage of the reaction. The product is isolated as described earlier. The process described above is used to obtain the compounds described in Table I.

TABLE I

| Organic Sulfide Reactant | Decaborate Reactant | Compound Obtained | Physical Properties |
|---|---|---|---|
| $S(CH_2CH_2CH_3)_2$ | $(NH_4)_2B_{10}H_{10}$ | $B_{10}H_8 \cdot 2S(CH_2CH_2CH_3)_2$ | Clear liquid. |
| $S(CH_2CH_2CH_2CH_3)_2$ | $(NH_4)_2B_{10}H_{10}$ | $B_{10}H_8 \cdot 2S(CH_2CH_2CH_2CH_3)_2$ | Do. |
| $S(CH_3)(C_6H_5)$ | $(NH_4)_2B_{10}H_{10}$ | $B_{10}H_8 \cdot 2S(CH_3)(C_6H_5)$ | White crystalline solid. |

*Example 5*

A solution is prepared consisting of 21.4 g. of thiophenol, 10.9 g. of KOH and 100 ml. of ethanol. To this solution, 31.5 g. of $B_{10}H_8 \cdot 2CH_3SC_6H_5$ (prepared as described in Example 4) is added and the resulting suspension is refluxed for 6 hours. The reaction mixture is filtered and a solution of 60 g. of CsF in 100 ml. of ethanol is added to the filtrate. A white precipitate forms which is separated, washed and recrystallized from aqueous ethanol to obtain $Cs_2B_{10}H_8(SC_6H_5)_2$. This compound is employed as a reactant in the next step of the process.

A solution of 3.2 g. of allyl bromide in 10 ml. of dimethylacetamide is added dropwise and with stirring to a solution of 6.0 g. of $Cs_2B_{10}H_8(SC_6H_5)_2$ in 25 ml. of dimethylacetamide. A white precipitate forms immediately which is CsBr. It is separated by filtration and the filtrate is diluted with 300 ml. of water. The diluted filtrate is cooled and a gum precipitates. The gum is separated, dissolved in ethyl acetate and the solution is treated with activated carbon to remove impurities. The purified solution is evaporated to obtain the gum as a residue. The gum is triturated with petroleum ether to solidify it. The product thus obtained is bis(allyl phenyl sulfide)octahydrodecaborane(8).

*Analysis.*—Calc'd for $$B_{10}H_8 \cdot 2S(C_6H_5)(CH_2CH{=}CH_2)$$

B, 25.95; C, 51.90; H, 6.73; S, 15.42. Found: B, 25.08; C, 50.90; H, 6.58; S, 15.19.

Example 5-A

A reaction vessel is charged with 5.0 g. of $$Cs[B_{10}H_8SCH_3 \cdot S(CH_3)_2]$$

prepared as described in Example 53, and 25 ml. of dimethylacetamide. The mixture is stirred to form a solution to which 2.36 g. of allyl iodide is added gradually. The reaction mixture becomes warm and a white solid separates rapidly. The reaction mixture, of which the liquid portion is pale violet in color, is poured with stirring into 100 ml. of water. A yellow gum-like precipitate forms which is changed to a solid by maceration in water. The solid is separated and recrystallized three times from hot methanol to obtain grayish crystals of $$B_{10}H_8[S(CH_3)_2][S(CH_3)(CH_2CH=CH_2)]$$

i.e., dimethylsulfidemethyl(allyl)sulfide - octahydrodecaborane(8). The identity of the compound is confirmed by its infrared absorption spectrum.

The process illustrated in Examples 5 and 5-A, which has not been discussed earlier, is particularly appropriate for the preparation of compounds of the invention in which Z is an organic sulfide in which the sulfur is bonded to one or two olefinically unsaturated groups, i.e., a sulfide of the formula $SR_2$, where at least one of the R groups is an olefinically unsaturated hydrocarbon. The process employs as one reactant an allylic halide, i.e., a compound which contains the structure $$\overset{|}{HC}=\overset{|}{C}-CH_2X$$

where X is chlorine, bromine or iodine and the free valences on the doubly bonded carbons are satisfied by hydrogen, alkyl, cycloalkyl or aryl groups; and, as a second reactant, a $B_{10}$ compound which bears one or two —SR groups on the boron cage and is represented by one of the following formulas:

$$M_a[B_{10}H_{10-y}(SR)_y]_b, \text{ or } M(B_{10}H_9SR \cdot SR_2)_{b'},$$

where M is a cation (preferably ammonium or alkali metal), R is an organic radical as defined previously and is preferably a hydrocarbon group up to 12 carbons which is free of acetylenic unsaturation, y is 1 or 2, a and b are positive whole numbers of 1–3, inclusive, whose values are determined by the valence of M and satisfy the equation: $2b=a\times$ valence of M; and $b'$ is the valence of M and has a value of at least 1.

The following examples illustrate products which can be obtained by the process of Examples 5 and 5-A, and the reactants which are employed:

$NaB_{10}H_9 \cdot S(C_4H_9)(CH_2—CH=CH_2)$ from
  $NaB_{10}H_9SC_4H_9$ and $CH_2=CH—CH_2I$;
$B_{10}H_8 \cdot 2S(CH_3)(CH_2CH=CH_2)$ from
  $Cs_2B_{10}H_8(SCH_3)_2$ and $CH_2=CH—CH_2Br$;
$LiB_{10}H_9 \cdot S(C_3H_7)[CH_2C(CH_3)=CH_2]$ from
  $Li_2B_{10}H_9SC_3H_7$ and $CH_2=C(CH_3)—CH_2Cl$;
$B_{10}H_8 \cdot S(C_2H_5)(CH_2CH=CH_2) \cdot S(C_6H_5)_2$ from
  $KB_{10}H_8SC_2H_5 \cdot S(C_6H_5)_2$ and $CH_2=CH—CH_2Cl$;
$B_{10}H_8 \cdot 2S(CH_2C_6H_5)(CH_2C(CH_3)=CH_2)$ from
  $Cs_2B_{10}H_8(SCH_2C_6H_5)_2$ and $CH_2=C(CH_3)—CH_2Br$; and
$NH_4B_{10}H_8 \cdot S(C_6H_{13})(CH_2—CH=CH—CH_3)$ from
  $(NH_4)_2B_{10}H_9SC_6H_{13}$ and $CH_3CH=CH—CH_2I$

Example 6

The sulfoxide of chloromethyl methyl sulfide is prepared in situ by oxidation of 19.2 g. (0.20 mole) of chloromethyl methyl sulfide dissolved in 40 ml. of acetic acid by the dropwise addition of 22.3 g. (0.20 mole) of 30% hydrogen peroxide. Temperature is maintained at 10–15° C. during the addition. The solution is allowed to warm to room temperature and 15.4 g. (0.10 mole) of $(NH_4)_2B_{10}H_{10}$ is added. Hydrogen chloride gas is bubbled through the mixture until evolution of heat is no longer observed. About 1 hour is required at a moderate HCl flow. The product $B_{10}H_8 \cdot 2S(CH_3)(CH_2Cl)$ is isolated by methods described previously.

Example 7

A solution consisting of 29.8 g. of 4-chlorothioanisole and 100 ml. of glacial acetic acid is cooled in ice water and 22.6 g. of 30% hydrogen peroxide is added dropwise and with stirring. The temperature of the solution is kept below 20° C. during the operation. After addition of peroxide is completed, the solution is allowed to warm to atmospheric temperature (about 25° C.) and 15.4 g. of $(NH_4)_2B_{10}H_{10}$ is added with stirring. Gaseous hydrogen chloride is bubbled through the mixture for 1 hour and the temperature is kept at 60° C. or below during the exothermic phase of the reaction. A gum separates from the mixture in the process and it is recovered by decantation. The gum is stirred with water to remove $NH_4Cl$, after which it is crystallized from an aqueous solution of 1,2-dimethoxyethane. The product is di(p-(methylmercapto)-chlorobenzene)octahydrodecaborane(8). The identity of the compound is confirmed by its infrared absorption spectrum and by elemental analysis.

*Analysis.*—Calc'd for $B_{10}H_8(CH_3SC_6H_4Cl)_2$: C, 38.8; H, 5.08; B, 25.0; S, 14.6; Cl, 16.4. Found: C, 38.98; H, 5.43; B, 26.22; S, 14.69; Cl, 17.06.

Example 8

A small quantity of $(CH_3)_4NB_{10}H_8SCH_3 \cdot S(CH_3)_2$, obtained as described in Example 52, Part A, is dissolved in dimethylformamide. Methylene iodide ($CH_2I_2$) is added slowly to the solution with stirring until precipitation of tetramethylammonium iodide is complete. The solid is separated by filtration and the filtrate is diluted with water. A gummy solid precipitates which is separated and crystallized from water. There is obtained $$B_{10}H_8 \cdot S(CH_3)_2 \cdot S(CH_3)(CH_2I)$$

a pale pink solid which melts at 103–104° C.

*Analysis.*—B (calc'd), 23.2; B (found), 20.1.

Example 9

The sulfoxide of $\beta,\beta'$-thiodipropionitrile is prepared in situ by oxidation of 28.0 g. (0.20 mole) of $\beta,\beta'$-thiodipropionitrile dissolved in 40 ml. of acetic acid by the dropwise addition of 22.3 g. (0.20 mole) of 30% hydrogen peroxide. The temperature is maintained at 10–15° C. during the addition. The solution is allowed to warm to room temperature and 15.4 g. (0.10 mole) of $(NH_4)_2B_{10}H_{10}$ is added. Hydrogen chloride gas is bubbled through the mixture until evolution of heat is no longer observed. About 1 hour is required at a moderate HCl flow. The product $B_{10}H_8 \cdot 2S(CH_2CH_2CN)_2$ is isolated by methods described previously.

Example 10

A reaction vessel is charged with 11.0 g. of $CH_3CH_2SCH_2CH_2OH$ and about 40 ml. of glacial acetic acid. The mixture is stirred to form a solution and it is cooled in an ice bath. Now 11.8 g. of 30% hydrogen peroxide is added dropwise to the solution with stirring, maintaining the temperature below 20° C. during the operation. Stirring is continued and 8.0 g. of $(NH_4)_2B_{10}H_{10}$ is added to the mixture to form a suspension. Hydrogen chloride gas is now bubbled through the mixture for 1 hour and the temperature is maintained at about 60° C. during the initial exothermic phase of the reaction. The mixture is filtered to remove $NH_4Cl$ and the filtrate is poured into 200 ml. of a mixture of ice and water. A tar precipitates from which the water is removed by decantation. The tar is dissolved in $CHCl_3$ and the solution is washed with dilute aqueous $K_2CO_3$ solution and distilled water, respectively. The solution is dried over calcium chloride and filtered. The filtrate is kept under reduced pressure to remove the chloroform. An oily residue remains which is a compound of the formula $B_{10}H_8[C_2H_5SCH_2CH_2OC(O)CH_3]_2$. The identity of the product is confirmed by its infrared absorption spectrum.

*Example 11*

A reaction mixture is prepared consisting of $(NH_4)_2B_{10}H_{10}$ and $C_2H_5S(O)CH_2CHOHCH_2OH$ (in 1:2 molar ratio) dissolved in glacial acetic acid. Hydrogen chloride gas is passed into the mixture and the reaction is conducted as described in previous examples. The product which is isolated is $$B_{10}H_8 \cdot 2[C_2H_5SCH_2CH(O_2CCH_3)CH_2(O_2CCH_3)]$$

*Analysis.*—Calc'd for above compound: C, 38.8; H, 7.2; B, 19.4; S, 11.5. Found: C, 34.1; H, 8.07; B, 25.43; S, 13.50.

The infrared spectrum of the compound shows absorption at the following wavelengths (expressed as cm.$^{-1}$): 4.0, 5.8, 8.1, 8.7, and 9.6.

*Example 12*

The sulfoxide of 2,2'-thiodiethanol is prepared in situ by oxidation of 24.4 g. (0.20 mole) of 2,2'-thiodiethanol dissolved in 40 ml. of acetic acid by the dropwise addition of 22.3 g. (0.20 mole) of 30% hydrogen peroxide. The temperature is maintained at 10–15° C. during the addition. The solution is allowed to warm to room temperature and 15.4 g. (0.10 mole) of $(NH_4)_2B_{10}H_{10}$ is added. Hydrogen chloride gas is bubbled through the mixture until evolution of heat is no longer observed. About 1 hour is required at a moderate HCl flow. The product which is isolated is $B_{10}H_8 \cdot 2S[CH_2CH_2OC(O)CH_3]_2$.

*Example 13*

The product obtained in Example 10, i.e., $$B_{10}H_8[C_2H_5SCH_2CH_2OC(O)CH_3]_2$$

is dissolved in ethanol. The solution is heated to boiling and gaseous hydrogen chloride is passed into the solution for 1 minute. Passage of gas is stopped and the solution is warmed at steam bath temperature until the ethanol is evaporated. A heavy oil remains which is $$B_{10}H_8(C_2H_5SCH_2CH_2OH)_2$$

The identity of the compound is confirmed by its infrared absorption spectrum and by elemental analysis.

*Analysis.*—Calc'd for $B_{10}H_8(C_4H_{10}OS)_2$: C, 29.07; H, 8.40; B, 29.95. Found: C, 29.3; H, 8.55; B, 32.9.

*Example 14*

Hydrogen chloride gas is bubbled for 1 minute into a solution of 18.0 g. (0.05 mole) of $$B_{10}H_8 \cdot 2S[CH_2CH_2OC(O)CH_3]_2$$

obtained in Example 12, in 40 ml. of ethanol. The ethanol is evaporated from the solution by warming on a steam bath. The product, $B_{10}H_8 \cdot 2S(CH_2CH_2OH)_2$, remains as a residue.

*Example 15*

A reaction vessel is charged with a solution consisting of 29.7 g. of KOH and 200 ml. of methanol. To this solution 57.1 g. of thioglycerol $$(CH_2OHCHOHCH_2SH)$$

is added dropwise with stirring at prevailing atmospheric temperature. The temperature rises somewhat in this step but, in this instance, the rise is not enough to require cooling. Ethyl bromide (57.1 g.) is now added dropwise with stirring and the temperature is maintained at 20–30° C. by means of an ice bath. The solution is stirred for 2 hours after addition of the bromide is completed. It is then filtered to separate KBr. The filtrate is strongly basic and solid carbon dioxide is added to reduce the basicity. The solution is warmed to prevailing atmospheric temperature and a white gelatinous solid precipitates. The solid is separated by filtration, the filtrate is distilled to remove methanol and the liquid residue is again filtered to remove a solid which is present. The clear liquid which remains is $$HOCH_2CH_2OHCH_2SC_2H_5$$

and it is used in the next step in the process.

To a solution of 14.2 g. of $HOCH_2CHOHCH_2SC_2H_5$ in acetic acid, cooled in ice, 11.8 g. of 30% $H_2O_2$ is added dropwise with stirring. The reaction is highly exothermic and cooling is required. When this step is completed, 8.0 g. of $(NH_4)_2B_{10}H_{10}$ is added to the solution and gaseous hydrogen chloride is bubbled through the mixture for 1 hour. The reaction mixture is filtered to remove $NH_4Cl$ and the filtrate is poured into 400 ml. of a mixture of ice and water. An oil forms which is separated by decantation and allowed to dry in the air. It is washed with hot ethyl acetate and macerated with ethyl ether. The oil slowly solidifies to a yellow powder. The powder is washed with petroleum ether and dried in air to yield a compound of the formula $$B_{10}H_8[C_2H_5SCH_2CH(O\overset{O}{\overset{\|}{C}}CH_3)CH_2O\overset{O}{\overset{\|}{C}}CH_3]_2$$

The identity of the compound is confirmed by its infrared absorption spectrum and by elemental analysis.

*Analysis.*—Calc'd for the above compound: H, 8.25; B, 27.8. Found: H, 8.07; B, 25.43.

*Example 16*

A solution is prepared consisting of 15.4 g. of ethylmercaptoacetic acid and 40 ml. of glacial acetic acid. The solution is cooled to 0–5° C. and 11.8 g. of 30% hydrogen peroxide is added dropwise with stirring. The temperature of the solution is maintained at about 5° C. during this operation. Eight grams of $(NH_4)_2B_{10}H_{10}$ is now added to the solution and gaseous HCl is bubbled through the mixture for 1 hour. The reaction is exothermic and the temperature of the mixture is not permitted to rise above 60° C. during the exothermic phase. The mixture is filtered to remove $NH_4Cl$ and the filtrate is warmed under reduced pressure to remove the acetic acid. A yellow oil remains which is $$B_{10}H_8(CH_3CH_2SCH_2COOH)_2$$

The oil is dissolved in water and an aqueous solution of lead acetate is added dropwise until precipitation of the lead salt is complete. The solid is separated and dried to yield the lead salt as a light yellow product. The identity of the compound is confirmed by its infrared absorption spectrum and by elemental analysis.

*Analysis.*—Calc'd for $$B_{10}H_8[(CH_3CH_2SCH_2CO_2)_2Pb]_2$$

C, 17.1; H, 3.91; B, 19.3; Pb, 36.8; S, 11.4. Found: C, 17.89; H, 4.17; B, 15.01; Pb, 38.35; S, 10.30.

The free acid can be obtained from the lead salt by suspending the salt in water and passing hydrogen sulfide into the suspension. Lead sulfide precipitates and the solution is filtered to obtain an aqueous solution of $B_{10}H_8(C_2H_5SCH_2COOH)_2$.

*Example 17*

A reaction vessel is charged with 17.8 g. of thiodipropionic acid $(HOOCCH_2CH_2SCH_2CH_2COOH)$ and 100 ml. of glacial acetic acid. The mixture is cooled to ice bath temperatures and 11.3 g. of 30% hydrogen peroxide is added dropwise with stirring, keeping the temperature of the mixture below 20° C. during the operation. The solid initially present in the mixture dissolves in the process. Now 7.7 g. of $(NH_4)_2B_{10}H_{10}$ is added to the mixture and hydrogen chloride gas is bubbled through the mixture for about 1 hour. The reaction is exothermic in its initial phase and the temperature is maintained at 60° C. or below by ice water cooling. The mixture is filtered to remove $NH_4Cl$ and the filtrate is poured into 200 ml. of water. A solution of lead acetate is added to the filtrate and a white solid precipitates. The solid is separated, washed with water, ethyl ether and petroleum ether. The washed solid is boiled in 200 ml. of water for a short time and the mixture is filtered while still hot. The solid which remains is again washed with ethanol and ethyl ether to obtain a product which is principally a lead salt of $$B_{10}H_8 \cdot 2S(CH_2CH_2COOH)_2$$

i.e., $$B_{10}H_8 \cdot 2S[(CH_2CH_2CO_2)_2Pb]$$

The lead salt can be suspended in water and hydrogen sulfide bubbled through the suspension to precipitate lead sulfide and leave a solution of the acid. Filtration of the mixture followed by evaporation of the filtrate will yield the free tetrabasic acid in which the acidity resides in the four carboxylic groups.

*Example 18*

A solution consisting of 33.8 g. of 3-nitrophenyl methyl sulfide in 100 ml. of glacial acetic acid is cooled in an ice bath and 22.7 g. of 30% hydrogen peroxide is added with stirring. The temperature of the mixture is maintained below 20° C. during the operation. After addition of peroxide is completed, the solution is allowed to warm to prevailing atmospheric temperature and 15.4 g. of $(NH_4)_2B_{10}H_{10}$ is added with stirring. Gaseous hydrogen chloride is bubbled through the reaction mixture and the temperature is maintained at 60° C. during the exothermic phase of the reaction. After 1 hour, passage of hydrogen chloride is stopped and a gum which forms in the mixture during the operation is separated. The gum is washed with water and crystallized from ethyl ether-petroleum ether mixture to obtain di[m-(methylmercapto)nitrobenzene]octahydrodecaborane(8) as white crystals.

*Analysis.*—Calc'd for $B_{10}H_8(CH_3SC_6H_4NO_2)_2$: C, 37.0; H, 4.9; N, 6.2. Found: C, 37.18; H, 5.6; N, 5.2.

*Example 19*

A reaction vessel is charged with a solution consisting of 56.0 g. of KOH and 250 ml. of $C_2H_5OH$. The vessel is cooled and a solution of 56.5 g. of $$HSCH_2CH_2NH_2$$

in 100 ml. of $C_2H_5OH$ is added dropwise with stirring. The reaction is exothermic and the temperature of the mixture is kept at about 30° C. or less. After addition of the amine is completed, 54.5 g. of $C_2H_5Br$ is added dropwise with stirring. The temperature is maintained at about 30° C. The precipitate (KBr) which forms is separated by filtration and gaseous HCl is bubbled through the filtrate. The warm solution is filtered and the filtrate is chilled to precipitate the hydrochloride of $CH_3CH_2SCH_2CH_2NH_2$ as white crystals. The compound is purified by crystallization from $C_2H_5OH$ and it is used in the next step in the reaction.

*Analysis.*—Calc'd for $(C_2H_5SC_2H_4NH_3)Cl$: C, 34.1; H, 8.5. Found: C, 33.7; H, 8.5.

A solution of 7.3 g. of $(CH_3CH_2SCH_2CH_2NH_3)Cl$ in 20 ml. of $CH_3COOH$ is cooled in an ice bath and 5.9 g. of 30% hydrogen peroxide is added dropwise with stirring. The solution is permitted to warm to prevailing atmospheric temperature and 4.0 g. of $(NH_4)_2B_{10}H_{10}$ is added. The solution is stirred and gaseous hydrogen chloride is bubbled through it for 1 hour. The reaction is exothermic in its initial phase and the temperature of the solution is not allowed to rise above 60° C. The solution is filtered to separate $NH_4Cl$ and the filtrate is poured into 200 ml. of a mixture composed of equal volumes of ethyl ether and ethanol. A yellow oil separates. The solvent is separated from the oil and 100 ml. of ethyl ether is added to the solvent. A second fraction of oil is obtained. The solvent is again separated from the oil and 50 ml. of petroleum ether is added to the solvent. The solution is cooled and allowed to stand. Fine white crystals form which are removed by filtration to obtain the hydrochloride of $B_{10}H_8(CH_3CH_2SCH_2CH_2NH_2)_2$. The identity of the compound is confirmed by its infrared absorption spectrum and by elemental analysis.

*Analysis.*—Calc'd for $B_{10}H_8(C_2H_5SC_2H_4NH_3Cl)_2$: C, 24.1; H, 8.02; B, 27.1; N, 7.01. Found: C, 23.74; H, 8.16; B, 24.9; N, 7.4.

*Example 20*

A. A solution consisting of 13.9 g. of 4-aminophenyl methyl sulfide [p-(methylmercapto)aniline] and 50 ml. of glacial acetic acid is cooled and 11.3 g. of 30% hydrogen peroxide is added dropwise with stirring. The temperature of the reaction mixture is kept at less than 20° C. After addition of the peroxide is completed, the reaction mixture is allowed to warm to prevailing atmospheric temperature and 7.7 g. of $(NH_4)_2B_{10}H_{10}$ is added. Hydrogen chloride is bubbled through the mixture for 1 hour, maintaining the temperature at 60° C. during the exothermic phase. After 1 hour, the flow of hydrogen chloride is stopped and the reaction mixture is filtered. The filtrate is diluted with 50 ml. of water and decolorizing carbon is added with stirring. The suspension is filtered, the clear filtrate is poured into 1500 ml. of ice water and a concentrated aqueous solution of 100 g. of sodium acetate is added with stirring. A white curd-like solid precipitates which is separated by filtration and washed. The product is bis[p-(methylmercapto)aniline]octahydrodecaborane(8). Its identity is confirmed by the infrared absorption spectrum and by elemental analysis.

*Analysis.*—Calc'd for $B_{10}H_8(CH_3SC_6H_4NH_2)_2$: C, 42.6; H, 6.6; N, 7.1. Found: C, 42.36; H, 6.79; N, 6.93.

B. The process of Part A is repeated employing 3-aminophenyl methyl sulfide in place of 4-aminophenyl methyl sulfide. Quantities of reactants are unchanged. The product which is isolated is bis[m-(methylmercapto)aniline]octahydrodecaborane(8).

*Analysis.*—Calc'd for $B_{10}H_8(CH_3SC_6H_4NH_2)_2$: C, 42.6; H, 6.6; B, 27.4. Found: C, 41.09; H, 6.62; B, 26.56.

The process of preparing the sulfoxides in situ is generic for obtaining compounds of the invention in which Z is an organic sulfide. To illustrate, the sulfoxide of DL-methionine is prepared in situ by oxidation of 29.8 g. (0.20 mole) of DL-methionine dissolved in 40 ml. of acetic acid by the dropwise addition of 22.3 g. (0.20 mole) of 30% hydrogen peroxide. The temperature is maintained at 10–15° C. during the addition. The solution is allowed to warm to room temperature and 15.4 g. (0.10 mole) of $(NH_4)_2B_{10}H_{10}$ is added. Hydrogen chloride gas is bubbled through the mixture until evolution of heat is no longer observed. About 1 hour is required at a moderate HCl flow. The product is isolated as a white crystalline compound which is amphoteric, i.e., it is soluble in acidic and basic solutions.

The compounds obtained in the preceding examples which bear functional substituents can be employed as intermediates to obtain products which fall within the scope of the invention, as illustrated in Examples 21–25 which follow.

*Example 21*

A solution consisting of 5 ml. of pyridine and 1.3 g. of di[3-(methylmercapto)aniline]octahydrodecaborane(8) is stirred with 2.0 ml. of benzoyl chloride. The solution becomes warm and it is allowed to stand at prevailing atmospheric temperature for 30 minutes. It is then poured into 25 ml. of water. An oil precipitates which is separated and macerated with ethanol until it solidifies. The solid is dissolved in tetrahydrofuran and the solution is passed through a column packed with silica gel. The purified solution is warmed to remove tetrahydrofuran, leaving di[N-(3-methylmercaptophenyl)benzamide]octahydrodecaborane(8) as a white solid. The identity of the compound is confirmed by elemental analysis.

*Analysis.*—Calc'd for $B_{10}H_8[CH_3SC_6H_4NHC(O)C_6H_5]_2$

C, 55.7; H, 5.65; B, 17.9. Found: C, 55.3; H, 6.14; B, 16.71.

Example 22

A reaction vessel is charged with 1.3 g. of bis-[3-(methylmercapto)aniline]octahydrodecaborane(8) and 5 ml. of pyridine. The mixture is stirred and 2 ml. of phenylisocyanate is added. The solution becomes warm, and it is allowed to stand at prevailing temperature for about 30 minutes. The solution is poured into 25 ml. of water and a yellow gum precipitates. The gum is separated and it is stirred repeatedly with water and finally with ethanol to remove impurities. The product which remains is dried to yield di[N-phenyl-N'-(3-methylmercaptophenyl)urea]octahydrodecaborane(8). The identity of the compound is confirmed by elemental analysis.

*Analysis.*—Calc'd for $B_{10}H_8[CH_3SC_6H_4NHC(O)NHC_6H_5]_2$

C, 53.2; H, 5.7; B, 17.0. Found: C, 53.2; H, 5.68; B, 15.29.

Example 23

A reaction vessel is charged with 2.5 g. of bis-(p-methylmercaptoaniline)octahydrodecaborane(8), 10 g. of ice and 10 ml. of concentrated hydrochloric acid. The reaction vessel and contents are cooled and a solution (also cooled) of 0.9 g. of $NaNO_2$ in 10 ml. of $H_2O$ is added dropwise with stirring. The reaction mixture becomes light brown and most of the solid dissolves. The mixture is filtered and 5 ml. of an aqueous 2.5 molar solution of $NaBF_4$ is added to the filtrate. A brown precipitate forms which is separated by filtration. The solid is washed with a small quantity of water and dried under reduced pressure over $P_2O_5$ at atmospheric temperature to obtain a product whose infrared spectrum shows it to be principally bis[p-(methylmercapto)phenyldiazonium tetrafluoroborate]octahydrodecaborane(8), i.e., $B_{10}H_8[CH_3SC_6H_4N_2(BF_4)]_2$

Example 24

A. A reaction vessel is charged with 2.0 g. of bis[m-(methylmercapto)aniline]octahydrodecaborane(8), 10 g. of ice and 10 ml. of concentrated hydrochloric acid. The reaction mixture is stirred to form a suspension and it is cooled in an ice bath. A solution of 0.7 g. of $NaNO_2$ in 10 ml. of water is added dropwise to the suspension with stirring. Substantially all of the solid dissolves to form a pale yellow solution. Cooling of the solution is continued and 1.36 g. of $(CH_3)_2NC_6H_5$ is added dropwise with stirring. The color of the reaction mixture becomes darker. A solution of about 2.0 g. of sodium acetate in 25 ml. of water is added slowly and with stirring to the mixture and a deep red precipitate forms. The mixture is allowed to stand for 30 minutes at ice temperature and it is then warmed to atmospheric temperature. After standing 1 hour at this temperature, the mixture is filtered and the deep red solid material is dried to obtain a product whose infrared absorption spectrum shows that it is principally bis(3-methyl-mercapto - 4' - dimethylaminoazobenzene)octahydrodecaborane(8), i.e., $B_{10}H_8[m\text{-}CH_3SC_6H_4\text{---}N=N\text{---}C_6H_4\text{-}p\text{-}N(CH_3)_2]_2$ where *m* and *p* in the formula represent meta and para positions for the substituents.

B. The reaction of Part A above is repeated, employing bis[p - (methylmercapto)aniline]octahydrodecaborane(8), as the reactant in place of the meta compound used above. The product which is obtained is shown by its infrared absorption spectrum to be principally bis(4-methylmercapto - 4' - dimethylaminoazobenzene)octahydrodecaborane(8), i.e., $B_{10}H_8[p\text{-}CH_3SC_6H_4\text{---}N=N\text{---}C_6H_4\text{-}p\text{-}N(CH_3)_2]_2$

Example 25

A mixture is prepared which consists of 10 g. of ice, 10 ml. of concentrated hydrochloric acid and 2.0 g. of $B_{10}H_8(m\text{-}CH_3SC_6H_4NH_2)_2$. The mixture, which is a suspension, is cooled in ice and to it a solution of 0.7 g. of $NaNO_2$ in 10 ml. of water is added dropwise with vigorous stirring. Substantially all of the solid dissolves to form a pale yellow solution. This solution is added dropwise to a cold solution which consists of 1.47 g. of α-naphthol, 40 ml. of water and 0.4 g. of NaOH. A dark red brown precipitate forms immediately. The reaction mixture is stirred for 30 minutes at ice bath temperature and it is then allowed to warm to prevailing atmospheric temperature. After standing 1 hour the mixture is filtered to separate the solid product. This product is washed with ethanol, ether and petroleum ether and then dried in air. The product is bis[methylmercapto-3 - (4' - hydroxynaphthylazo)benzene]octahydrodecaborane(8), i.e., a compound of the following formula

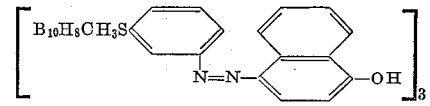

The identity of the compound is confirmed by its infrared absorption spectrum and by elemental analysis.

*Analysis.*—Calc'd for the above compound: C, 58.2; H, 5.1; N, 7.95; B, 15.4. Found: C, 54.72; H, 5.13; N, 6.00; B, 15.22.

The processes of Examples 1 through 25 are generic for the preparation of compounds of Formula 1 and particularly Formula 4, where Z is an organic sulfide. A broad range of compounds can be obtained by choice of an appropriate sulfide and by modification of functional groups in the sulfide molecule.

To illustrate, the following compounds can be obtained by employing the reactants shown in accordance with the procedures described in the foregoing examples. The sulfide reactants can be oxidized in situ to obtain the sulfoxides.

| Boron reactant | Sulfide reactant | Product |
| --- | --- | --- |
| $Na_2B_{10}H_{10}$ | $\overset{\frown}{S CH_2CH_2 O CH_2CH_2}$ | $B_{10}H_8\text{-}2\overset{\frown}{S CH_2CH_2O CH_2CH_2}$ |
| $(NH_4)_2B_{10}H_{10}$ | $\overset{\frown}{S CH_2(CH_2)_3CH_2}$ | $B_{10}H_8\text{-}2\overset{\frown}{S CH_2(CH_2)_3CH_2}$ |
| $(NH_4)_2B_{10}H_{10}$ | $S(C_6H_{11})_2$ | $B_{10}H_8\text{-}2S(C_6H_{11})_2$ |
| $[(CH_3)_3S]_2B_{10}H_{10}$ | $S(C_{10}H_7)_2$ | $B_{10}H_8\text{-}2S(C_{10}H_7)_2$ |
| $BaB_{10}H_{10}$ | $S(CH_2CH_2CN)(C_6H_5)$ | $B_{10}H_8\text{-}2S(CH_2CH_2CN)(C_6H_5)$ |
| $[(CH_3)_4N]_2B_{10}H_{10}$ | $S(C_6H_4CH_3)_2$ | $B_{10}H_8\text{-}2S(C_6H_4CH_3)_2$ |
| $[(C_3H_7)_4N]_2B_{10}H_{10}$ | $S(CH_2C_6H_5)_2$ | $B_{10}H_8\text{-}2S(CH_2C_6H_5)_2$ |

Example 26

A glass vessel equipped with a reflux condenser and stirrer is charged with 5.0 g. of diammonium decahydrodecaborate and 20 ml. of tri-n-butylphosphine. The mixture is heated to refluxing temperature for 45 minutes and it is noted that gas is evolved during this period. The excess tri-n-butylphosphine is removed by heating the reaction mixture under reduced pressure (less than 1 mm. of Hg). The solid which remains is crystallized from n-pentane to give needle-shaped crystals of bis(tri-n-butylphosphine)decaborane(8), a compound of the formula $B_{10}H_8 \cdot 2P(C_4H_9)_3$. The compound melts at 129–130° C. Its identity is confirmed by the infrared absorption spectrum.

The compound does not reduce silver nitrate in alcohol solution and it shows no absorption in the ultraviolet region of the spectrum.

The process of Example 26 is generic for the preparation of compounds of Formula 1, and particularly for compounds of Formula 4, in which Z is phosphine of the formula $R_3P$, as defined earlier. To illustrate, a decahydrodecaborate salt can be reacted with ethyldipropylphosphine to obtain $B_{10}H_8 \cdot 2P(C_2H_5)(C_3H_7)_2$, with ethyldiphenylphosphine to obtain $$B_{10}H_8 \cdot 2P(C_2H_5)(C_6H_5)_2$$

with cyclohexyldiethylphosphine to obtain $$B_{10}H_8 \cdot 2P(C_6H_{11})(C_2H_5)_2$$

and the like.

An optional generic method of preparing compounds of the invention in which Z is a phosphine consists in reacting $B_{10}H_8 \cdot 2N_2$ with a phosphine in the manner described in Examples 27 and 28 for tertiary amines.

The following examples illustrate reactants which can be employed in the above processes and compounds which can be obtained therefrom:

tertiary amine. Any tertiary amine can be employed as a reactant with $B_{10}H_8 \cdot 2N_2$. Amines in which the substituents are hydrocarbon are preferred, particularly hydrocarbon of up to 18 carbons which is free of acetylenic unsaturation. To illustrate, $B_{10}H_8 \cdot 2N_2$ can be reacted with $(C_8H_{17})_3N$ to give $B_{10}H_8 \cdot 2N(C_8H_{17})_3$, with $$(CH_3)_2NC_6H_5$$

to give $B_{10}H_8 \cdot 2N(CH_3)_2C_6H_5$, with ethyl N,N-dimethylglycinate to give $B_{10}H_8 \cdot 2N(CH_3)_2CH_2C(O)OC_2H_5$, with $(C_6H_{11})_3N$ to give $B_{10}H_8 \cdot 2N(C_6H_{11})_3$, with $$(C_6H_5CH_2)_3N$$

to give $B_{10}H_8 \cdot 2N(CH_2C_6H_5)_3$, with $(C_3H_7)_3N$ to give $B_{10}H_8 \cdot 2N(C_3H_7)_3$, and the like.

Further illustrations of compounds which can be obtained by the process of Examples 27 and 28, employing $B_{10}H_8 \cdot 2N_2$ as the boron-containing reactant are as follows: from $(HOCH_2CH_2)_3N$, $B_{10}H_8 \cdot 2N(CH_2CH_2OH)_3$; from $N[CH_2C(O)OH]_3$, $B_{10}H_8 \cdot 2N[CH_2C(O)OH]_3$; from

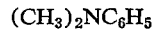

from

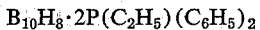

| Boron reactant | Phosphine reactant | Product |
| --- | --- | --- |
| $Na_2B_{10}H_{10}$ | $P(CH_3)_3$ | $B_{10}H_8 \cdot 2P(CH_3)_3NaB_{10}H_9 \cdot P(CH_3)_3$ |
| $(NH_4)_2B_{10}H_{10}$ | $P(C_2H_5)_3$ | $B_{10}H_8 \cdot 2P(C_2H_5)_3NH_4B_{10}H_9 \cdot P(C_2H_5)_3$ |
| $Cs_2B_{10}H_{10}$ | $P(C_6H_{11})_3$ | $B_{10}H_8 \cdot 2P(C_6H_{11})_3CsB_{10}H_9 \cdot P(C_6H_{11})_3$ |
| $Li_2B_{10}H_{10}$ | $P(C_2H_5)(C_3H_7)_2$ | $B_{10}H_8 \cdot 2P(C_2H_5)(C_3H_7)_2LiB_{10}H_9 \cdot P(C_2H_5)(C_3H_7)_2$ |
| $[(CH_3)_4N]_2B_{10}H_{10}$ | $P(C_6H_{11})(C_2H_5)_2$ | $B_{10}H_8 \cdot 2P(C_6H_{11})(C_2H_5)_2(CH_3)_4NB_{10}H_9 \cdot P(C_6H_{11})(C_2H_5)_2$ |
| $K_2B_{10}H_{10}$ | $P(C_4H_9)(CH_3)_2$ | $B_{10}H_8 \cdot 2P(C_4H_9)(CH_3)_2KB_{10}H_9 \cdot P(C_4H_9)(CH_3)_2$ |
| $B_{10}H_8 \cdot 2N_2$ | $P(C_5H_{11})(C_2H_5)_2$ | $B_{10}H_8 \cdot 2P(C_5H_{11})(C_2H_5)_2$ |
| $B_{10}H_8 \cdot 2N_2$ | $P(CH_3)(C_3H_7)(C_6H_{13})$ | $B_{10}H_8 \cdot 2P(CH_3)(C_3H_7)(C_6H_{13})$ |
| $B_{10}H_8 \cdot 2N_2$ | $P(CH_3)_2[CH_2C(CH_3)_3]$ | $B_{10}H_8 \cdot 2P(CH_3)_2[CH_2C(CH_3)_3]$ |
| $B_{10}H_8 \cdot 2N_2$ | $P(C_8H_{17})_3$ | $B_{10}H_8 \cdot 2P(C_8H_{17})_3$ |
| $B_{10}H_8 \cdot 2N_2$ | $P(C_6H_5)_3$ | $B_{10}H_8 \cdot 2P(C_6H_5)_3$ |
| $B_{10}H_8 \cdot 2N_2$ | $P(C_6H_4CH_3)_3$ | $B_{10}H_8 \cdot 2P(C_6H_4CH_3)_3$ |

Example 27

A mixture of 2.0 g. of $B_{10}H_8 \cdot 2N_2$ and 5 ml. of pyridine is refluxed for 20 hours. Solid material which forms is separated by filtration and it is purified by crystallization from dimethyl sulfoxide. The product is bis(pyridine)-octahydrodecaborane(8), i.e., $B_{10}H_8 \cdot 2C_5H_5N$. The identity of the compound is confirmed by its infrared absorption spectrum and by elemental analysis.

*Analysis.*—Calc'd for $B_{10}H_8 \cdot 2C_5H_5N$: B, 39.4; C, 43.8; H, 6.6; N, 10.2. Found: B, 39.4; C, 43.7; H, 6.5; N, 10.2, 9.9.

Example 28

A mixture of 2.1 g. of $B_{10}H_8 \cdot 2N_2$ and 30 ml. of quinoline is heated at 180° C. until 630 ml. of gas is evolved. The dark red mixture which remains is poured with stirring into 400 ml. of methanol and an orange-red solid precipitates. The solid is separated by filtration, placed in a Soxhlet extractor and extracted with acetonitrile for 19 hours. The product which remains in the thimble, i.e., the material not removed by acetonitrile, is bis(quinoline)octahydrodecaborane(8).

*Analysis.*—Calc'd for $B_{10}H_8 \cdot 2C_9H_7N$: B, 28.8; H, 5.9; N, 7.5. Found: B, 28.2; H, 6.0; N, 7.4.

The process of Examples 27 and 28 is generic for the preparation of compounds of Formula 3 where Z is a from

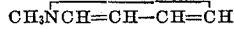

from

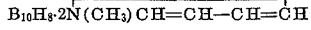

from $(CNCH_2CH_2)_3N$, $B_{10}H_8 \cdot 2N(CH_2CH_2CN)_3$; and from $(CH_3OCH_2CH_2)_3N$, $B_{10}H_8 \cdot 2N(CH_2-CH_2OCH_3)_3$.

Non-ionic compounds of Formula 3 in which Z is a tertiary amine are also obtained by employing a tertiary amine oxide in place of the dialkyl sulfoxide in the processes described in Examples 1, 2, 3 and 4. To illustrate, diammonium decahydrodecaborate reacts with trimethylamine oxide to yield $B_{10}H_8 \cdot 2N(CH_3)_3$, with triethylamine oxide to yield $B_{10}H_8 \cdot 2N(C_2H_5)_3$, with phenyldimethylamine oxide to yield $B_{10}H_8 \cdot 2N(CH_3)_2C_6H_5$, and with dimethyldodecylamine oxide to yield $$B_{10}H_8 \cdot 2N(CH_3)_2C_{12}H_{25}$$

Examples of other amine oxides which can be reacted with $(NH_4)_2B_{10}H_{10}$ are octyldimethylamine oxide, di-octadecylmethylamine oxide, di-n-butyl-2-(hydroxyethyl)-amine oxide, methylpiperidine oxide, decyldimethylamine oxide, 6-(cyclohexyl)hexyldiethylamine oxide, N-methylmorpholine oxide, and N-dodecylpiperidine oxide to yield, respectively: $B_{10}H_8 \cdot 2N(CH_3)_2C_8H_{17}$, $B_{10}H_8\cdot 2N(C_{18}H_{37})_2CH_3$ $B_{10}H_8\cdot 2N(C_4H_9)_2CH_2CH_2OH$

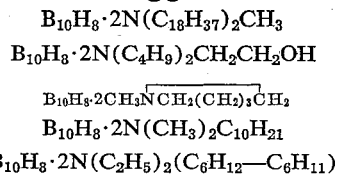

$B_{10}H_8\cdot 2N(CH_3)_2C_{10}H_{21}$ $B_{10}H_8\cdot 2N(C_2H_5)_2(C_6H_{12}\text{---}C_6H_{11})$ and

Non-ionic compounds of Formula 3 in which the two Z groups are amides can be obtained by reacting (1) an ionic compound of Formula 4 in which Z is an amide, and (2) a further quantity of the same amide represented by Z or with a different amide to provide a product $B_{10}H_8\cdot 2Z$ in which the Z groups are amides and are alike or different. The ionic compound of Formula 4 is prepared as illustrated for typical salts in Example 45 below. The simplest mode of operation is to prepare the ionic compound in situ as described in Example 45 and to continue the reaction by keeping the temperature of the reaction mixture at 125° C. or higher for about 2 hours or more with continued passage of anhydrous hydrogen chloride. To obtain the neutral species, the mole ratio of amide to decahydrodecaborate (2−) salt is preferably at least 2:1. When the amide serves also as a solvent the above mole ratio is, of course, much higher. Application of the above-described process to the product of Example 42 provides the compound $B_{10}H_8\cdot 2HC(O)N(CH_3)_2$.

The preparation of non-ionic compounds of the invention in which one or both of the Z groups are amides is illustrated in Examples 29 through 32.

Example 29

Cesium dimethylformamide - nonahydrodecaborate-(1−), prepared as described in Example 45, Part A, is dissolved in dimethyl sulfoxide and concentrated hydrochloric acid is added to the solution with stirring. The mixture is heated on a steam bath for 5 minutes and it is then diluted with water. The precipitate which forms is separated by filtration, washed and dried to obtain (dimethylsulfide - dimethylformamide)octahydrodecarborane(8), a compound of the formula $B_{10}H_8\cdot S(CH_3)_2\cdot HC(O)N(CH_3)_2$ The identity of the compound, in which the Z groups are dissimilar, is confirmed by its infrared absorption spectrum.

Example 30

A reaction vessel, equipped with a stirrer and a condenser, is charged with 20 g. of $(NH_4)_2B_{10}H_{10}$, 22 ml. of concentrated hydrochloric acid and 150 ml. of N-methyl-2-pyrrolidone. The mixture is stirred and it is heated until 20 ml. of water is removed by distillation. The final pot temperature is 170° C. The reaction mixture is cooled to about 25° C. and it is filtered to remove any solid material which may be present. The filtrate is poured with stirring into 800 ml. of water. A solid form which is separated by filtration to yield 3.0 g. of the alpha form of bis(N-methyl-2-pyrrolidone)decaborane(8), a compound which has the following structure:

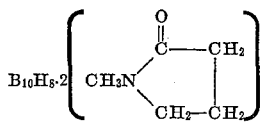

*Analysis.*—Calc'd for $B_{10}H_8\cdot 2N(CH_3)(CH_2)_3CO$: C, 38.2; H, 8.3; N, 8.9. Found: C, 38.8; H, 8.6; N. 8.8. C, 39.0; H, 8.; N, .3.

The infrared absorption spectrum of the compound, obtained in a Nujol mull, is as follows (values expressed as microns and bands due to C–H bonds and alkyl groups in the 3.2–3.5 micron and 6.5–7.6 micron regions are omitted): 4.0 (strong), 6.05 (strong), 8.0 (medium), 9.15 (medium), 9.6 (medium), 10.0 (weak), 10.4 (weak), 10.5 (medium), 11.0 (medium), and 11.7 (weak).

The filtrate obtained in the process of Example 30 above is set aside for use in preparing an ionic species of Formula 2 as described in Example 46.

Example 31

A mixture consisting of 1.8 g. of $B_{10}H_8\cdot 2N_2$ and 6 ml. of N-methyl-2-pyrrolidone is heated to refluxing for 2 hours. The solution is cooled to atmospheric temperature and poured into excess water. The precipitate which forms is coagulated by adding ammonium chloride and stirring. The precipitate is removed by filtration. Acetone is then added in sufficient quantity to dissolve the precipitate, the mixture is filtered and the filtrate is poured into ethanol with stirring. The precipitate which forms is separated by filtration and dried to yield 0.5 g. of

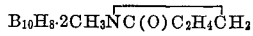

(beta form). The identity of the product is confirmed by its infrared absorption spectrum and by elemental analysis.

*Analysis.*—Calc'd for the above compound: B, 34.4; C, 38.2; H, 8.3; N, 8.9. Found: B, 32.5; C, 39.7; H, 8.5; N, 8.5.

The infrared absorption spectrum, obtained in a Nujol mull, is as follows (expressed as microns and omitting bands due to C–H bonds and alkyl groups): 4.0 (strong), 6.05 (strong), 8.0 (medium), 8.5 (medium), 8.9 (medium), 9.1–9.3 (medium), 9.6 (weak), 10.0 (medium), 10.3 (medium), 10.6 (medium), 11.0 (medium), and 11.7–12.1 (weak).

Reference is made in Examples 30 and 31 to the alpha and beta forms of compounds. These forms are simply stereoisomers of the same compound which differ in the spatial arrangement of the Z groups around the boron cage. In the particular examples of reference, the Z groups are N-methyl-2-pyrrolidone but differences in spatial arrangements can occur with any Z groups. The assignment of alpha and beta to the forms is solely for convenience in discussing the compounds. Except for the differences in infrared spectra, the two forms have substantially the same physical properties.

Example 32

A. A small portion of

prepared as described in Example 46, is mixed with sufficient dimethyl sulfoxide to form a solution. A small quantity of aqueous hydrochloric acid is added to the solution and the mixture is heated rapidly to boiling for a short time (about 20 seconds). The solution is cooled and poured into water. The precipitate which forms is separated by filtration and dried to obtain the alpha form of (dimethyl - sulfide)(N - methyl-2-pyrrolidone)octahydrodecaborane(8), i.e.

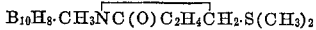

The identity of the compound is confirmed by its infrared absorption spectrum.

B. A solution consisting of 12 g. of

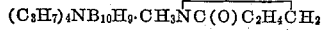

80 ml. of $(CH_3)_2SO$ and 20 ml. of concentrated hydrochloric acid is heated at steam bath temperature for 20 minutes and then on a hot plate until bubbles are forming rapidly. The solution is cooled and poured with stirring into 300 ml. of water. The precipitate which forms is separated and dissolved in acetone. The acetone solution is filtered into 200 ml. of water, a precipitate forms, and sufficient $NH_4Br$ is added to the aqueous filtrate to coagulate the precipitate. The precipitate is separated, washed well with water and dried to obtain the product of Part A. The identity of the compound is confirmed by elemental analysis.

*Analysis.*—Calc'd for

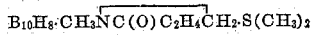
$B_{10}H_8 \cdot CH_3NC(O)C_2H_4CH_2 \cdot S(CH_3)_2$

B, 39.0; C, 30.3; H, 8.3; N, 5.0; S, 11.6. Found: B, 37.4; C, 28.8; H, 7.9; N, 5.0; S, 11.8.

The infrared absorption spectrum of the compound (alpha form) obtained in a Nujol mull (expressed as microns and omitting bands due to C–H bonds and alkyl groups is as follows): 4.0 (strong), 6.05 (strong), 8.0 (medium), 8.2 (weak), 9.0 (medium), 9.3 (medium), 9.6 (weak), 10.0 (medium), 10.1 (medium), 10.4 (medium), 10.9 (medium), and 12.0 (weak).

C. A solution consisting of 1 g. of $B_{10}H_8 \cdot N_2 \cdot S(CH_3)_2$, prepared as described in Example C, Part B, and 6 ml. of

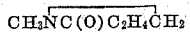
$CH_3NC(O)C_2H_4CH_2$ is boiled for a short time (about 20 seconds) and cooled. The clear solution is diluted with water, a precipitate forms, and lithium bromide is added to coagulate the precipitate. The precipitate is separated and dissolved in acetone. The solution is filtered and the filtrate is diluted with water o precipitate the solid product. It is separated, washed and dried to obtain 0.8 g. of the beta form of

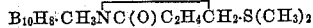
$B_{10}H_8 \cdot CH_3NC(O)C_2H_4CH_2 \cdot S(CH_3)_2$

*Analysis.*—Calc'd for above compound: B, 39.0; C, 30.3; H, 8.5; N, 5.0; S, 11.6. Found: B, 38.7; C, 30.5; H, 8.3; N, 5.2; S, 11.6.

The infrared absorption spectrum (expressed in microns) for the compound (beta form), determined as described in Part B, is as follows: 4.0 (strong), 6.05 (strong), 7.9 (medium), 8.3 (weak), 8.5 (medium), 9.0 (weak), 9.7 (weak), 10.0 (medium), 10.2 (medium), 10.3 (weak), 10.7 (weak), and 11.0 (medium).

The processes of Examples 29–32 are generic for the preparation of compounds of Formula 1, and particularly Formula 4 in which Z is an amide of a carboxylic acid. Any decaborate salt can be employed as a reactant in this process, e.g., mono-, di-, tri-, and tetra-substituted ammonium salts, metal salts, sulfonium and phosphonium salts and metal-amine salts. The ammonium salt, tetraalkylammonium salts and the alkali metal salts are employed most frequently for reasons of availability and cost and these salts form a preferred group.

Further examples of compounds which can be prepared and the reactants employed in their preparation are as follows:

| Boron reactant | Amide reactant | Product |
|---|---|---|
| $(NH_4)_2B_{10}H_{10}$ | $C_3H_7C(O)N(CH_3)_2$ | $B_{10}H_8 \cdot 2C_3H_7C(O)N(CH_3)_2$ |
| $[(CH_3)_4N]_2B_{10}H_{10}$ | $CH_2=C(CH_3)C(O)N(CH_3)_2$ | $B_{10}H_8 \cdot 2CH_2=C(CH_3)C(O)N(CH_3)_2$ |
| $Na_2B_{10}H_{10}$ | $C_{12}H_{25}C(O)N(C_4H_9)_2$ | $B_{10}H_8 \cdot 2C_{12}H_{25}C(O)N(C_4H_9)_2$ |
| $B_{10}H_8 \cdot 2N_2$ | $CH_3C(O)NCH_2CH_2OCH_2CH_2$ | $B_{10}H_8 \cdot 2CH_3C(O)NCH_2CH_2OCH_2CH_2$ |
| $[(C_3H_7)_4N]_2B_{10}H_{10}$ | $HC(O)NCH_2(CH_2)_3CH_2$ | $B_{10}H_8 \cdot 2HC(O)NCH_2(CH_2)_3CH_2$ |
| $Cs_2B_{10}H_{10}$ | $C_2H_5C(O)NCH_2(CH_2)_2CH_2$ | $B_{10}H_8 \cdot 2C_2H_5C(O)NCH_2(CH_2)_2CH_2$ |
| $Li_2B_{10}H_{10}$ | $(CH_3)_2NC(O)C_6H_5$ | $B_{10}H_8 \cdot 2(CH_3)_2NC(O)C_6H_5$ |
| $B_{10}H_8 \cdot 2N_2$ | $(C_2H_5)_2NC(O)C_6H_{11}$ | $B_{10}H_8 \cdot 2(C_2H_5)_2NC(O)C_6H_{11}$ |
| $B_{10}H_8 \cdot 2N_2$ | $C_{17}H_{35}C(O)N(C_3H_7)_2$ | $B_{10}H_8 \cdot 2C_{17}H_{35}C(O)N(C_3H_7)_2$ |
| $B_{10}H_8 \cdot 2N_2$ | $ClCH_2C(O)N(C_2H_5)_2$ | $B_{10}H_8 \cdot 2ClCH_2C(O)N(C_2H_5)_2$ |
| $B_{10}H_8 \cdot 2N_2$ | $HOCH_2C(O)N(CH_3)_2$ | $B_{10}H_8 \cdot 2HOCH_2C(O)N(CH_3)_2$ |
| $B_{10}H_8 \cdot 2N_2$ | $C_6H_5C(O)N(C_{12}H_{25})_2$ | $B_{10}H_8 \cdot 2C_6H_5C(O)N(C_{12}H_{25})_2$ |

*Example 33*

A reaction vessel capable of withstanding pressure is charged with 5.0 g. of $B_{10}H_8 \cdot 2N_2$, prepared as described in Example C, Part A, and 40 ml. of $CH_3CN$. The vessel is closed and evacuated at −70° C., and the reaction mixture is heated at 150° C. for 3.5 hours under autogenous pressure. The vessel is cooled, vented to remove volatile products and the clear reddish solution which remains is evaporated under reduced pressure until a crystalline solid separates. The product is crystallized from acetonitrile to obtain $B_{10}H_8 \cdot 2CH_3CN$ as a white crystalline compound.

*Analysis.*—Calc'd for $B_{10}H_8 \cdot 2CH_3CN$: B, 54.5; C, 24.2; H, 7.1; N, 14.1. Found: B, 54.4; C, 22.5; H, 7.0; N, 14.7.

The process of Example 33 is generic for the preparation of compounds of Formula 1 and, particularly of Formula 4, in which Z is a nitrile. To illustrate, $B_{10}H_8 \cdot 2N_2$ can be reacted with the folowing nitriles to obtain the named compounds:

| Nitrile reactant | Product |
|---|---|
| $C_6H_{11}CN$ | $B_{10}H_8 \cdot 2C_6H_{11}CN$ |
| $C_6H_5CN$ | $B_{10}H_8 \cdot 2C_6H_5CN$ |
| $CH=CH-O-C(CN)=CH$ | $B_{10}H_8 \cdot 2CH=CH-O-C(CN)=CH$ |
| $C_4H_9CN$ | $B_{10}H_8 \cdot 2C_4H_9CN$ |
| $CH_2=CHCN$ | $B_{10}H_8 \cdot 2CH_2=CHCN$ |
| $CH_2=C(CH_3)CN$ | $B_{10}H_8 \cdot 2CH_2=C(CH_3)CN$ |
| $C_5H_{11}CN$ | $B_{10}H_8 \cdot 2C_5H_{11}CN$ |
| $ClC_6H_4CN$ | $B_{10}H_8 \cdot 2ClC_6H_4CN$ |
| $HO(O)C(CH_2)_3CH_2CN$ | $B_{10}H_8 \cdot 2NCCH_2(CH_2)_3CH_2C(O)OH$ |
| $HO(O)CC_6H_4CN$ | $B_{10}H_8 \cdot 2NCC_6H_4C(O)OH$ |
| $HOC_6H_4CN$ | $B_{10}H_8 \cdot 2NCC_6H_4OH$ |
| $HOCH_2CH_2CN$ | $B_{10}H_8 \cdot 2NCCH_2CH_2OH$ |

Compounds of the invention in which Z is a sulfone are obtained by employing a sulfone in place of the nitrile in the process of Example 33. To illustrate, $B_{10}H_8 \cdot 2N_2$ is reacted with $(CH_3)_2SO_2$ to obtain $B_{10}H_8 \cdot 2O_2S(CH_3)_2$, with $(C_4H_9)_2SO_2$ to obtain $$B_{10}H_8 \cdot 2O_2S(C_4H_9)_2$$

and with $(C_6H_5)_2SO_2$ to obtain $B_{10}H_8 \cdot 2O_2S(C_6H_5)_2$.

Further illustrations of non-ionic compounds which can be obtained and reactants employed with $B_{10}H_8 \cdot 2N_2$ are as follows:

| Sulfone reactant | Product |
|---|---|
| $O_2SCH_2(CH_2)_2CH_2$ | 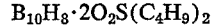 $B_{10}H_8 \cdot 2O_2SCH_2(CH_2)_2CH_2$ |
| $(C_6H_{11})_2SO_2$ | $B_{10}H_8 \cdot 2O_2S(C_6H_{11})_2$ |
| $CH_3SO_2CH_2CH=CH_2$ | $B_{10}H_8 \cdot 2CH_3SO_2CH_2CH=CH_2$ |
| $(ClCH_2CH_2)_2SO_2$ | $B_{10}H_8 \cdot 2O_2S(CH_2CH_2Cl)_2$ |
| $O_2SCH_2(CH_2)_3CH_2$ | $B_{10}H_8 \cdot 2O_2SCH_2(CH_2)_3CH_2$ |
| $(CH_3C_6H_4)_2SO_2$ | $B_{10}H_8 \cdot 2O_2S(C_6H_4CH_3)_2$ |
| $[HOC(O)C_6H_4]_2SO_2$ | $B_{10}H_8 \cdot 2O_2S[C_6H_4C(O)OH]_2$ |
| $(FC_6H_4)_2SO_2$ | $B_{10}H_8 \cdot 2O_2S(C_6H_4F)_2$ |
| $(Cl_2C_6H_3)_2SO_2$ | $B_{10}H_8 \cdot 2O_2S(C_6H_3Cl_2)_2$ |

The examples which follow illustrate the preparation of representative non-ionic compounds bearing X substituents.

Example 34

A. A glass reaction vessel, equipped with a stirrer, is charged with 40 ml. of acetonitrile and 4.0 g. of bis(dimethylsulfide)decaborane(8), $B_{10}H_8 \cdot 2S(CH_3)_2$, obtained as described in Example 1. Chlorine gas is bubbled through the reaction mixture and the temperature rises to 71° C. Passage of chlorine gas is continued until the temperature of the reaction mass drops to prevailing atmospheric temperature (about 25° C.). The reaction mass is poured into 200 ml. of water and the mixture is filtered. A sticky mass remains which is boiled in 50 ml. of water to convert it to a powder. The powder is extracted three times with hot alcohol, the alcohol extracts are cooled and a white crystalline solid separates which is isolated by filtration. The dry solid, which is bis(dimethylsulfide)pentachlorotrihydrodecaborane(8)

melts at 314–317° C. The identity of the compound, which has the formula $B_{10}H_3Cl_5 \cdot 2S(CH_3)_2$, is confirmed by elemental analysis.

*Analysis.*—Calc'd for $B_{10}H_3Cl_5 \cdot 2S(CH_3)_2$: B, 26.3; C, 11.6; H, 3.63; Cl, 42.9; S, 15.5. Found: B, 25.7; C, 11.8; H, 3.91; Cl, 43.9; S, 14.8.

B. A glass reaction vessel equipped with a stirrer and reflux condenser is charged with 80 ml. of acetonitrile and 7.0 g. of $B_{10}H_8 \cdot 2S(CH_3)_2$. Chlorine gas is passed into the reaction mixture and an exothermic reaction ensues. Passage of gas is continued until the reaction temperature drops and for an additional hour thereafter while the mixture is heated to refluxing temperature. The solution is cooled and poured into 500 ml. of water. An oil separates and 200 ml. of ethanol are added with stirring to the aqueous mixture. The oil solidifies and the solid is separated by filtration. The solid product, which is bis(dimethylsulfide)hexachlorodihydrodecaborane(8), is crystallized from ethanol to form a product melting at 330° C. The identity of the compound, which has the formula $B_{10}H_2Cl_6 \cdot 2S(CH_3)_2$, is confirmed by elemental analysis.

*Analysis.*—Calc'd for $B_{10}H_2Cl_6 \cdot 2S(CH_3)_2$: B, 24.2; C, 10.72; H, 3.14; Cl, 47.6; S, 14.3. Found: B, 24.4; C, 10.90; H, 3.41; Cl, 46.4; S, 14.8.

The compound shows unusual stability and it is recovered unchanged after refluxing for a short period in alcoholic sodium hydroxide.

C. A mixture of 75 ml. of acetonitrile and 10 g. of $B_{10}H_8 \cdot 2S(CH_3)_2$ is reacted with chlorine gas as described in Part A except that the mixture is refluxed for 7 hours with continued passage of chlorine gas. A small quantity of crystalline solid (Fraction A, M.P., 359° C.) forms which is separated by filtration. The filtrate is evaporated to a volume of about 30 ml., poured into water and the white solid which forms is separated by filtration. The solid is extracted with (1) aqueous ethanol, (2) water-ethanol-acetonitrile mixture, and (3) hot acetonitrile. Each of these extracts are evaporated and cooled to yield white crystalline products which are designated as follows: from aqueous ethanol, Fraction B, M.P. 340–357° C.; from water-ethanol-acetonitrile, Fraction C, M.P. 367–369° C.; from hot acetonitrile, Fraction D, M.P. 360–361° C. Infrared absorption spectra of the various fractions show that products from Fractions A and D are identical and they will be referred to solely as Fraction A; similarly, Fractions B and C are identical (although different from A and D) and they will be referred to as Fraction B.

Elemental analyses of Fractions A and B show that the products have the same composition, i.e., that the products are isomeric forms of bis(dimethylsulfide)hexachlorodihydrodecaborane(8).

*Analysis.*—Calc'd for $B_{10}H_2Cl_6 \cdot 2S(CH_3)_2$: B, 24.2; C, 10.7; H, 3.14; Cl, 47.6; S, 14.3. Found: Fraction A—B, 24.3; C, 11.0; H, 3.16; Cl, 49.0; S, 13.8. Fraction B—B, 25.0; C, 11.2; H, 3.20; Cl, 47.9; S, 13.7.

Example 35

A. A solution of 6 g. of bromine in 50 ml. of acetonitrile is added with stirring to a solution of 9.0 g. of $B_{10}H_8 \cdot 2S(CH_3)_2$ in 50 ml. of acetonitrile. The resulting mixture is light yellow in color. It is poured into 500 ml. of water with stirring and sufficient solid sodium iodide is added to coagulate the precipitated solid. The solid is separated by filtration and it is extracted three times with ethanol. Evaporation and cooling of the ethanol extracts yields $B_{10}H_7Br \cdot 2S(CH_3)_2$, a white solid which melts at 233–234° C.

*Analysis.*—Calc'd for $B_{10}H_7Br \cdot 2S(CH_3)_2$: B, 33.8; C, 15.05; H, 5.95; Br, 25.0; S, 20.0. Found: B, 36.09; C, 16.07; H, 6.55; Br, 21.26; S, 20.8.

B. Using the procedure described in Part A, 1.5 g. of $B_{10}H_8 \cdot 2S(CH_3)_2$ and 1 g. of bromine are reacted in 25 ml. of acetonitrile. The reaction mixture is poured into water and the white solid which forms is separated by filtration. It is further purified by crystallization from ethanol to yield bis(dimethylsulfide)monobromoheptahydrodecaborane(8). The identity of the compound, which has the formula $B_{10}H_7Br \cdot 2S(CH_3)_2$, is confirmed by elemental analysis.

*Analysis.*—Calc'd for $B_{10}H_7Br \cdot 2S(CH_3)_2$: B, 33.8. Found: B, 32.6.

C. A solution of 6.7 g. of bromine in 40 ml. of dichloromethane is added with stirring to a solution of 10 g. of $B_{10}H_8 \cdot 2S(CH_3)_2$ in 75 ml. of dichloromethane. The reaction mixture is evaporated to dryness and the solid residue is extracted successively with n-propyl alcohol, twice with isopropyl alcohol and then with n-propyl alcohol. There is obtained a solid fraction (3.18 g.) which melts at 225–227° C. and which is

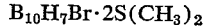

$$B_{10}H_7Br \cdot 2S(CH_3)_2$$

The product is again extracted with n-propyl alcohol and dried. It melts at 230–233° C.

*Analysis.*—Calc'd for $B_{10}H_7Br \cdot 2S(CH_3)_2$: B, 33.8; Br, 25.0; C, 15.1; H, 5.95; S, 20.0. Found: B, 34.5; Br, 25.2; C, 15.5; H, 6.18; S, 20.2.

D. A glass reaction vessel equipped with a stirrer is charged with a solution of 3.0 g. of $B_{10}H_8 \cdot 2S(CH_3)_2$ in ethanol-acetonitrile mixture. The solution is warmed and 0.9 cc. of liquid bromine is added gradually. An exothermic reaction sets in and the color of the bromine in the reaction mixture is discharged. The solution is poured into water to form an emulsion. Solid sodium bromide is added to break the emulsion and the resulting mixture is filtered to separate a white insoluble product which is bis(dimethylsulfide)dibromohexahydrodecaborane(8). The identity of the compound which the formula $B_{10}H_6Br_2 \cdot 2S(CH_3)_2$ is confirmed by elemental analysis.

*Analysis.*—Calc'd. for $B_{10}H_6Br_2 \cdot 2S(CH_3)_2$: B, 27.2; S, 16.1. Found: B, 30.36; S, 17.34.

E. A solution of 15 g. of bromine in 75 ml. of acetonitrile is added with stirring to a solution of 10 g. of $B_{10}H_8 \cdot 2S(CH_3)_2$ in 75 ml. of acetonitrile. The solution is refluxed for 30 minutes and it is then poured into excess methanol. The resulting mixture is filtered and the filtrate is chilled. The solid which forms is separated by filtration to yield 7.7 g. of $B_{10}H_6Br_2 \cdot 2S(CH_3)_2$. The filtrate is concentrated by evaporation to a volume of about 30 ml. Additional solid product precipitates which is again separated by filtration. It is crystallized from aqueous methanol to yield the compound $B_{10}H_6Br_2 \cdot 2S(CH_3)_2$, melting at 183–195° C.

*Analysis.*—Calc'd. for $B_{10}H_6Br_2 \cdot 2S(CH_3)_2$: B, 27.1; S, 16.1; C, 12.1; H, 4.52; Br, 40.2. Found: 1st fraction—B, 27.15; S, 16.16; Br, 41.34. 2nd fraction—B, 26.6; S, 15.0; C, 11.1; H, 4.37; Br, 39.01.

The stability of the compounds of the invention is illustrated by the fact that the above $B_{10}H_6Br_2 \cdot 2S(CH_3)_2$ is unchanged after refluxing 15 minutes in alcoholic potassium hydroxide containing hydroxylamine.

F. A solution of 15 g. of bromine in 75 ml. of acetonitrile is added with stirring to a solution of 10 g. of $B_{10}H_8 \cdot 2S(CH_3)_2$ in 75 ml. of acetonitrile. The mixture is refluxed for 30 minutes and a further quantity of bromine solution (13 g. in 50 ml. of acetonitrile) is added. The mixture is refluxed overnight, i.e., about 18 hours. The reaction mixture is concentrated by evaporation of the solvent to about 100 ml. and it is filtered. A tan solid is separated which is crystallized from acetonitrile. There is obtained a white solid, M.P. 282° C., which is bis(dimethylsulfide)tribromopentahydrodecaborane(8), i.e., $B_{10}H_5Br_3 \cdot 2S(CH_3)_2$. The identity of the compound is confirmed by elemental analysis.

*Analysis.*—Calc'd. for $B_{10}H_5Br_3 \cdot 2S(CH_3)_2$: B, 22.7; C, 10.05; H, 3.56; S, 13.4. Found: B, 23.1; C, 10.77; H, 3,78; S, 13,21.

G. A glass reaction vessel equipped with a stirrer is charged with a solution of $B_{10}H_8 \cdot 2S(CH_3)_2$ in acetonitrile. The solution is heated to refluxing temperature and liquid bromine is added slowly until no further absorption of bromine occurs in 2 minutes of refluxing. Excess bromine in the solution is removed by adding a small quantity of $(NH_4)_2B_{10}H_{10}$. The solution is poured into water with stirring and the precipitated material is separated by filtration. This product is

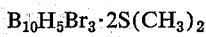
$B_{10}H_5Br_3 \cdot 2S(CH_3)_2$

Bromination of $B_{10}H_8 \cdot 2S(CH_3)_2$ is also accomplished by employing N-bromosuccinimide as the brominating agent. For example, a mixture of 0.34 g. of

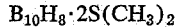
$B_{10}H_8 \cdot 2S(CH_3)_2$ 0.34 g. of N-bromosuccinimide and 25 ml. of carbon tetrachloride is refluxed to form a mixture of bromo compounds of the type described in Parts A–C.

Example 36

A. A glass reaction vessel is charged with 0.7 g. of $B_{10}H_8 \cdot 2S(CH_3)_2$, 0.7 g. of iodine, 0.2 g. of the hydrate of $H_2B_{10}H_{10}$ or its equivalent, and 75 ml. of acetonitrile. The solution is stirred for a few minutes and a further quantity (0.7 g.) of $B_{10}H_8 \cdot 2S(CH_3)_2$ is added. The solution is heated for 5 minutes on a steam bath. Excess iodine is removed by adding a small quantity of $(NH_4)_2B_{10}H_{10}$ to the solution with stirring. The solution is poured into aqueous sodium bromide solution and the white solid which forms is separated by filtration. The solid is crystallized from ethanol to obtain bis(dimethylsulfide)monoiodoheptahydrodecaborane(8), i.e., $B_{10}H_7I \cdot 2S(CH_3)_2$. The product, as isolated, melts at 208–212° C. and contains 39.36% boron and 22.03% iodine.

B. A reaction vessel is charged with a solution consisting of 10 g. of bis(dimethylsulfide)octahydrodecaborane(8) in 100 ml. of dichloromethane. A solution of 6.8 g. of iodine in 75 ml. of dichloromethane is added with agitation to the contents of the reaction vessel at atmospheric temperature (about 25° C.). Agitation of the solution is continued for 3 hours and the solution is then concentrated by evaporation to a volume of about 20 ml. The residual liquid is added with stirring to about 250 ml. of ethanol. A white solid forms which is separated by filtration. The solid is crystallized twice from ethanol to obtain pure bis(dimethylsulfide)monoiodoheptahydrodecaborane(8), i.e., $B_{10}H_7I \cdot 2S(CH_3)_2$, which melts at 195–198° C.

*Analysis.*—Calc'd. for $B_{10}H_7I \cdot 2S(CH_3)_2$: B, 29.5; I, 34.7; S, 17.5. Found: B, 29.9; I, 33.6; S, 17.8.

C. A reaction vessel is charged with 50 ml. of methylene chloride and 5 g. of bis(dimethylsulfide)octahydrodecaborane(8), obtained as described in Example 1. The mixture is stirred and a solution of 3.4 g. of iodine monochloride in 50 ml. of methylene chloride is added over a period of 10 minutes. The mixture is stirred for one hour at atmospheric temperature (about 25° C.) and it is then poured with stirring into 500 ml. of petroleum ether. The resulting mixture is filtered and the filtrate is evaporated to leave a solid residue. The residue is crystallized from ethyl alcohol and from ethyl alcohol-water mixtures to obtain a nearly colorless solid, M.P. 139–141° C. The product is a mixture of about 70% bis(dimethylsulfide) monoiodoheptahydrodecaborane(8) and 30% bis(dimethylsulfide)diiodohexahydrodecaborane(8). The respective formulas for these compounds are $B_{10}H_7I \cdot 2S(CH_3)_2$ and $B_{10}H_6I_2 \cdot 2S(CH_3)_2$.

*Analysis.*—Calc'd. for the mixture: C, 11.8; H, 4.7; S, 15.8; I, 41.0. Found: C, 11.7; H, 4.7; S, 15.8; I, 42.1.

Example 37

A reaction vessel is fitted with a reflux condenser equipped with a calcium chloride tube to prevent access of moist air to the vessel. The vessel is charged with 2 ml. of pyridine, 3.2 g. of bis(dimethylsulfide)monobromoheptahydrodecaborane(8), obtained as described in Example 35, Part A, and 0.9 g. of cuprous cyanide. The mixture is heated at 160–180° C. for 5 hours and cooled to form a semi-solid mass. The mixture is extracted (1) with aqueous concentrated ammonium hydroxide, and (2) with acetone. The acetone extract is diluted with water to form a pale tan precipitate which is separated by filtration and dried in air. The product contains bis-(dimethylsulfide) monocyanoheptahydrodecaborane( 8 ), whose presence is confirmed by the infrared absorption spectrum of the product. It has the formula

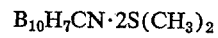
$B_{10}H_7CN \cdot 2S(CH_3)_2$

Example 38

A reaction vessel is charged with 100 ml. of acetonitrile and 10 g. of

$B_{10}H_8 \cdot 2CH_3NC(O)C_2H_4\overset{\frown}{C}H_2$ prepared as described in Example 30. The mixture is stirred to form a slurry and chlorine gas is bubbled through for 3 hours. The reaction is exothermic for the first half hour and, after this initial period, the mixture is heated to refluxing for the remaining 2.5 hours. The solution is filtered and the filtrate is diluted with a large amount of water. An oil separates which is extracted from the mixture with hot 50% ethanol. The extracts are cooled and the solid which precipitates is separated, washed and dried. The compound, bis(N-methylpyrrolidoneoctachlorodecaborane(8), is obtained as a white crystalline product.

*Analysis.*—Calc'd for

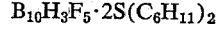
$B_{10}Cl_8 \cdot 2CH_3NC(O)C_2H_4\overset{\frown}{C}H_2$:

B, 18.3; C, 20.4; H, 3.0; Cl, 48.0. Found: B, 18.4, 18.7; C, 21.4; H, 3.8; Cl, 45.6.

By employing fluorine diluted with nitrogen gas as the halogenating agent, compounds bearing fluorine substituents can be obtained, e.g., $B_{10}H_6F_2 \cdot 2S(C_2H_5)_2$, $B_{10}H_3F_5 \cdot 2S(C_6H_{11})_2$ and the like.

The processes of Examples 34–38 are generic for the preparation of compounds of Formula 1 and particularly Formula 3 where X is halogen or —CN.

Example 39

A. A glass reaction vessel is charged with 10 g. of

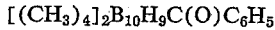
$[(CH_3)_4]_2B_{10}H_9C(O)C_6H_5$ (prepared as described in Example B), 4.2 g. of dimethyl sulfoxide and 100 ml. of glacial acetic acid. The reaction mixture is cooled to about 12° C. in an ice-water bath and anhydrous hydrogen chloride is bubbled through the solution at a rapid rate. The temperature rises in 5 minutes to about 20° C. and the cooling bath is removed. Passage of hydrogen chloride is continued for 45 minutes in which time the temperature of the reaction mixture rises to 43.5° C. and then gradually decreases to 32° C. The solution, which is red at this stage, is poured with stirring into 600 ml. of water. An orange solid precipitates which is a mixture of $$B_{10}H_7C(O)C_6H_5 \cdot 2S(CH_3)_2$$

and $HB_{10}H_8C(O)C_6H_5 \cdot S(CH_3)_2$, i.e., a mixture of the neutral species and the ionic species. The solid is separated by filtration and it is extracted with acetone. The acetone-soluble portion is poured into three times its volume of concentrated sodium hydroxide solution to form a mixture which separates into two layers. The upper layer, which is an acetone solution, is separated and it is poured with stirring into excess water. A sticky solid precipitates which is separated and dissolved again in acetone. The acetone solution is added with stirring to excess propyl alcohol and a solid forms which is bis (dimethylsulfide)benzoylheptahydrodecaborane (8), i.e., $B_{10}H_7C(O)C_6H_5 \cdot 2S(CH_3)_2$. The solid is separated by filtration and dried. The identity of the compound is confirmed by its infrared spectrum and by elemental analysis.

*Analysis.*—Calc'd for $B_{10}H_7C(O)C_6H_5 \cdot 2S(CH_3)_2$: B, 31.4; C, 38.2; H, 7.0; S, 18.7. Found: B, 29.4; C, 38.4; H, 7.9; S, 16.0.

B. A reaction vessel is charged with 10 g. of $$[(CH_3)_4N]_2B_{10}H_9C(O)C_6H_5$$

12.2 g. of dimethyl sulfoxide and 100 ml. of glacial acetic acid. Anhydrous hydrogen chloride is passed through this mixture without cooling for 56 minutes during which time the temperature of the mixture rises to a maximum of 80° C. and then drops to 35° C. Passage of hydrogen chloride is stopped and the reaction mixture is poured with stirring in 500 ml. of water. A precipitate forms which is separated by filtration. There is obtained 11.5 g. of $B_{10}H_7C(O)C_6H_5 \cdot 2S(CH_3)_2$ as a white, crystalline solid.

C. A glass reaction vessel equipped with a stirrer is charged with 1.27 g. of $B_{10}H_8 \cdot 2S(CH_3)_2$, 0.85 g. of benzoyl chloride and 30 ml. of polyphosphoric acid. The mixture is stirred for 15 minutes to form a solution of light yellow color. A further quantity of benzoyl chloride (0.85 g.) is added with stirring and the solution becomes darker yellow in color. The solution is stirred for 3 days and it is then poured with agitation into 300 ml. of water. The solid which forms is separated by filtration and dried to form a tan-colored product which contains a benzoylated derivative of $B_{10}H_8 \cdot 2S(CH_3)_2$ of the type illustrated by the formula $B_{10}H_7C(O)C_6H_5 \cdot 2S(CH_3)_2$. One or more hydrogens are replaced by $C_6H_5C(O)$— groups in the reaction. The infrared absorption spectrum of the product shows the presence of B—H, C=O and phenyl groups.

Example 39 illustrates acyl derivatives of $$B_{10}H_8 \cdot 2S(CH_3)_2$$

and their preparation. The invention is generic to acyl derivatives which can be prepared by the method of Example 38, 39, or by other methods, e.g., by reaction of $B_{10}H_8 \cdot 2S(CH_3)_2$ with anhydrides of organic acids. To illustrate, $B_{10}H_8 \cdot 2S(CH_3)_2$ is dissolved in acetic anhydride which contains a small quantity of a strong acid ($pK_a=1.7-2.0$) and the solution is warmed on a steam bath for 5 minutes. The solution which is red in color is diluted with ethanol and a tan-colored precipitate forms. The precipitate is separated by filtration and dried. The compound is acetylated $B_{10}H_8 \cdot 2S(CH_3)_2$, in which one or more hydrogens are replaced with $CH_3C(O)$— groups.

The infrared absorption spectrum of the compound shows the presence of B–H bonds and >C=O groups of the acetyl [$CH_3C(O)$—] radicals. The compound is of the type illustrated by the formulas $B_{10}H_7C(O)C_3 \cdot 2S(CH_3)_2$ and $B_{10}H_6[C(O)CH_3]_2 \cdot 2S(CH_3)_2$.

*Example 40*

A small portion of $B_{10}H_7C(O)C_6H_5 \cdot 2S(CH_3)_2$, obtained in Example 39, Part A, is dissolved in glacial acetic acid. Excess 30% hydrogen peroxide is added and the solution is stirred. After standing a few minutes at prevailing atmospheric temperature (about 25° C.), the solution is poured into water and the precipitate which forms is separated by filtration. The product is bis(dimethylsulfide) monobenzoyloxyheptahydrodecaborane(8) or, as an alternate name, bis(dimethylsulfide)heptahydrodecaboryl benzoate. The identity of the compound, which has the formula $B_{10}H_7OC(O)C_6H_5 \cdot 2S(CH_3)_2$, is confirmed by its infrared absorption spectrum.

The compound of Example 40 can be hydrolyzed by aqueous alcoholic sodium hydroxide solution to obtain $B_{10}H_7OH \cdot 2S(CH_3)_2$, i.e., a compound of Formula 1 in which X is OH. The process of Example 40 is generic for the preparation of compounds of Formula 1 in which X is —OC(O)R, e.g., —OC(O)CH$_3$, —OC(O)C$_8$H$_{17}$, and the like.

*Example 41*

A reaction vessel, equipped with a reflux condenser, is charged with 6.8 g. of $B_{10}H_8 \cdot 2S(CH_3)_2$, 6 g. of $H_2NOSO_3H$, 2 g. of NaOH, 50 ml. of water and 50 ml. of ethanol. The mixture is stirred and heated at refluxing temperature for about 18 hours. The mixture is cooled and filtered. The filtrate contains in solution an amino-substituted compound of the formula $$B_{10}H_7NH_2 \cdot 2S(CH_3)_2$$

which is a compound of Formula 3.

The compound is basic in view of the presence of the amine group and it can, therefore, form salts with acids. The compound is an example of the group of compounds of the invention in which ionic activity lies in the X substituent and not in the polyhedral boron cage.

The compound is most conveniently isolated in the form of a salt. To illustrate, an aqueous solution of $H_2B_{12}Cl_{12}$, described in Example D, is added to the filtrate obtained above and the precipitate which forms is separated, washed and dried to obtain $$[B_{10}H_7NH_3 \cdot 2S(CH_3)_2]_2B_{12}Cl_{12}$$

as a white crystalline product. The identity of the compound is confirmed by its infrared absorption spectrum.

The process of Example 41 is generic for the preparation of compounds of Formula 1 in which X is —NH$_2$. The process can be used to prepare, e.g., $B_{10}H_7NH_2 \cdot 2O_2S(C_4H_9)_2$,
  $B_{10}H_7NH_2 \cdot N(C_8H_{17})_3$, $B_{10}H_7NH_2 \cdot$ 2-pyridine,
and the like.

Compounds bearing carboxyl groups, e.g., $B_{10}H_7COOH \cdot S(CH_3)_2$ and $B_{10}H_6(COOH)_2 \cdot 2S(CH_3)_2$, are obtained by hydrolysis of compounds bearing the appropriate number of cyano groups. Compounds bearing nitro groups, e.g., $B_{10}H_7COOH \cdot 2S(CH_3)_2$ and $B_{10}H_6(COOH(_2 \cdot 2S(CH_3)_2$, and the like are obtained by reaction of $B_{10}H_8 \cdot 2S(CH_3)_2$, with nitric acid. To illustrate, $B_{10}H_8 \cdot 2S(CH_3)_2$ is stirred with concentrated nitric acid at room temperature (about 25° C.) to form a deep red solution. This solution is diluted with water and a red solid is precipitated which is separated by filtration. The red solid is a nitro-substituted compound of the type illustrated above. The compound explodes when dry and analysis is not feasible.

Polyhydrodecaborate(2−) reactants of the type used in Example 39, Part A, are generically useful in the above-described processes, i.e., polyhydrodecaborates(2−) having one or more X groups bonded to boron can be reacted with oxides of the general formula Z→O to form non-ionic compounds of Formula 3 having one or more X groups in the final product.

The processes described in Examples 1–41 and in the preceding paragraphs are generic to the preparation of neutral (non-ionic) compounds which fall within the scope of Formula 3.

Further illustrations of compounds bearing X substituents and reactants which can be employed to obtain them are as follows:

*Analysis.*—Calc'd for $(CH_3)_4NB_{10}H_9 \cdot 2S(CH_3)_2$: B, 42.7; C, 28.4; H, 10.7; S, 12.7. Found: B, 42.0; C, 28.3; H, 10.4; S, 13.3.

B. The process of Part A is repeated except that hydrogen chloride gas is passed into the mixture for only 5 minutes. The reaction mass is processed as described in Part A to obtain a good yield of $$(CH_3)_4NB_{10}H_9 \cdot S(CH_3)_2$$

C. A second small portion of Solution A, obtained in Part A, is mixed with an aqueous solution of cesium fluoride. The white solid which forms is separated, dried

| Boron reactant | Second reactant | Product |
|---|---|---|
| $B_{10}H_8 \cdot 2S(CH_3)_2$ | F | $B_{10}H_5F_3 \cdot 2S(CH_3)_2$ |
| $B_{10}H_8 \cdot 2CH_3CN$ | $C_6H_5C(O)Cl$ | $B_{10}H_7C(O)C_6H_5 \cdot 2CH_3CN$ |
| $B_{10}H_8 \cdot 2CH_3C(O)N(CH_3)_2$ | $CH_3C(O)Cl$ | $B_{10}H_7C(O)CH_3 \cdot 2CH_3C(O)N(CH_3)_2$ |
| $B_{10}H_8 \cdot 2S(C_6H_5)_2$ | $ClSO_3H$ | $B_{10}H_7SO_3H \cdot 2S(C_6H_5)_2$ |
| $B_{10}H_8 \cdot 2C_6H_5CN$ | $(CH_3)_2NC(O)Cl$ | $B_{10}H_7C(O)N(CH_3)_2 \cdot 2C_6H_5CN$ |
| $B_{10}H_8 \cdot 2$ pyridine | $C_6H_5SO_2Cl$ | $B_{10}H_7SO_2C_6H_5 \cdot 2$ pyridine |
| $B_{10}H_8 \cdot 2O_2S(C_4H_9)_2$ | $CH_3CH=CH_2$ | $B_{10}H_7C_3H_7 \cdot 2O_2S(C_4H_9)_2$ |
| $B_{10}H_8 \cdot 2S(CH_3)_2$ | $C_6H_5CH=CH_2$ | $B_{10}H_7C_2H_4C_6H_5 \cdot 2S(CH_3)_2$ |
| $B_{10}H_8 \cdot 2CH_3CN$ | HCHO | $B_{10}H_7OH \cdot 2CH_3CN$ |
| $B_{10}H_8 \cdot 2P(C_4H_9)_3$ | 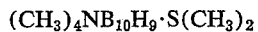 CH₃—CH—CH₂ with O | $B_{10}H_7OCH_2CH(OH)CH_3 \cdot 2P(C_4H_9)_3$ |

The ionic compounds of Formula 2 can be changed to the non-ionic compounds of Formula 3, as illustrated in Example 42, which follows.

Example 42

A small quantity of $(CH_3)_4NB_{10}H_8SCH_3 \cdot S(CH_3)_2$, prepared as described in Example 52, Part A, is dissolved in dimethylformamide and methyl iodide $(CH_3I)$ is added to the solution slowly and with stirring. Tetramethylammonium iodide which precipitates is separated by filtration. The filtrate is diluted with water to precipitate a gummy solid which is separated by filtration. The solid is crystallized from aqueous acetone to yield a white crystalline product which is bis(dimethylsulfide)-octahydrodecaborane(8), i.e., $B_{10}H_8 \cdot 2S(CH_3)_2$. The identity of the compound is confirmed by its infrared absorption spectrum.

Example 29, given earlier, also illustrates a process by which the compounds of Formula 2 are changed to compounds of Formula 3.

PREPARATION OF IONIC-TYPE OF COMPOUNDS, FORMULA 2

Example 43

A. A glass reaction vessel, equipped with a stirrer and immersed in an ice bath, is charged with a solution of 40 g. of $(NH_4)_2B_{10}H_{10}$ in 20 ml. of $(CH_3)_2SO$. The solution is stirred and cooled while hydrogen chloride gas is passed through it for 1.5 hours at a rate sufficient to maintain the reaction temperature at 44–65° C. At the end of this period, the reaction mixture is poured into 500 ml. of water and the solid $B_{10}H_8 \cdot 2S(CH_3)_2$ which precipitates is separated by filtration. The filtrate is extracted three times with 100 ml. portions of ethyl ether and the aqueous liquid which remains is concentrated under reduced pressure to a volume of about 200 ml. The liquid is filtered to separate a white solid which is a mixture of ammonium chloride and a polyhydropolyborate. The solid is dissolved in water to form Solution A and a small portion of this solution is added with stirring to an aqueous solution of $(CH_3)_4NCl$. A white solid precipitates which is separated and dried. It is recrystallized from water to obtain pure tetramethylammonium dimethylsulfide-nonahydrodecaborate(1−), i.e.,

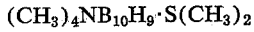
$$(CH_3)_4NB_{10}H_9 \cdot S(CH_3)_2$$

The identity of the compound is confirmed by elemental analysis and by its infrared absorption spectrum.

and crystallized from water to yield pure cesium dimethylsulfide-nonahydrodecaborate(1−), i.e., $$CsB_{10}H_9 \cdot S(CH_3)_2$$

The identity of the compound is confirmed by elemental analysis and by its infrared absorption spectrum.

*Analysis.*—Calc'd for $CsB_{10}H_9 \cdot S(CH_3)_2$: B, 34.6; C, 7.7; H, 4.8; S, 10.0. Found: B, 33.8; C, 7.8; H, 4.9; S, 10.4.

D. The tetramethyammonium compound, obtained in Part A, is dissolved in hot water and the solution is passed through a column packed with a commerical acid ion-exchange resin of the aryl sulfonic acid type. The acidic effluent is a solution of $HB_{10}H_9 \cdot S(CH_3)_2$ or, more properly, $(H_3O)B_{10}H_9 \cdot S(CH_3)_2$, and it is neutralized (titrated) with aqueous NaOH solution to obtain a solution of $NaB_{10}H_9 \cdot S(CH_3)_2$. The solution of the sodium salt is evaporated to obtain a hydrate of $$NaB_{10}H_9 \cdot S(CH_3)_2$$

E. A reaction vessel is charged with 40 g. of $$(NH_4)_2B_{10}H_{10}$$

and 200 ml. of $(CH_3)_2SO$. The mixture is stirred and hydrogen chloride gas is passed into it for 4 minutes. The reaction is exothermic and the temperature is maintained at 75° C. or lower by external cooling of the mixture. Passage of HCl gas is stopped and the reaction mixture is poured into 500 ml. of water. The solution is filtered and 30 g. of triethylamine is added to the filtrate with stirring. Sufficient ammonium hydroxide is added to obtain a neutral solution (pH=7). The solution is allowed to stand and crystals form which are separated by filtration. The product is recrystallized from ethanol to yield 36 g. of $(C_2H_5)_3NHB_{10}H_9 \cdot S(CH_3)_2$.

F. The triethylammonium salt, obtained above, is mixed with an equivalent quantity of potassium hydroxide solution and the mixture is boiled to expel triethylamine. The solution is cooled and the crystals which form are separated to obtain $KB_{10}H_9 \cdot S(CH_3)_2$.

Example 44

A reaction vessel is charged with 1.54 g. of $$(NH_4)_2B_{10}H_{10}$$

15 ml. of tetramethylene sulfone and 3.92 g. of anhydrous p-toluenesulfonic acid. The charged vessel is placed in an oil bath, the reaction mixture is stirred and the oil bath is heated to about 85° C. for a period of 70 minutes. Gas is evolved from the reaction mixture during this period. The mixture is cooled, diluted with water and an aqueous solution of a mixture of $(CH_3)_4NOH$ and $(CH_3)_4NCl$ is added. The precipitate which forms is separated, washed and dried in air to obtain 2.77 g. of

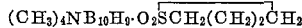

The compound is recrystallized from acetonitrile-methanol mixture to yield large white crystals, M.P. 195–196° C. (with bubbling). The identity of the compound is confirmed by elemental analysis and by its infrared absorption spectrum.

*Analysis.*—Calc'd for

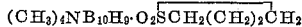

B, 34.73; C, 30.84; S, 10.29; H, 9.38; N, 4.50. Found: B, 34.65; C, 31.08; S, 10.39; H, 9.33; N, 4.30.

The process of Example 44 is generic for the preparation of compounds of Formula 1 and, in particular, for the compounds of Formula 4. To illustrate, by using the process of Example 44, dibutyl sulfone is reacted with $Na_2B_{10}H_{10}$ to obtain $NaB_{10}H_9 \cdot O_2S(C_4H_9)_2$; ethyl phenyl sulfone is reacted with $K_2B_{10}H_{10}$ to obtain $$KB_{10}H_9 \cdot O_2S(C_2H_5)(C_6H_5)$$

dicyclohexyl sulfone is reacted with $[(C_3H_7)_4N]_2B_{10}H_{10}$ to obtain $(C_3H_7)_4NB_{10}H_9 \cdot O_2S(C_6H_{11})_2$, and the like. It is, of course, possible to obtain a wide range of salts by employing metathetic reactions as described in previous paragraphs.

By extending the heating period in the process of Example 44, non-ionic compounds of Formulas 3 and 6 can be obtained in which Z is a sulfone.

*Example 45*

A. A reaction vessel is charged with 20 g. of diammonium decahydrodecaborate and 100 ml. of N,N-dimethylformamide. The mixture is stirred at atmospheric temperature (about 25° C.) until the boron compound is dissolved and, with continued stirring, gaseous hydrogen chloride is bubbled through the solution. The temperature rises spontaneously to 126° C. over a period of 12 minutes and it then decreases to about 80° C. Flow of hydrogen chloride is stopped at this point and the solution is filtered to remove the ammonium chloride which precipitates in the reaction. The clear filtrate is added with stirring to a solution consisting of 400 ml. of ethanol, 10 ml. of methanol, and 45 g. of cesium hydroxide. A white solid precipitates and it is separated by filtration. The solid is extracted with 100 ml. of hot water. The portion remaining after extraction is crystallized three times from solution in hot water to obtain cesium dimethylformamide - nonahydrodecaborate(1—), i.e., a compound of the formula $$CsB_{10}H_9 \cdot HC(O)N(CH_3)_2$$

The compound is a white crystalline solid whose identity is confirmed by elemental analysis.

*Analysis.*—Calc'd for $CsB_{10}H_9 \cdot HC(O)N(CH_3)_2$: Cs, 41.0; B, 33.4; C, 11.1; H, 5.0; N, 4.3. Found: Cs, 39.5; B, 32.7; C, 11.3; H, 5.1; N, 4.4.

B. A solution is prepared as described in Part A consisting of 5.0 g. of diammonium decahydrodecaborate and 75 ml. of N,N-dimethylformamide. Hydrogen chloride gas is passed through the solution with vigorous agitation for a total period of 45 minutes. The temperature of the solution rises to about 90–120° C. during this time and it is also necessary to filter the solution during the interval to remove a large portion of the precipitate which interferes with stirring. At the end of 45 minutes, passage of hydrogen chloride is stopped and the solution is cooled to prevailing atmospheric temperature (about 25° C.). It solidifies and ethanol is added to form a liquid solution. A solution of tetramethylammonium hydroxide in ethanol is added with stirring to precipitate tetramethylammonium N,N-dimethylformamide-nonahydrodecaborate(1⁻), a compound which has the formula $(CH_3)_4NB_{10}H_9 \cdot HCON(CH_3)_2$. The compound is separated by filtration and it is crystallized twice from hot water to obtain a product of high purity.

*Analysis.*—Calc'd for $(CH_3)_4NB_{10}H_9 \cdot HCON(CH_3)_2$: B, 41.0; C, 31.8; H, 10.6; N, 10.6. Found: B, 40.5; C, 32.7; H, 10.4; N, 10.5.

*Example 46*

The filtrate, set aside in Example 30, is used in the process of this example. An aqueous solution of tetrapropylammonium hydroxide is added to the filtrate and a solid precipitates which is separated by filtration to yield 21 g. of tetrapropylammonium (N-methyl-2-pyrrolidone)-nonahydrodecaborate(1⁻), i.e., a compound of the following formula:

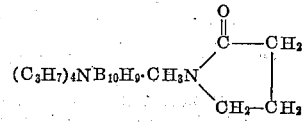

*Analysis.*—Calc'd for the above: C, 49.6; H, 11.1. Found: C, 49.8, 49.8; H, 11.7, 11.6.

The processes of Examples 43 to 46 are generic to the preparation of ionic compounds of the invention. Examples of products which can be obtained by the processes and the reactants which can be employed are as follows.

| Boron Reactant | Second Reactant | Product |
|---|---|---|
| $(CH_3)_4N_2B_{10}H_{10}$ | $(C_4H_9)_2S=O$ | $(CH_3)_4NB_{10}H_9 \cdot S(C_4H_9)_2$ |
| $Na_2B_{10}H_{10}$ | $(HOC_6H_4)_2S=O$ | $Na_2B_{10}H_9 \cdot S(C_6H_4OH)_2$ |
| $(C_2H_5)_4N_2B_{10}H_{10}$ | $HC(O)N(C_6H_5)_2$ | $(C_2H_5)_4NB_{10}H_9 \cdot HC(O)N(C_6H_5)_2$ |
| $Cs_2B_{10}H_{10}$ | $(CH_3)_3P=O$ | $CsB_{10}H_9 \cdot P(CH_3)_3$ |
| $[(CH_3)_3S]_2B_{10}H_{10}$ | $(CH_3)_3N=O$ | $(CH_3)_3SB_{10}H_9 \cdot N(CH_3)_3$ |
| $BaB_{10}H_{10}$ | $CH_3CN$ | $BaB_{10}H_9 \cdot CH_3CN$ |

The examples which follow illustrate the preparation of ionic compounds of the invention which bear X substituents bonded to boron atoms.

*Example 47*

A reaction vessel is charged with 200 ml. of acetonitrile and 20 g. of $CsB_{10}H_9 \cdot HC(O)N(CH_3)_2$, prepared as described in Example 45, Part A. The vessel is equipped with a gas inlet tube and chlorine gas is bubbled through the reaction mixture, which is a slurry, for 4.5 hours. The mixture forms a clear dark red solution which is diluted with water. The solid which forms is separated by filtration, washed and dried to obtain $$CsB_{10}Cl_9 \cdot HC(O)N(CH_3)_2$$

as a white crystalline product. The identity of the compound is confirmed by its infrared absorption spectrum.

*Example 48*

The compound $B_{10}H_5Br_3 \cdot 2S(CH_3)_2$, obtained as described in Example 35, Part G, is added to a solution of excess potassium phthalimide in dimethylformamide. The solution is refluxed for 15 minutes and it is then diluted with water. An aqueous solution of tetramethylammonium chloride is added with stirring to the reaction mixture and the white product which precipitates is separated by filtration. It is recrystallized from aqueous ethanol to yield tetramethylammonium dimethylsulfidetribromo(methylmercapto) - pentahydrodecaborate(1−), a white crystalline product of the formula $$(CH_3)_4NB_{10}H_5Br_3SCH_3 \cdot S(CH_3)_2$$

In this compound which is within the scope of Formula 2, Z is $S(CH_3)_2$ and there are four X groups, viz., three Br and one $-SCH_3$. The identity of the compound is confirmed by elemental analysis.

*Analysis.*—Calc'd for $$(CH_3)_4NB_{10}H_5Br_3SCH_3 \cdot S(CH_3)_2$$

B, 20.2; C, 15.7; H, 4.86; N, 2.61. Found: B, 18.52; C, 14.8; H, 4.06; N, 2.99.

A by-product obtained in the above process is N-methylphthalimide.

Example 49

A reaction vessel is charged with 10 g. of $$CsB_{10}H_9 \cdot S(CH_3)_2$$

prepared as described in Example 43, Part C, and 110 ml. of dimethylformamide. The mixture is stirred and a solution of 8.1 g. of iodine in 25 ml. of dimethylformaide is added. Stirring is continued for about 5 minutes and the color of the iodine in the solution disappears. The solution is then poured into an aqueous solution containing a mixture of tetramethylammonium hydroxide and tetramethylammonium chloride. A solid precipitates which is separated by filtration and it is recrystallized from water to obtain $(CH_3)_4NB_{10}H_8I \cdot S(CH_3)_2$, a white crystalline solid. The identity of the compound is confirmed by elemental analysis.

*Analysis.*—Calc'd for $(CH_3)_4NB_{10}H_8I \cdot S(CH_3)_2$: B, 28.5; C, 19.0; H, 7.0; S, 8.45. Found: B, 27.8; C, 19.3; H, 6.9; S, 8.48.

Example 50

A. A reaction vessel is charged with an aqueous solution of sodium hydroxide and the compound of Example 29, $B_{10}H_8 \cdot S(CH_3)_2 \cdot HC(O)N(CH_3)_2$, is added. The mixture is stirred until all of the solid is dissolved. Aqueous tetramethylammonium chloride solution is added with stirring until precipitation of solid product is complete. The solid is separated by filtration to obtain a compound of the formula $(CH_3)_4NB_{10}H_8OH \cdot S(CH_3)_2$. The identity of the compound is confirmed by its infrared absorption spectrum.

B. A reaction vessel is charged with 5.0 g. of $$B_{10}H_8 \cdot S(CH_3)_2 \cdot HC(O)N(CH_3)_2$$

and 50 ml. of aqueous 10% sodium hyroxide solution. The mixture is stirred until the solid component is dissolved and the solution is filtered. An aqueous solution of cesium hydroxide is added with stirring to the filtrate until precipitation of solid product is complete. The solid is separated by filtration and it is purified by recrystallization from water. The compound is cesium dimethylsulfide - monohydroxyoctahydrodecaborate(1−). The identity of the compound, which has the formula $CsB_{10}H_8OH \cdot S(CH_3)_2$, is confirmed by its infrared absorption spectrum and by elemental analysis.

*Analysis.*—Calc'd for $CsB_{10}H_8OH \cdot S(CH_3)_2$: B, 32.0; C, 7.3; H, 4.6; S, 9.7. Found: B, 32.6; C, 6.5; H, 4.3; S, 9.5.

C. A reaction vessel is charged with 80 g. of dicesium monoformyloxynonahydrodecaborate(2−), obtained as described in Example 57, Part A, 350 ml. of dimethyl sulfoxide and 70 ml. of concentrated hydrochloric acid. The mixture is heated on a steam bath for about 2 hours and it is then poured into two liters of waters. The precipitate which forms is separated by filtration. The solid product is mixed with aqueous sodium hydroxide solution (approximately 20% strength) and the solution is heated to boiling. The solution is filtered to obtain a clear filtrate to which an aqueous solution of tetramethylammonium chloride is added with stirring. The precipitate which forms is separated by filtration to obtain tetramethylammonium dimethylsulfide-monohydroxyoctahydrodecaborate(1−) as a white crystalline solid. The compound, for which the formula is $$(CH_3)_4NB_{10}H_8OH \cdot S(CH_3)_2$$

is purified by recrystallization from hot water.

*Analysis.*—Calc'd for $(CH_3)_4NB_{10}H_8OH \cdot S(CH_3)_2$: C, 26.7; H, 10.0; N, 5.2; S, 11.9. Found: C, 26.6; H, 10.0; N, 5.2; S, 11.8.

D. A mixture is prepared which consists of 25 ml. of 10% NaOH and 1.9 g. of $$B_{10}H_8 \cdot CH_3NC(O)C_2H_4CH_2 \cdot S(CH_3)_2$$

(alpha form), obtained as described in Example 32. The mixture is refluxed for 1 hour, cooled briefly and a solution of 3 g. of CsF in 15 ml. of water is added with stirring. The reaction mixture is warmed and evaporated on a steam bath until a solid separates. The solid is isolated and recrystallized from water to obtain $$CsB_{10}H_8OH \cdot S(CH_3)_2$$

which is identical with the compound obtained in Part B.

The infrared spectrum of the compound shows absorption at the following wavelengths (expressed in microns): 2.7 (medium), 3.0 (medium), 4.0 (sharp), 8.7 (medium), 9.0 (medium), 9.4 (medium), 9.7 (medium), 10.0 (medium), 10.2 (medium), 10.4 (medium), 10.8 (weak), 11.3 (very weak), 11.6 (very weak), 12.1 (weak), 13.2 (very weak), 13.9 (weak), and 14.3 (weak).

E. A mixture of 4 g. of $B_{10}H_8 \cdot N_2 \cdot S(CH_3)_2$ and 20 ml. of $$CH_3NC(O)C_2H_4CH_2$$

is processed as described in Example 32, Part C. The product $$B_{10}H_8 \cdot S(CH_3)_2 \cdot CH_3NC(O)C_2H_4CH_2$$

(beta form), is mixed with 25 ml. of aqueous 5% NaOH solution and the mixture is refluxed for 30 minutes. The mixture is filtered and an aqueous solution of $TlNO_3$ is added to the filtrate. The precipitate which forms is separated, washed and dried to obtain $$TlB_{10}H_8OH \cdot S(CH_3)_2$$

The identity of the compound is confirmed by its infrared spectrum which shows absorption at the following wavelengths (expressed as microns): 2.8 (medium), 3.0 (medium), 4.05 (strong), 8.3 (medium), 8.5 (medium), 9.0–9.3 (medium), 9.7 (medium), 10.0 (medium), 10.4 (weak), and 10.9 (weak).

Example 51

The compound obtained in Example 50, Part B, i.e., $CsB_{10}H_8OH \cdot S(CH_3)_2$, is heated on a steam bath with 98% formic acid for about 5 minutes to obtain a solid product whose infrared absorption spectrum shows that it is principally cesium dimethylsulfide monoformyloxyoctahydrodecaborate(1−), i.e., $CsB_{10}H_8OC(O)H \cdot S(CH_3)_2$.

Example 52

A. A glass reaction vessel is charged with 6 ml. of tributylphosphine and 2.0 g. of $B_{10}H_8 \cdot 2S(CH_3)_2$, obtained as described in Example 1. Nitrogen gas is passed into the vessel to provide an inert atmosphere and the solution is heated for a few minutes to 210° C. Excess tributylphosphine is then removed by distillation of the solution under reduced pressure. The solid residue is washed thoroughly with benzene and the residue is then dissolved in methanol. The solution is filtered and the filtrate is poured with stirring into an ethanol solution of tetramethylammonium chloride. The solid which precipitates is separated by filtration and it is crystallized from hot water to obtain, as a white crystalline product, a compound of the formula $(CH_3)_4NB_{10}H_8SCH_3 \cdot S(CH_3)_2$. The compound is referred to as tetramethylammonium dimethylsulfide-methylmercaptooctahydrodecaborate(1−), wherein the Z group of Formula 2 is dimethyl sulfide and the X group is methylmercapto($CH_3S-$).

*Analysis.*—Calc'd for $(CH_3)_4NB_{10}H_8SCH_3 \cdot S(CH_3)_2$: B, 36.2; C, 28.1; H, 9.77; N, 4.58; S, 21.4; M.W., 299.6. Found: B, 36.4; C, 27.7; H, 9.52; N, 4.25; S, 21.5; M.W., 299.0.

In a second preparation, a mixture of 0.5 g. of $B_{10}H_8 \cdot 2S(CH_3)_2$ and 8 ml. of tributylphosphine is heated to 220° C. for a short period and the reaction product is processed as described above to obtain the compound described in the preceding paragraph.

B. A glass reaction vessel, equipped with a stirrer and reflux condenser, is charged with 4.0 g. of $$B_{10}H_8 \cdot 2S(CH_3)_2$$

obtained as described in Example 1, 4.0 g. of potassium phthalimide, and 75 ml. of dimethylformamide. The mixture is refluxed for 20 minutes and, after cooling, it is filtered. Solvent is removed from the filtrate by evaporation under reduced pressure until a sludge remains. The residue is stirred with water and the mixture is filtered. An aqueous solution of cesium fluoride is added to the filtrate and the solution is filtered again. An aqueous solution of tetramethylammonium chloride is now added with stirring to the filtrate and the white precipitate which forms is separated by filtration. The product is $$(CH_3)_4NB_{10}H_8SCH_3 \cdot S(CH_3)_2$$

i.e., the compound obtained in Part A. The identity of the compound is confirmed by its infrared absorption spectrum and, further, by elemental analysis (boron, calc'd: 36.2; found: 35.87).

C. A mixture of 2.0 g. of $B_{10}H_8 \cdot 2S(CH_3)_2$, 2.0 g. of potassium phthalimide and 50 ml. of dimethylformamide is heated to reflux temperature for 15 minutes. The solution is filtered and the filtrate is treated with an aqueous solution of tetramethylammonium chloride. The white solid which precipitates is purified by crystallization to yield a compound of the formula stated in Parts A and B of this example, i.e., $(CH_3)_4NB_{10}H_8SCH_3 \cdot S(CH_3)_2$.

Example 52–A which follows illustrates a further procedure for introducing —SR substituents on the boron cage. In this procedure, a compound of the formula $B_{10}H_8 \cdot 2SR_2$ is reacted with a thiophenol in the presence of a strong base.

Example 52–A

A. Two solutions are prepared consisting of (a) 24.0 g. (0.10 mole) of $B_{10}H_8 \cdot 2S(CH_3)_2$ in 22.0 g. of thiophenol and (b) 11.2 g. (0.20 mole) of KOH in 100 ml. of ethanol. The solutions are mixed and the suspension which forms is refluxed for 6 hours. A clear light brown solution forms which, after cooling, is poured into a solution of 30.0 g. of CsF in 200 ml. of $C_2H_5OH$. A white gum precipitates which is solidified by cooling and stirring. The solid is separated by filtration and extracted with 100 ml. of hot water. The insoluble portion from the water extraction is now heated in 300 ml. of water to boiling, the solution is filtered and cooled. The precipitate which forms is separated, washed and dried to obtain cesium dimethylsulfide-methylmercaptooctahydrodecaborate(1−).

*Analysis.*—Calc'd for $CsB_{10}H_8SCH_3 \cdot S(CH_3)_2$: C, 10.1; H, 4.8; B, 30.2. Found: C, 10.3; H, 4.9; B, 30.4.

B. A solution of 5.0 g. of $CsB_{10}H_8SCH_3 \cdot S(CH_3)_2$ in 500 ml. of water is passed through a glass column filled with a commercial acid ion-exchange resin. The aqueous effluent, which contains $HB_{10}H_8SCH_3 \cdot S(CH_3)_2$, or in its hydronium form, $(H_3O)B_{10}H_8SCH_3 \cdot S(CH_3)_2$, is evaporated under reduced pressure to dryness. The free acid is obtained as a white crystalline product.

*Analysis.*—Calc'd for $HB_{10}H_8SCH_3 \cdot S(CH_3)_2$: C, 15.9; H, 7.9; S, 28.4. Found: C, 13.4; H, 7.3; S, 28.1.

Example 53

The tetramethylammonium salt, $$(CH_3)_4NB_{10}H_8SCH_3 \cdot S(CH_3)_2$$

obtained as described in Example 52, is dissolved in hot water and the solution is passed through a column packed with a polysulfonic acid ion-exchange resin ("Amberlite IR–120–H"). The acidic effluent is evaporated to dryness and the white residue is crystallized from a benzene-petroleum ether solution. The compound which is obtained is hydrogen dimethylsulfide-methylmercaptooctahydrodecaborate(1−), i.e., $HB_{10}H_8SCH_3 \cdot S(CH_3)_2$. It decomposes on heating to 190–195° C. In this compound which falls within the scope of Formula 1, M is H, X is $SCH_3$ and Z is $S(CH_3)_2$.

*Analysis.*—Calc'd for $HB_{10}H_8SCH_3 \cdot S(CH_3)_2$: B, 47.7; S, 28.3. Found: B, 47.8; S, 28.4.

The aqueous solution of the acid of Example 53 is neutralized with an aqueous solution of LiOH to obtain $Li[B_{10}H_8SCH_3 \cdot S(CH_3)_2]$.

Example 54

A portion of the compound $HB_{10}H_8NH_2 \cdot S(CH_3)_2$, is dissolved in equeous sodium hydroxide solution and an aqueous solution of $(CH_3)_4NCl$ is added. The precipitate which forms is separated, washed and dried to obtain $(CH_3)_4NB_{10}H_8NH_2 \cdot S(CH_3)_2$.

Example 55

A solution consisting of 11.3 g. of hydroxylamine-O-sulfonic acid in 100 ml. of water is neutralized by adding a solution of 5.3 parts of $Na_2CO_3$ in 20 ml. of water. The neutral solution is added with stirring to a solution of 15 g. of $KB_{10}H_9 \cdot S(CH_3)_2$, prepared as described in Example 43, Part E, in 100 ml. of water. The mixture is heated at 95° C. for 2 hours and then cooled. A sticky mass of crystals form which are separated and dried in air. The dried product is recrystallized from a mixture of ethanol and propanol to obtain 4 g. of $$HB_{10}H_8NH_2 \cdot S(CH_3)_2$$

This compound can also be written as an inner salt, i.e., $B_{10}H_8NH_3 \cdot S(CH_3)_2$. The product melts at 290° C.

*Analysis.*—Calc'd for $HB_{10}H_8NH_2 \cdot S(CH_3)_2$: C, 12.3; H, 8.8; B, 55.4; N, 7.17; S, 16.4. Found: C, 12.4; H, 8.6; B, 54.9; N, 7.35; S, 16.6.

Example 56

A. A reaction vessel is charged with 150 ml. of dimethylformamide and 48 ml. of an aqueous solution containing 0.23 mole of $(H_3O)_2B_{10}H_{10}$ is poured into it with stirring. The reaction mixture is distilled at atmospheric pressure until a still head temperature of 130° C. is reached. The solution which remains in the still pot is cooled and it is added with stirring to a solution containing 60 g. of cesium hydroxide in 600 ml. of ethanol and 50 ml. of methanol. A precipitate forms which is separated by filtration. The solid product is dicesium formyloxynonahydrodecaborate(2−), i.e., a compound of the formula $Cs_2B_{10}H_9OC(O)H$.

*Analysis.*—Calc'd for $Cs_2B_{10}H_9OC(O)H$: Cs, 62.1; B, 2.50; C, 2.80; H, 2.34. Found: Cs, 62.0; B, 25.6, 25.4; C, 2.74; H, 2.65.

B. The filtrate which is obtained in the above separation step is distilled to remove alcohol solvents. The residue from the distillation is mixed with an aqueous solution containing 20 g. of tetramethylammonium chloride.

The precipitate which forms is separated by filtration and 3.8 g. of the acid salt, tetramethylammonium hydrogen dimethylaminononahydrodecaborate(2−), is obtained. The identity of the product which has the formula $(CH_3)_4NHB_{10}H_9N(CH_3)_2$ is confirmed by elemental analysis.

*Analysis.*—Calc'd for $(CH_3)_4NHB_{10}H_9N(CH_3)_2$: B, 45.7; C, 30.5; H, 11.9; N, 11.8. Found: B, 44.0; C, 31.5; H, 11.6; N, 11.8.

A reaction vessel is charged with 1.0 g. of $(CH_3)_4NHB_{10}H_9N(CH_3)_2$ obtained as above, 10 ml. of dimethylsulfoxide and 3 ml. of concentrated hydrochloric acid. The mixture is heated on a steam bath for 30 minutes. It is then poured into 100 ml. of water with stirring and the precipitate which forms is separated by filtration. The solid is dissolved in acetone and reprecipitated with water. The product is recrystallized from methanol-water solution to obtain 0.25 g. of hydrogen dimethylsulfidedimethylaminooctahydrodecaborate(1−), i.e., $[H][B_{10}H_8N(CH_3)_2·S(CH_3)_2]$, a compound which falls within the scope of Formula 2. The compound can also be viewed as an inner salt in which the hydrogen in brackets is associated with the nitrogen of the dimethylamino group. This structure, which is suggested by the infrared absorption spectrum, is represented as $B_{10}H_8NH(CH_3)_2·S(CH_3)_2$.

The compound is a white crystalline solid which decomposes at 206–207° C. Its identity is confirmed by elemental analysis.

*Analysis.*—Calc'd for $HB_{10}H_8N(CH_3)_2·S(CH_3)_2$: S, 14.3; N, 6.27. Found: S, 14.3; N, 6.20.

*Example 57*

A solution of 3.4 g. of tetramethylammonium dimethylsulfide-nonahydrodecaborate(1−)

$[(CH_3)_4NB_{10}H_9·S(CH_3)_2]$ obtained as described in Example 43, Part A, is prepared in about 100 ml. of boiling water and the hot solution is passed through a column packed with an acidic ion-exchange resin ["Amberlite IR-120-H"]. The effluent, which is a solution of $HB_{10}H_9·S(CH_3)_2$, or, more properly, $(H_3O)B_{10}H_9·S(CH_3)_2$, is evaporated under reduced pressure to a volume of about 4 ml. and the liquid residue is filtered. About 20 ml. of 1,2-dimethoxyethane (glyme) is mixed with the filtrate. In this step a transient blue color forms but the final liquid solution is essentially colorless. Benzoyl chloride (8 ml.) is added with stirring to the solution and the mixture is allowed to stand at atmospheric temperature (about 25° C.) for 45 minutes. The solution, which is yellow in color, is heated on a steam bath for 10 minutes during which period the color becomes a deep red. The solution is poured with stirring into 100 ml. of isopropyl alcohol containing sufficient tetramethylammonium hydroxide (as the pentahydrate) to maintain a basic solution. More tetramethylammonium hydroxide can be added, if needed, to the isopropyl alcohol solution during this step to keep the solution basic. A tan-colored solid precipitates which is separated by filtration. The product, which is dried, is tetramethylammonium dimethylsulfide - monobenzoyloctahydrodecaborate(1−), i.e., $(CH_3)_4NB_{10}H_8C(O)C_6H_5·S(CH_3)_2$.

*Example 58*

A reaction vessel is charged with 50 ml. of glacial acetic acid, 2.1 g. of dimethylsulfoxide and 5 g. of bis(tetramethylammonium) monobenzoylnonahydrodecaborate(2−), prepared as described in Example B. The charged vessel is cooled in a mixture of ice and water, and the reaction mixture is stirred to form a slurry. Hydrogen chloride gas is passed through the mixture for 5 minutes at a rate which maintains a reaction temperature of 21 to 26° C. The reaction vessel is removed from the ice bath and passage of gaseous hydrogen chloride is continued for 2 minutes without cooling the mixture. A red solution is formed which is poured into 400 ml. of water with stirring. An orange-colored solid precipitates which is separated by filtration. A portion of the solid (called Fraction A) is dissolved in acetone and this solution is poured slowly with stirring into an aqueous potassium hydroxide solution (approximately 2 molar). A cloudy solution forms which contains $KB_{10}H_8C(O)C_6H_5·S(CH_3)_2$ The solution is filtered through a commercial diatomaceous earth to yield a clear filtrate. A saturated aqueous solution of thallium nitrate is poured into the filtrate with stirring to form a light yellow solid which is separated by filtration. The solid is crystallized from solution in water on a steam bath to yield thallium dimethylsulfide-monobenzoyloctahydrodecaborate(1−), a compound of the formula $TlB_{10}H_8C(O)C_6H_5·S(CH_3)_2$. The identity of the compound is confirmed by elemental analysis.

*Analysis.*—Calc'd for $TlB_{10}H_8C(O)C_6H_5·S(CH_3)_2$: B, 22.0; C, 22.1; H, 3.9; S, 6.5; Tl, 42.0. Found: B, 22.7; C, 23.0; H, 4.4; S, 7.4; Tl, 38.5.

*Example 59*

A solution of 4.6 g. (0.013 mole) of $Cs[B_{10}H_8SCH_3·S(CH_3)_2]$ in 400 ml. of water is added drop-wise and with stirring to a solution of 1.4 g. (0.013 mole) of BrCN in 200 ml. of water. The solution becomes yellow and a precipitate forms slowly as the reaction progresses. When addition of the solution of the cesium salt is completed, the precipitate is separated by filtration. The precipitate contains $B_{10}H_8·2S(CH_3)_2$ and other by-products of the reaction. The filtrate is evaporated almost to dryness under reduced pressure at 25° C. The yellow solid which remains is recrystallized twice from hot water to obtain about 0.2 g. of cesium dimethylsulfide-thiocyanooctahydrodecaborate (1−).

*Analysis.*—Calcd. for $CsB_{10}H_8SCN·S(CH_3)_2$: C, 9.75; H, 3.79; S, 17.40; NN, 3.75. Found: C, 9.94; H, 4.10; S, 17.50; N, 3.84.

Examples of compounds which can be obtained by the substitution processes, and reactants which can be employed are as follows:

| Boron reactant | Second reactant | Product |
|---|---|---|
| $[(C_3H_7)_4N]B_{10}H_9·O_2S(C_6H_{11})_2$ | $Br_2$ | $(C_3H_7)_4NB_{10}Br_9·O_2S(C_6H_{11})_2$ |
| $CsB_{10}H_8OH·S(CH_3)_2$ | $[CH_3C(O)]_2O$ | $CsB_{10}H_8OC(O)CH_3·S(CH_3)_2$ |
| $CsB_{10}H_8OH·S(CH_3)_2$ | $C_6H_5C(O)Cl$ | $CsB_{10}H_8OC(O)C_6H_5·S(CH_3)_2$ |
| $CsB_{10}H_8OH·N_2$ | $(C_2H_5)_3N$ | $CsB_{10}H_8OH·N(C_2H_5)_3$ |
| $CsB_{10}Cl_9·N_2$ | $(C_4H_9)_3P$ | $CsB_{10}Cl_9·P(C_4H_9)_3$ |
| $NaB_{10}H_8NH_2·S(CH_3)_2$ | $C_6H_5NCO$ | $NaB_{10}H_8NHC(O)NHC_6H_5·S(CH_3)_2$ |
| $CsB_{10}H_9·HC(O)N(CH_3)_2$ | $C_6H_5CH_2C(O)Cl$ | $CsB_{10}H_8C(O)CH_2C_6H_5·HC(O)N(CH_3)_2$ |
| $HB_{10}H_9·(CH_3)_2$ | $CH_3—CH=CH_2$ | $HB_{10}H_8C_3H_7·S(CH_3)_2$ |
| $HB_{10}H_9·CH_3CN$ | $C_6H_5CH=CH_2$ | $HB_{10}H_8C_2H_4C_6H_5·CH_3CN$ |

As further illustrations of procedures for obtaining compounds of the invention bearing X groups, fluorine-substituted products are prepared by reacting hydroxyl-bearing decaborates with hydrogen fluoride, e.g., $B_{10}H_7OH·2S(CH_3)_2$ is reacted with HF to obtain $B_{10}H_7 \cdot F2S(CH_3)_2$; compounds bearing azide groups (—$N_3$) are obtained by reacting $B_{10}H_8 \cdot N_2 \cdot Z$ [where Z is defined as in Formula 1] with a metal azide, e.g., $B_{10}H_8 \cdot N_2 \cdot S(CH_3)_2$ is reacted with $NaN_3$ to obtain $NaB_{10}H_8N_3 \cdot S(CH_3)_2$; compounds bearing thiol groups (—SH) are obtained by reacting $$B_{10}H_8 \cdot 2N_2$$

or $B_{10}H_8 \cdot N_2 \cdot Z$ with hydrogen sulfide, preferably under pressure, e. g., $B_{10}H_8 \cdot N_2 \cdot S(CH_3)_2$ is reacted with $H_2S$ in a pressure vessel at autogenous pressure to obtain $HB_{10}H_8SH \cdot S(CH_3)_2$. Thiol-substituted compounds can be oxidized to obtain products bearing a sulfo group (—$SO_3H$), e.g., $HB_{10}H_8SH \cdot S(CH_3)_2$ can be oxidized with hydrogen peroxide to obtain $$H_2B_{10}H_8SO_3H \cdot S(CH_3)_2$$

The processes illustrated in Examples 43–59 are generically applicable for the preparation of ionic compounds of the invention, represented by Formula 2. Compounds can be obtained having a wide range of X substituents, as described in earlier paragraphs for the non-ionic group. Thus, ionic compounds are obtained bearing such groups as carboxyl, halogens, nitro, amine, azo, sulfo, acyl (acetyl, capryl, methacryl), alkoxy (methoxy, hexyloxy, phenoxy), hydrocarbonyloxy (propionyloxy, hexanoyloxy), cyano, hydroxy, and the like, by employing the reactions described earlier for the introduction of X groups and their modification.

The ionic compounds of the invention, i.e., compounds of Formula 2, are generally isolated in the form of salts of low solubility in water, e.g., cesium, tetramethylammonium, trimethylsulfonium and like salts in which the cation has a large atomic volume. These salts are readily converted, as described earlier, to the free acid, i.e., to a compound of Formula 2 where M is $H^+$ or, in its hydrated form, $(H_3O)^+$, by contacting solutions of the salts with commercially available acid ion-exchange resins. The aqueous solutions are then neutralized with bases or salts of volatile anions and the solutions are evaporated to dryness. This procedure is a versatile means of obtaining salts having any desired cation M. The following examples are illustrative of the process, the acid reactant being obtained as described above:

Uses for compounds of the invention

The compounds of the invention, represented by Formula 1, are generically useful as combustible components of propellant compositions for fireworks, flares or rockets. Each of the compounds of the invention contains boron as a common element. The presence of this element imparts a green color to fireworks, flare or rocket displays. Other components in the compounds of the invention, e.g., the cation M in the ionic species, the substituent X bonded to boron or the group Z, can impart other colors or permit a modification in the characteristics of the propellant composition and by proper choice of these components a broad range of color effects can be accomplished in this generic utility. The compounds of the invention are preferably employed for this use in combination with oxidizing agents, e.g., lithium perchlorate, sodium nitrate, potassium permanganate, strontium peroxide, manganese dioxide, and the like, to obtain the desired propulsive effect and color. The following combinations in which the boron-containing compound can be present in from about 5–25% by weight are illustrative of the compositions which can be used:

$$B_{10}H_8 \cdot 2S(CH_3)_2—NaNO_3,\ B_{10}H_8 \cdot 2P(C_4H_9)_3—LiNO_3$$

$$B_{10}H_8 \cdot 2CH_3NC(O)CH_2CH_2CH_2—SrNO_3—KNO_3$$

$$B_{10}H_8 \cdot 2CH_3SC_6H_4NH_2—NH_4NO_3$$

$$B_{10}H_8 \cdot 2CH_3CN—LiClO_4$$

$$B_{10}H_5Br_3—KMnO_4,\ CsB_{10}H_9 \cdot HC(O)N(CH_3)_2—NaClO_4$$

$$CsB_{10}H_8OH \cdot S(CH_3)_2—MnO_2—SrNO_3$$

and the like. These examples are not limiting but are illustrative of the combinations which are possible for use in the above field.

The compounds of the invention are generically useful as impregnating agents for cellulosic materials in the preparation of resistors. To illustrate, a section of cellulosic string is immersed in a saturated solution of $B_{10}H_8 \cdot 2S(CH_3)_2$ in acetone for a short period and it is suspended in air until the solvent is evaporated. The dried string is ignited with an open flame and burns vigorously. There remains a self-supporting ash of substantially the same size and shape as the string. The residue, embedded in paraffin, has a resistance of about 3000–4000 ohms/inch. A section of string, treated as described above with a saturated solution of

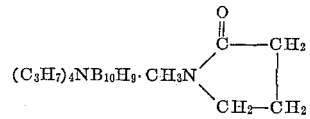

yields a shaped residue having a resistance of about 40,000 ohms/inch. The compounds of the invention, as exemplified in Examples 1–59, are useful in this field of application.

In the group of compounds which fall within the scope of Formula 2, the component M represents a range of groups which are readily interchangeable by metathetic

TABLE II

| Polyborate salt | Derived acid | Neutralizing reagent | Product |
| --- | --- | --- | --- |
| $(CH_3)_4NB_{10}H_9 \cdot S(CH_3)_2$ | $HB_{10}H_9 \cdot S(CH_3)_2$ | $C_5H_5N$ <br> $Ba(OH)_2$ | $C_5H_5NHB_{10}H_9 \cdot S(CH_3)_2$ <br> $Ba[B_{10}H_9 \cdot S(CH_3)_2]_2$ |
| $(CH_3)_4NB_{10}H_9 \cdot O_2SCH_2(CH_2)_2CH_2$ | $HB_{10}H_9 \cdot O_2SCH_2(CH_2)_2CH_2$ | $(CH_3)_3SOH$ <br> $(C_4H_9)_4POH$ | $(CH_3)_3SB_{10}H_9 \cdot O_2SCH_2(CH_2)_2CH_2$ <br> $(C_4H_9)_4PB_{10}H_9 \cdot O_2SCH_2(CH_2)_2CH_2$ |
| $CsB_{10}H_9 \cdot HC(O)N(CH_3)_2$ | $HB_{10}H_9 \cdot HC(O)N(CH_3)_2$ | $Na_2CO_3$ <br> $RbOH$ | $NaB_{10}H_9 \cdot HC(O)N(CH_3)_2$ <br> $RbB_{10}H_9 \cdot HC(O)N(CH_3)_2$ |
| $CsB_{10}Cl_9 \cdot HC(O)N(CH_3)_2$ | $HB_{10}Cl_9 \cdot HC(O)N(CH_3)_2$ | $C_6H_5N(CH_3)_2$ <br> $C_4H_9NH_2$ | $C_6H_5NH(CH_3)_2B_{10}Cl_9 \cdot HC(O)N(CH_3)_2$ <br> $C_4H_9NH_3B_{10}Cl_9 \cdot HC(O)N(CH_3)_2$ |
| $(CH_3)_4NB_{10}H_8I \cdot S(CH_3)_2$ | $HB_{10}H_8I \cdot S(CH_3)_2$ | $Ag_2O$ <br> $CaCl_2$ | $AgB_{10}H_8I \cdot S(CH_3)_2$ <br> $Ca[B_{10}H_8I \cdot S(CH_3)_2]_2$ |
| $CsB_{10}H_8OH \cdot S(CH_3)_2$ | $HB_{10}H_8OH \cdot S(CH_3)_2$ | $MgCO_3$ <br> $CoCO_3$ | $Mg(H_2O)_4[B_{10}H_8OH \cdot S(CH_3)_2]_2$ <br> $Co(H_2O)_6[B_{10}H_8OH \cdot S(CH_3)_2]_2$ |
| $CsB_{10}H_8OC(O)H \cdot S(CH_3)_2$ | $HB_{10}H_8OC(O)H \cdot S(CH_3)_2$ | $NiCO_3$ <br> $FeCl_3$ | $Ni[B_{10}H_8OC(O)H \cdot S(CH_3)_2]_2$ <br> $Fe(H_2O)_6[B_{10}H_8OC(O)H \cdot S(CH_3)_2]_3$ |
| $(CH_3)_4NB_{10}H_8NO_2 \cdot S(CH_3)_2$ | $HB_{10}H_8NO_2 \cdot S(CH_3)_2$ | $MnCO_3$ <br> $HOCH_2CH_2NH_2$ | $Mn(H_2O)_6[B_{10}H_8NO_2 \cdot S(CH_3)_2]_2$ <br> $HOCHCH_2NH_3B_{10}H_8NO_2 \cdot S(CH_3)_2$ |
| | $HB_{10}H_8N(CH_3)_2 \cdot S(CH_3)_2$ | $C_{10}H_7NH_2$ <br> Quinoline | $C_{10}H_7NH_3B_{10}H_8N(CH_3)_2 \cdot S(CH_3)_2$ <br> $C_9H_7NHB_{10}H_8N(CH_3)_2 \cdot S(CH_3)_2$ |
| $(CH_3)_4NB_{10}H_8C(O)C_6H_5 \cdot S(CH_3)_2$ | $HB_{10}H_8C(O)C_6H_5 \cdot S(CH_3)_2$ | $NH_2CH_2COOH$ <br> $NH_2CH_2COOC_2H_5$ | $HO(O)CCH_2NH_3B_{10}H_8C(O)C_6H_5 \cdot S(CH_3)_2$ <br> $C_2H_5O(O)CCH_2NH_3B_{10}H_8C(O)C_6H_5 \cdot S(CH_3)_2$ |
| $CsB_{10}H_8SCN \cdot S(CH_3)_2$ | $HB_{10}H_8SCN \cdot S(CH_3)_2$ | $HOCH_2CH_2NH(C_2H_5)_2$ <br> $C_6H_5CH_2NH_2$ | $HOCH_2CH_2NH(C_2H_5)_2B_{10}H_8SCN \cdot S(CH_3)_2$ <br> $C_6H_5CH_2NH_3B_{10}H_8SCN \cdot S(CH_3)_2$ | reactions as described earlier. All of the salts which fall within the scope of Formula 2 can be used to prepare the group of acids represented generically as $HB_{10}H_{9-y}X_y \cdot Z$, or, in aqueous solution, as $(H_3O)(B_{10}H_{9-y}X_y \cdot Z)$ by passing aqueous or alcoholic solutions of the salts through an acidic ion-exchange resin as described earlier. The acids of this group are strong acids and they are useful in industrial applications where it is desired to avoid contamination from sulfate, chloride, bromide, chlorate, phosphate, and like strong acid anions. Thus, the acids of Formula 2, where M is H (or $H_3O^+$) are useful for etching metals, such as steel, and for rust removal, for pickling, for scale removal and for similar metal processing operations.

The acids are useful as catalysts in the preparation of esters, e.g., in the reaction of alcohols and organic acids, to improve the yields of the desired esters. The acids of the invention are employed for this purpose in the same manner as p-toluenesulfonic acid, sulfuric acid or alcoholic hydrogen chloride.

The acids obtained from each of the compounds of Examples 43 through 59 are useful as described above.

The acids and many of the salts, particularly the alkali metal and alkaline earth metal salts, are useful as sequestering agents for heavy metals. Thus, a mixture of hydrocarbons in the boiling range of gasoline which contains a copper salt of an organic acid (copper stearate), is thoroughly agitated with aqueous ammoniacal solutions of any of the alkali metal or alkaline earth metal salts of the compounds of Formula 2, e.g., $CsB_{10}H_9 \cdot S(CH_3)_2$, $CsB_{10}H_9 \cdot HCON(CH_3)_2$, and the like. The hydrocarbon layer, which is separated from the aqueous reagent, is completely free of deleterious copper salt.

The new compounds, particularly the acids, alkali metal, alkaline earth metal and ammonia salts, are useful as sequestering agents for metals in aqueous media. Thus, copper, nickel, cobalt, zinc and cadmium are removed from aqueous solutions of salts containing these metals by mixing the solutions with ammoniacal solutions of the acids and alkali metal, alkaline earth metal and ammonium salts.

The substituted ammonium salts and, in general, all of the nitrogen-base salts as well as phosphonium and sulfonium salts are useful in the field of sequestering agents to remove undesirable metals from aqueous or hydrocarbon media, e.g.,

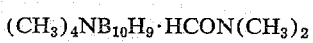

$(CH_3)_4NB_{10}H_9 \cdot HCON(CH_3)_2$

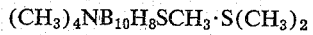

$(CH_3)_4NB_{10}H_8SCH_3 \cdot S(CH_3)_2$ and the like.

The silver salts, i.e., the compounds of Formula 2, where M is Ag, are sensitive to light and they are useful in the photographic arts. To illustrate, the cesium salt, $CsB_{10}H_9 \cdot S(CH_3)_2$, is reacted with silver nitrate to obtain $AgB_{10}H_9 \cdot S(CH_3)_2$. An alcoholic solution of the silver salt is prepared in subdued light and a strip of pure cellulose sheet is immersed to half its length in the solution. The strip is removed and dried in the absence of light. When exposed to light the treated portion of the strip turns dark while the untreated portion is not affected.

The neutral or non-ionic group of compounds of the invention, which are represented by Formula 3, can be used as intermediates for the preparation of the ionic group of compounds which are represented by Formula 2. The use of ionic compounds as intermediates is illustrated in Examples 48 and 52.

Since many different embodiments of the invention may be made without departing from the spirit and scope thereof, it is to be understood that the invention is not limited by the specific illustrations except to the extent defined in the following claims.

The embodiments of the invention in which an exclusive property or privilege is claimed are defined as follows:

1. A compound of the formula

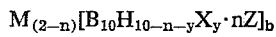

$$M_{(2-n)}[B_{10}H_{10-n-y}X_y \cdot nZ]_b$$

wherein M is a cation having a valence from 1 to 3; X is bonded to boron and is a monovalent group which is capable of bonding to nuclear carbon of a carbocyclic aromatic compound by replacement of hydrogen, and is (1) a group derived from an electrophilic reagent by direct attack on the boron cage, or (2) is a group derived by modification of a group in (1) by reduction, esterification, hydrolysis, dehydration, amidation and combinations thereof; Z is selected from the group consisting of organic sulfides, tertiary phosphines, tertiary amines, amides of carboxylic acids, organic sulfones and nitriles; $n$ is a cardinal number of from 1 to 2, inclusive; $(2-n)$ represents the number of M groups which are present in the compound; $y$ is a cardinal number of from 0 to $(10-n)$, inclusive, and $b$ is equal to the valence of M when $n$ is 1 and $b$ is 1 when $n$ is 2.

2. A compound of the formula

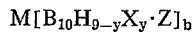

$$M[B_{10}H_{9-y}X_y \cdot Z]_b$$

wherein M is a cation having a valence from 1 to 3; X is bonded to boron and is a monovalent group which is capable of bonding to nuclear carbon of a carbocyclic aromatic compound by replacement of hydrogen, and is (1) a group derived from an electrophilic reagent by direct attack on the boron cage, or (2) is a group derived by modification of a group in (1) by reduction, esterification, hydrolysis, dehydration, amidation and combinations thereof; Z is selected from the group consisting of organic sulfides, tertiary phosphines, tertiary amines, amides of carboxylic acids, organic sulfones and nitriles; $y$ is a cardinal number of from 0 to 9, inclusive, and $b$ is esual to the valence of M.

3. A compound of the formula

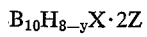

$$B_{10}H_{8-y}X \cdot 2Z$$

wherein X is bonded to boron and is a monovalent group which is capable of bonding to nuclear carbon of a carbocyclic aromatic compound by replacement of hydrogen, and is (1) a group derived from an electrophilic reagent by direct attack on the boron cage, or (2) is a group derived by modification of a group in (1) by reduction, esterification, hydrolysis, dehydration, amidation and combinations thereof; Z is selected from the group consisting of organic sulfides, tertiary phosphines, tertiary amines, amides of carboxylic acids, organic sulfones and nitriles; and $y$ is a cardinal number of from 0 to 8, inclusive.

4. A compound of the formula

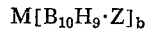

$$M[B_{10}H_9 \cdot Z]_b$$

wherein M is a cation having a valence from 1 to 3; Z is selected from the group consisting of organic sulfides, tertiary amines, amides of carboxylic acids, organic sulfones and nitriles; and $b$ is equal to the valence of M.

5. A compound of the formula

$$B_{10}H_8 \cdot 2Z$$

wherein Z is selected from the group consisting of organic sulfides, tertiary phosphines, tertiary amines, amides of carboxylic acids, organic sulfones and nitriles.

6. A compound of the formula

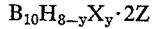

$$B_{10}H_{8-y}X_y \cdot 2Z$$

wherein X is bonded to boron and is a monovalent group which is capable of bonding to nuclear carbon of a carbocyclic aromatic compound by replacement of hydrogen, and is (1) a group derived from an electrophilic reagent by direct attack on the boron cage, or (2) is a group derived by modification of a group in (1) by reducation, esterification, hydrolysis, dehydration, amidation and combinations thereof; Z is selected from the group consisting of organic sulfides, tertiary phosphines, tertiary amines, amides of carboxylic acids, organic sulfones and nitriles; and $y$ is a cardinal number of from 1 to 8, inclusive.

7. A compound of the formula $$M[B_{10}H_{9-y}X_y \cdot Z]_b$$

wherein M is a cation having a valence from 1 to 3; X is bonded to boron and is a monovalent group which is capable of bonding to nuclear carbon of a carbocyclic aromatic compound by replacement of hydrogen, and is (1) a group derived from an electrophilic reagent by direct attack on the boron cage, or (2) is a group derived by modification of a group in (1) by reduction, esterification, hydrolysis, dehydration, amidation and combinations thereof; Z is selected from the group consisting of organic sulfides, tertiary phosphines, tertiary amines, amides of carboxylic acids, organic sulfones and nitriles; $y$ is a cardinal number of from 1 to 9, inclusive; and $b$ is equal to the valence of M.

8. A compound of the formula $$M_{(2-n)}[B_{10-n-y}X_y \cdot nZ]_b$$

wherein M is a cation having a valence of from 1 to 3; X is a substituent selected from the class consisting of hydroxyl and halogen of atomic number of at least 17; Z is an organic sulfide; $n$ is a cardinal number of from 1 to 2, inclusive; $(2-n)$ represents the number of M groups present; $y$ is a cardinal number of from 0 to $(10-n)$, inclusive; and $b$ is equal to the valence of M when $n$ is 1 and $b$ is 1 when $n$ is 2.

9. A compound of claim 8 wherein Z is tertiary phosphine.

10. A compound of claim 8 wherein Z is tertiary amine.

11. A compound of claim 8 wherein Z is an amide of carboxylic acid.

12. A compound of claim 8 wherein Z is organic sulfone.

13. A compound of claim 8 wherein Z is nitrile.

14. Process for the formation of a compound selected from the class consisting of $$M[B_{10}H_9 \cdot Z]_b \quad \text{and} \quad B_{10}H_8 \cdot 2Z$$

wherein M is a cation having a valence from 1 to 3; Z is a member of the group consisting of organic sulfides, tertiary phosphines and tertiary amines and $b$ is equal to the valence of M, which comprises treating a compound selected from the class consisting of $H_2B_{10}H_{10}$, $Na_2B_{10}H_{10}$, $K_2B_{10}H_{10}$, and $(NH_4)_2B_{10}H_{10}$, with a number of the group consisting of organic sulfoxides, phosphine oxides and amine oxides in the presence of a strong acid within a temperature range of $-20°$ C. to $110°$ C., isolating $B_{10}H_8 \cdot 2Z$ from the reaction mixture, contacting the reaction mixture free of $B_{10}H_8 \cdot 2Z$ with a salt containing the cation M, and separating therefrom the compound $M(B_{10}H_9 \cdot Z)_b$.

15. Process for the formation of a compound of the formula $$M[B_{10}H_9 \cdot Z]_b$$

wherein M is a cation having a valence from 1 to 3; Z is selected from the class consisting of organic sulfones and amides of a carboxylic acid and $b$ is equal to the valence of M, which comprises treating a compound selected from the class consisting of $H_2B_{10}H_{10}$, $Na_2B_{10}H_{10}$, $K_2B_{10}H_{10}$, and $(NH_4)_2B_{10}H_{10}$, with a compound selected from the class consisting of organic sulfones and amides of a carboxylic acid in the presence of a strong acid, and continuing the addition of acid until heat is no longer evolved, removing insoluble material by filtration, reacting the remaining filtrate with a salt containing the cation M, and separating therefrom the compound $M(B_{10}H_9 \cdot Z)_b$.

16. Process for the formation of a compound of the formula $$B_{10}H_8 \cdot 2Z$$

wherein Z is selected from the class consisting of organic sulfones and amides of a carboxylic acid which comprises treating $M_{a'}(B_{10}H_{10})_{b'}$ wherein M is a cation having a valence of from 1 to 3, $a'$ and $b'$ are positive whole numbers of 1 to 3, inclusive, and $a'$ multiplied by the valence of M is equal to $2b'$, with a compound selected from the class consisting of organic sulfones and amides of a carboxylic acid in the presence of a strong acid, continuing the addition of said strong acid until heat is no longer evolved, applying heat and further addition of said strong acid, and isolating the resulting product.

17. Process for the formation of a compound selected from the class consisting of $$M[B_{10}H_9 \cdot Z]_b \quad \text{and} \quad B_{10}H_8 \cdot 2Z$$

wherein M is a cation having a valence from 1 to 3; Z is a member of the group consisting of organic sulfides, tertiary phosphines, tertiary amines, amides of carboxylic acids, organic sulfones and nitriles and $b$ is equal to the valence of M, which comprises treating a compound selected from the class consisting of $B_{10}H_8 \cdot 2N_2$ and and $M(B_{10}H_9 \cdot N_2)_b$ wherein M is a cation of valence $b$ with a member of the group consisting of organic sulfides, tertiary amines, tertiary phosphines, amides of carboxylic acids, organic sulfones, and nitriles.

18. A process for preparing a compound of the formula $$M(B_{10}H_8SR \cdot SR_2)_b$$

wherein M is a cation having a valence from 1 to 3, $b$ is equal to the valence of M, and R is an organic radical bonded to the sulfur through carbon which comprises reacting a compound of the formula $$B_{10}H_8 \cdot 2SR_2$$

wherein R is defined as above and a compound selected from the class consisting of trisubstituted phosphine and an alkali metal phthalimide at a temperature of $140°$ C. to $250°$ C.

19. Process for the formation of $$M[B_{10}H_9 \cdot Z]_b$$

wherein M is a cation having a valence from 1 to 3; Z is a member of the group consisting of organic sulfides, tertiary phosphines and tertiary amines and $b$ is equal to the valence of M, which comprises treating a compound selected from the class consisting of $H_2B_{10}H_{10}$, $Na_2B_{10}H_{10}$, $K_2B_{10}H_{10}$, and $(NH_4)_2B_{10}H_{10}$, with a member of the group consisting of organic sulfoxides, phosphine oxides and amine oxides in the presence of a strong acid within a temperature range of $-20°$ C. to $110°$ C., and contacting the reaction mixture with a salt containing the cation M.

20. Process for the formation of $$B_{10}H_8 \cdot 2Z$$

wherein Z is a member of the group consisting of organic sulfides, tertiary phosphines and tertiary amines, which comprises treating a compound selected from the class consisting of $H_2B_{10}H_{10}$, $Na_2B_{10}H_{10}$, $K_2B_{10}H_{10}$, and $(NH_4)_2B_{10}H_{10}$, with a member of the group consisting of organic sulfoxides, phospine oxides and amine oxides in the presence of a strong acid within a temperature range of $-20°$ C. to $110°$ C., and isolating $B_{10}H_8 \cdot 2Z$ from the reaction mixture.

21. A compound of claim 8 wherein the organic portion of the said organic sulfide is hydrocarbyl free of acetylenic unsaturation and of up to 18 carbon atoms.

No references cited.

JOHN D. RANDOLPH, *Primary Examiner.*

LEON D. ROSDOL, WALTER A. MODANCE,
J. W. WHISLER, H. I. MOATZ, *Assistant Examiners.*